US012284390B2

(12) United States Patent
Esenlik et al.

(10) Patent No.: US 12,284,390 B2
(45) Date of Patent: Apr. 22, 2025

(54) DECODING AND ENCODING OF NEURAL-NETWORK-BASED BITSTREAMS

(71) Applicant: HUAWEI TECHNOLOGIES CO., LTD., Shenzhen (CN)

(72) Inventors: Semih Esenlik, Munich (DE); Panqi Jia, Munich (DE); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 18/336,735

(22) Filed: Jun. 16, 2023

(65) Prior Publication Data
US 2023/0336784 A1 Oct. 19, 2023

Related U.S. Application Data

(63) Continuation of application No. PCT/EP2020/086798, filed on Dec. 17, 2020.

(51) Int. Cl.
*H04N 19/70* (2014.01)
*H04N 19/119* (2014.01)
(Continued)

(52) U.S. Cl.
CPC ........... *H04N 19/70* (2014.11); *H04N 19/119* (2014.11); *H04N 19/132* (2014.11);
(Continued)

(58) Field of Classification Search
CPC .. H04N 19/119; H04N 19/132; H04N 19/167; H04N 19/172; H04N 19/42; H04N 19/70
See application file for complete search history.

(56) References Cited

U.S. PATENT DOCUMENTS 11,985,302 B2 * 5/2024 Maze ................. H04N 21/8455
2012/0320970 A1 * 12/2012 Drugeon ............. H04N 19/563
375/E7.026
(Continued)

FOREIGN PATENT DOCUMENTS

CN 111133756 A 5/2020
CN 111801945 A 10/2020
(Continued)

OTHER PUBLICATIONS

Jihong et al., "Multi-modal/multi-scale convolutional neural network based in-loop filter design for next generation video codec," 2017 IEEE International Conference on Image Processing (ICIP), XP033322523, Total 5 pages, Institute of Electrical Electronics Engineers, New York, New York (Sep. 17, 2017).
(Continued)

*Primary Examiner* — Jeremiah C Hallenbeck-Huber
(74) *Attorney, Agent, or Firm* — Leydig, Voit & Mayer, Ltd.

(57) ABSTRACT

For picture decoding and encoding of neural-network-based bitstreams, a picture is represented by an input set of samples which is obtained from the bitstream. The picture is reconstructed from output subsets, which are generated as a result of processing the input set L. The input set is divided into multiple input subsets Li. The input subsets are each subject to processing with a neural network having one or more layers. The neural network uses as input multiple samples of an input subset and generates one sample of an output subset. By combining the output subsets, the picture is reconstructed. In particular, the size of at least one input subset is smaller than a size that is required to obtain the size of the respective output subset, after processing by the one or more layers of the neural network.

26 Claims, 25 Drawing Sheets

(51) Int. Cl.
  *H04N 19/132* (2014.01)
  *H04N 19/167* (2014.01)
  *H04N 19/172* (2014.01)
  *H04N 19/42* (2014.01)

(52) U.S. Cl.
  CPC ......... *H04N 19/167* (2014.11); *H04N 19/172* (2014.11); *H04N 19/42* (2014.11)

(56) References Cited

U.S. PATENT DOCUMENTS

| | | | |
|---|---|---|---|
| 2018/0249158 | A1 | 8/2018 | Huang et al. |
| 2019/0050981 | A1* | 2/2019 | Song ................... A61B 5/7267 |
| 2020/0160565 | A1* | 5/2020 | Ma ......................... H04N 19/60 |
| 2020/0186809 | A1 | 6/2020 | Mukherjee et al. |
| 2020/0304802 | A1 | 9/2020 | Habibian et al. |
| 2020/0311548 | A1* | 10/2020 | Shrivastava ............ G06F 17/15 |
| 2020/0382793 | A1* | 12/2020 | Gao ...................... H04N 19/147 |
| 2021/0092375 | A1* | 3/2021 | Choi .................... H04N 19/136 |
| 2021/0099710 | A1* | 4/2021 | Salehifar ................ H04N 19/46 |
| 2021/0160482 | A1* | 5/2021 | Chiu ..................... H04N 19/59 |
| 2021/0166346 | A1* | 6/2021 | Kim ..................... H04N 19/115 |
| 2021/0168388 | A1* | 6/2021 | Makeev ................. H04N 19/96 |
| 2021/0281867 | A1* | 9/2021 | Golinski ................ G06N 3/045 |
| 2022/0130033 | A1* | 4/2022 | Rashidi ................ G06T 7/0008 |
| 2022/0385949 | A1* | 12/2022 | Galpin ................... H04N 19/90 |

FOREIGN PATENT DOCUMENTS

| | | |
|---|---|---|
| TW | 201945988 A | 12/2019 |
| WO | 2020034330 A1 | 2/2020 |
| WO | 2020188273 A1 | 9/2020 |
| WO | 2020219375 A1 | 10/2020 |

OTHER PUBLICATIONS

Colyer, "End-to-end optimized image compression," the morning paper, Total 11 pages (May 8, 2017).

Minnen et al., "Joint Autoregressive and Hierarchical Priors for Learned Image Compression," arxiv.org, Cornell University Library, Oline Library Cornell University Ithaca, NY 14853, XP081080482, Total 10 pages (Sep. 8, 2018).

Minnen et al., "Spatially adaptive image compression using a tiled deep network," arxiv.org, Cornell University Library, Online Library Cornell University Ithaca, NY 14853, XP081219784, Total 5 pages (Feb. 7, 2018).

* cited by examiner

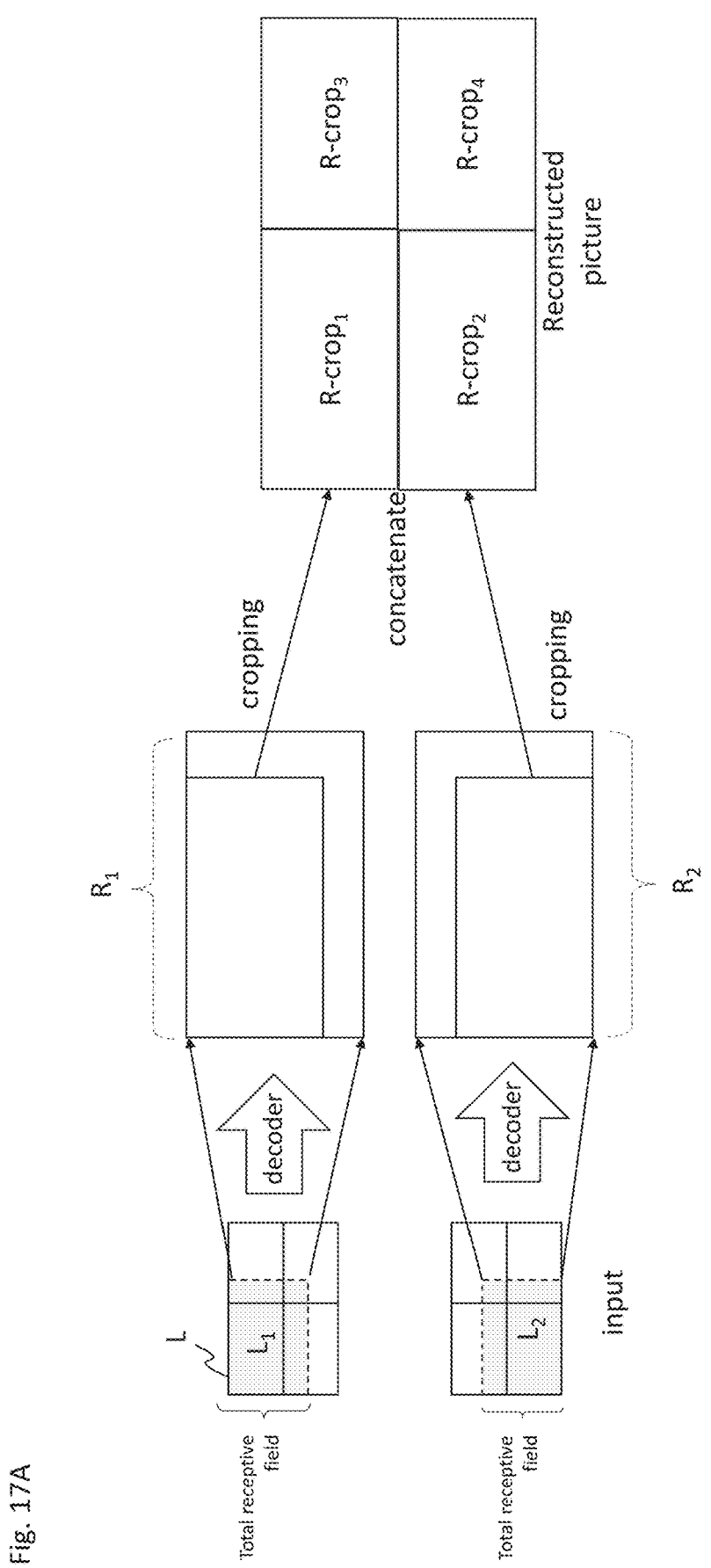

DECODING AND ENCODING OF NEURAL-NETWORK-BASED BITSTREAMS

CROSS-REFERENCE TO RELATED APPLICATIONS

This application is a continuation of International Application No. PCT/EP2020/086798, filed on Dec. 17, 2020, the disclosure of which is hereby incorporated by reference in its entirety.

TECHNICAL FIELD

Embodiments of the present disclosure generally relate to the field of picture or video encoding and decoding, and in particular to encoding and decoding of neural-network-based bitstreams.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Neural networks (NNs) and deep-learning (DL) techniques, making use of artificial neural networks have now been used for some time, also in the technical field of encoding and decoding of videos, images (e.g. still images) and the like.

It is desirable to further improve efficiency of such picture coding (video picture coding or still picture coding) based on trained networks that account for limitations in available memory and/or processing speed.

SUMMARY

Some embodiments of the present disclosure provide methods and apparatuses for decoding and/or encoding of a picture in an efficient manner, thus reducing the memory footprint and the required operation frequency of the processing units. In particular, the present disclosure enables a tradeoff between memory resources and computational complexity within an NN-based video encoding-decoding framework.

According to an aspect of the present disclosure, a method is provided for reconstructing a picture from a bitstream, the method comprising: obtaining, based on the bitstream, an input set of samples (L) representing the picture; dividing the input set (L) into two or more input subsets (L1, L2); parsing from the bitstream side information; determining, based on the side information, a size ((h1, w1); (h2, w2)) for each of the two or more input subsets (L1, L2) and/or a size ((H1, W1); (H2, W2)) for each of two or more output subsets (R1, R2); processing each of the two or more input subsets (L1, L2) comprising processing with a neural network including one or more layers, wherein the neural network uses a plurality of samples of an input subset out of the two or more input subsets (L1, L2) to generate one sample of a respective output subset out of the two or more output subsets (R1, R2), thereby obtaining for the two or more input subsets the respective two or more output subsets (R1, R2); and reconstructing the picture (R) by combining the two or more output subsets, wherein the size of at least one of the input subsets is smaller than a size required to obtain, after processing by said one or more layers, the size of the respective output subset (R1; R2).

As a result, the picture may be reconstructed efficiently from an input set of samples L by dividing the input sample L into multiple subsets L1 and L2, exploiting side information parsed from the bitstream, with each input subset Li being processed with a neural network. Further, the picture reconstruction may be performed with a lower required memory since the size of the input subsets being processed is smaller than the size of the respective output subsets.

In some exemplary implementations, the processing each of the two or more input subsets includes padding before processing with said one or more layers.

Hence, samples missing in the input subsets may be added by the padding process, which improves the quality of the reconstructed output subsets Ri. Accordingly, the quality of the reconstructed picture is improved as well after combining the output subsets Ri.

In one example, position and/or amount of the samples to be padded is determined based on the side information.

Thus, the position and number of padded samples may be determined quickly based on signaled side information by the decoding side.

For example, the two or more input subsets (L1, L2) are overlapping by one or more samples.

Accordingly, the output subsets Ri generated through the processing including the neural network are more accurate since samples of neighboring input-subsets are used (corresponding to overlap samples and commonly located at the boundary between adjacent subsets Li). Hence, the overlap of the Li's improves the overall quality of the reconstructed picture which is a union of the output-subsets Ri. In particular, distortions along boundaries of the input-subsets Li are mitigated.

According to an implementation example, the combining of the two or more output subsets (R1, R2) includes overlapping of the two or more output subsets (R1, R2) by one or more combined samples, and a combined sample is a sample obtained as a combination of a sample from a first output subset (R1) and a sample from a second output subset (R2).

Thus, the quality of the reconstructed picture is further improved by overlapping samples of output subsets Ri. In particular, the quality of the reconstructed picture along the boundaries may be improved, so that picture degradations and distortion are reduced.

In an example implementation, the processing each of the two or more input subsets includes, after processing with said one or more layers, cropping one or more samples.

According to an example, the cropping is performed after the processing of one or more of the two or more input subsets with the neural network, so as to obtain respective one or more of the two or more output subsets (R1, R2); and the combining of the two or more output subsets is a merging without overlapping.

The cropping allows making the size of the reconstructed picture smaller and/or changing the aspect ratio (length to width) of the picture. Therefore, the size of the reconstructed picture may be adapted to a preferred size of a display, which improves the viewing reproduction of the picture on the display (adaptive picture size).

For example, position and/or amount of the samples to be cropped is determined based on the side information.

Thus, the position and/or number of cropped samples may be determined based on signaled side information by the decoding side.

In another example of the implementation, the position and/or the amount of the samples to be cropped is determined according to the size of the input subset indicated in the side information and a neural-network resizing parameter of the neural network specifying relation between the size of the input to the network and size of the output from the network.

Hence, the position and/or cropping amount may be determined more accurately by accounting for both the size of the input subset and characteristics of the neural network (i.e. its resizing parameter). Accordingly, the cropping amount and/or position may be adapted to properties of the neural network, which further improves the quality of the reconstructed picture.

According to an implementation example of the method, the side information includes an indication of one or more of:
- a number of the input subsets,
- a size of the input set,
- a size (h1, w1) of each of the two or more input subsets,
- a size (H, W) of the reconstructed picture (R),
- a size (H1, W1) of each of the two or more output subset,
- an amount of overlap between the two or more input subsets (L1, L2),
- an amount of overlap between the two or more output subsets (R1, R2).

Hence, the signaling of a variety of parameters through side information may be performed in a flexible manner. Accordingly, the signaling overhead may be adapted in dependence on which of the above parameters are signaled in the side information, while other parameters are to be derived from those parameters being signaled.

For example, each of the two or more input subsets (L1, L2) is a rectangular region of the rectangular input set (L), and each of the two or more output subsets (R1, R2) is a rectangular region of the rectangular reconstructed picture (R).

Hence, the combining of the output subsets Ri may be performed quickly due to their rectangular shape, which further improves the efficiency of the picture reconstruction. Moreover, the rectangular shape of the input subsets and the output subsets may be characterized by a minimum of parameters (such as width and height) since the shape is highly regular. Accordingly, the number of parameters suitable for the side information may be kept at a minimum, so that the signaling overhead may be reduced. As the shape of both the input and output subsets are rectangular, their respective sizes are related (and determined from each other) through simple operations.

In an example implementation, the two or more input subsets (L1, L2) are processed independently.

Accordingly, the input subsets may be processed in parallel, meaning one input subset does not use any (intermediate or final) result of processing of another subset. Hence, the processing of the input subsets may be performed fast, further improving the performance of the picture reconstruction. Alternatively, each of the input subset may be processed sequentially, i.e. one at a time for example according to a predefined sequence order, even if no dependency exists in the processing ofLI and L2. Both serial and parallel approaches reduce the memory necessary, due to the independence in processing.

According to an example, the parsing of the side information includes parsing one or more out of a sequence parameter set or a picture parameter set or a picture header. In general, the side information can be obtained from a parameter set or a header. The header might, for example, be a slice header, a tile header or a picture header or an access unit header. The parameter set might be an adaptation parameter set, a picture parameter set, or a sequence parameter set. Thus, the side information may be parsed in a flexible manner, meaning that it can control parts of the sequence (pictures, groups of pictures, picture portions).

According to an aspect of the present disclosure, a processing method is provided for encoding a picture into a bitstream, the method comprising: dividing an input set of samples (L) representing the picture into two or more input subsets (L1, L2); determining side information based on a size ((h1, w1); (h2, w2)) for each of the two or more input subsets (L1, L2) and/or a size ((H1, W1); (H2, W2)) for each of two or more output subsets (R1, R2); processing each of the two or more input subsets (L1, L2) comprising processing with a neural network including one or more layers, wherein the neural network uses a plurality of samples of an input subset out of the two or more input subsets (L1, L2) to generate one sample of a respective output subset out of the two or more output subsets (R1, R2), thereby obtaining for the two or more input subsets the respective two or more output subsets (R1, R2); and inserting into the bitstream the side information, wherein the size of at least one of the input subsets is smaller than a size required to obtain, after processing by said one or more layers, the size of the respective output subset (R1; R2).

As a result, the picture may be encoded efficiently from an input set of samples L by dividing the input sample L into multiple subsets L1 and L2 exploiting side information, with each input subset Li being processed with a neural network. Further, the picture encoding may be performed with a lower required memory since the size of the input subsets Li being processed is smaller than the size of the respective output subsets Ri.

For example, the method further comprises inserting into the bitstream an indication of the two or more output subsets (R1, R2).

The indication of output subsets into the bit stream may improve the dividing of an input set L into input subsets on the decoding side.

In one example, the processing each of the two or more input subsets includes padding before processing with said one or more layers.

Hence, samples missing in the input subsets may be added by the padding process.

In a further example, position and/or amount of the samples to be padded is determined based on the side information.

Thus, the position and number of padded samples may be determined based on signaled side information by the encoding side.

According to an example implementation, the two or more input subsets (L1, L2) are overlapping by one or more samples.

Accordingly, the output subsets Ri generated through the processing including the neural network are more accurate since samples of neighboring input-subsets are used (corresponding to overlap samples and commonly located at the boundary between adjacent subsets Li). Hence, the overlap of the Li's improves the overall quality of the generated output-subsets Ri. In particular, distortions along boundaries of the input-subsets Li are mitigated.

In another example, the processing each of the two or more input subsets includes, after processing with said one or more layers, cropping one or more samples.

For example, the cropping is performed after the processing of one or more of the two or more input subsets with the neural network, so as to obtain respective one or more of the two or more output subsets (R1, R2).

The cropping allows making the size of the picture to be reconstructed smaller and/or changing the aspect ratio (length to width) of the picture. Therefore, the size of the picture may be adapted to a preferred size of a display, which improves the viewing reproduction of the picture on the display (adaptive picture size).

In one implementation, wherein the side information is determined based on a position and/or an amount of the samples to be cropped.

Thus, the position and/or number of cropped samples may be determined quickly based on signaled side information by the decoding side.

According to an implementation of the method, the position and/or the amount of the samples to be cropped is determined according to the size of the input subset indicated in the side information and a neural-network resizing parameter of the neural network specifying relation between the size of the input to the network and size of the output from the network.

Hence, the position and/or cropping amount may be determined more accurately by accounting for both the size of the input subset and characteristics of the neural network (i.e. its resizing parameter). Accordingly, the cropping amount and/or position may be adapted to properties of the neural network, which further improves the quality of the reconstructed picture.

In a further implementation example, the side information includes an indication of one or more of:
- a number of the input subsets,
- a size of the input set,
- a size (h1, w1) of each of the two or more input subsets,
- a size (H, W) of the reconstructed picture (R),
- a size (H1, W1) of each of the two or more output subsets,
- an amount of overlap between the two or more input subsets (L1, L2),
- an amount of overlap between the two or more output subsets (R1, R2).

Hence, the signaling of a variety of parameters through side information may be performed in a flexible manner. Accordingly, the signaling overhead may be adapted in dependence which of the above parameters are signaled in the side information, while other parameters are to be derived from those parameters being signaled.

For example, each of the two or more input subsets (L1, L2) is a rectangular region of the rectangular input set (L), and each of the two or more output subsets (R1, R2) is a rectangular region.

Accordingly, the rectangular shape of the input subsets and the output subsets may be characterized by a minimum of parameters (such as width and height) since the shape is highly regular. Thus, the number of parameters suitable for the side information may be kept at a minimum, so that the signaling overhead may be reduced. Over and above, as the shape of both the input and output subsets are rectangular, their respective sizes are related (and determined from each other) through simple operations.

In another example, the two or more input subsets (L1, L2) are processed independently.

Accordingly, the input subsets may be processed in parallel, meaning one input subset does not use any (intermediate or final) result of processing of another subset. Hence, the processing of the input subsets may be performed fast, further improving the performance of the picture reconstruction within an encoder-decoder framework.

According to an implementation example, the inserting of the side information includes inserting the side information into one or more out of a sequence parameter set or a picture parameter set or a picture header. Thus, the side information may be inserted (and hence signaled) in a flexible manner, meaning that it can control parts of the sequence (pictures, groups of pictures, picture portions).

According to an aspect of the present disclosure, provided is a computer program stored on a non-transitory medium comprising code which when executed on one or more processors performs steps of any of the previous aspects of the present disclosure.

According to an aspect of the present disclosure, an apparatus is provided for reconstructing a picture from a bitstream, the apparatus comprising a processing circuitry configured to: obtain, based on the bitstream, an input set of samples (L) representing the picture; divide the input set (L) into two or more input subsets (L1, L2); parse from the bitstream side information; determine, based on the side information, a size ((h1, w1); (h2, w2)) for each of the two or more input subsets (L1, L2) and/or a size ((H1, W1); (H2, W2)) for each of two or more output subsets (R1, R2); process each of the two or more input subsets (L1, L2) comprising processing with a neural network including one or more layers, wherein the neural network uses a plurality of samples of an input subset out of the two or more input subsets (L1, L2) to generate one sample of a respective output subset out of the two or more output subsets (R1, R2), thereby obtaining for the two or more input subsets the respective two or more output subsets (R1, R2); and reconstruct the picture (R) by combining the two or more output subsets, wherein the size of at least one of the input subsets is smaller than a size required to obtain, after processing by said one or more layers, the size of the respective output subset (R1; R2).

According to an aspect of the present disclosure, a processing apparatus for encoding a picture into a bitstream, the processing apparatus comprising a processing circuitry configured to: divide an input set of samples (L) representing the picture into two or more input subsets (L1, L2); determine side information based on a size ((h1, w1); (h2, w2)) for each of the two or more input subsets (L1, L2) and/or a size ((H1, W1); (H2, W2)) for each of two or more output subsets (R1, R2); process each of the two or more input subsets (L1, L2) comprising processing with a neural network including one or more layers, wherein the neural network uses a plurality of samples of an input subset out of the two or more input subsets (L1, L2) to generate one sample of a respective output subset out of the two or more output subsets (R1, R2), thereby obtaining for the two or more input subsets the respective two or more output subsets (R1, R2); and insert into the bitstream the side information, wherein the size of at least one of the input subsets is smaller than a size required to obtain, after processing by said one or more layers, the size of the respective output subset (R1; R2).

According to an aspect of the present disclosure, an apparatus is provided for reconstructing a picture from a bitstream, the apparatus comprising: one or more processors; and a non-transitory computer-readable storage medium coupled to the one or more processors and storing programming for execution by the one or more processors, wherein the programming, when executed by the one or more processors, configures the encoder to carry out a method according to any one of the previous aspects of the present disclosure related to reconstructing a picture.

According to an aspect of the present disclosure, a processing apparatus is provided for encoding a picture into a bitstream, the processing apparatus comprising: one or more processors; and a non-transitory computer-readable storage medium coupled to the one or more processors and storing programming for execution by the one or more processors, wherein the programming, when executed by the one or more processors, configures the decoder to carry out a method according to any one of the previous aspects of the present disclosure related to encoding a picture.

The present disclosure is applicable both to end-to-end AI codecs and hybrid AI codecs. In Hybrid AI codec, for example, the filtering operation (filtering of the reconstructed picture) can be performed by means of a neural network (NN). The present disclosure applies to such NN-based processing modules. In general, the present disclosure can be applied to the whole or a part of a video compression and decompression process, if at least part of the processing includes an NN, and if such NN includes convolution or transposed convolution operations. For example, the present disclosure is applicable to individual processing tasks as being performed as a part of processing performed by an encoder and/or decoder, including in-loop filtering and/or post-filtering and/or pre-filtering.

It is noted that the present disclosure is not limited to a particular framework. Moreover, the present disclosure is not restricted to image or video compression, and may be applied to object detection, image generation, and recognition systems as well.

The invention can be implemented in hardware (HW) and/or software (SW). Moreover, HW-based implementations may be combined with SW-based implementations.

For the purpose of clarity, any one of the foregoing embodiments may be combined with any one or more of the other foregoing embodiments to create a new embodiment within the scope of the present disclosure.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which:

FIG. 17A shows an example of dividing an input image into overlapping regions Li, the subsequent cropping of samples in the overlap region, and the concatenation of the cropped regions. Each Li comprises the total receptive field.

DESCRIPTION

Figure 2:
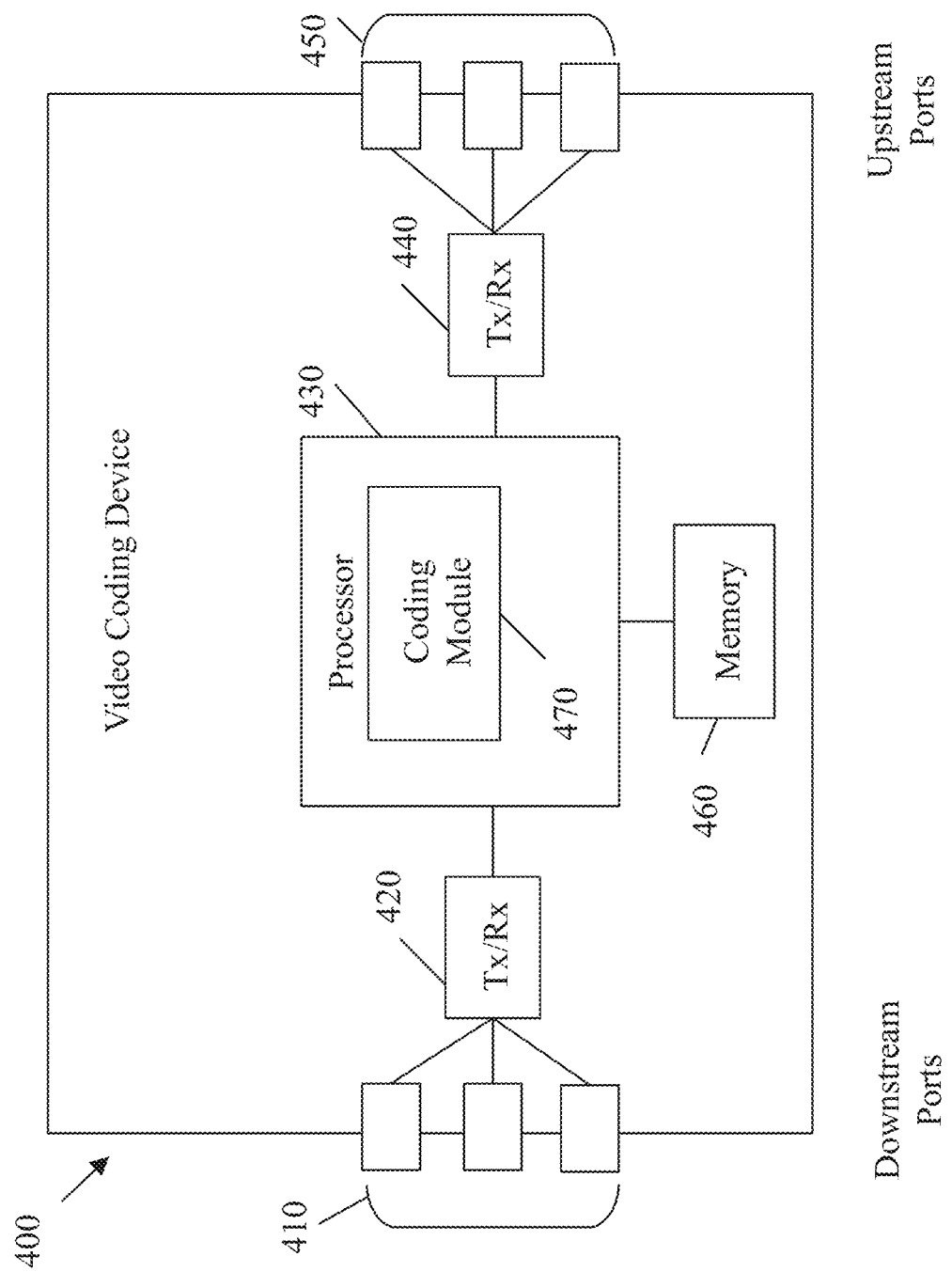
FIG. 2 is a block diagram illustrating an example of an encoding apparatus or a decoding apparatus.
Figure 3:
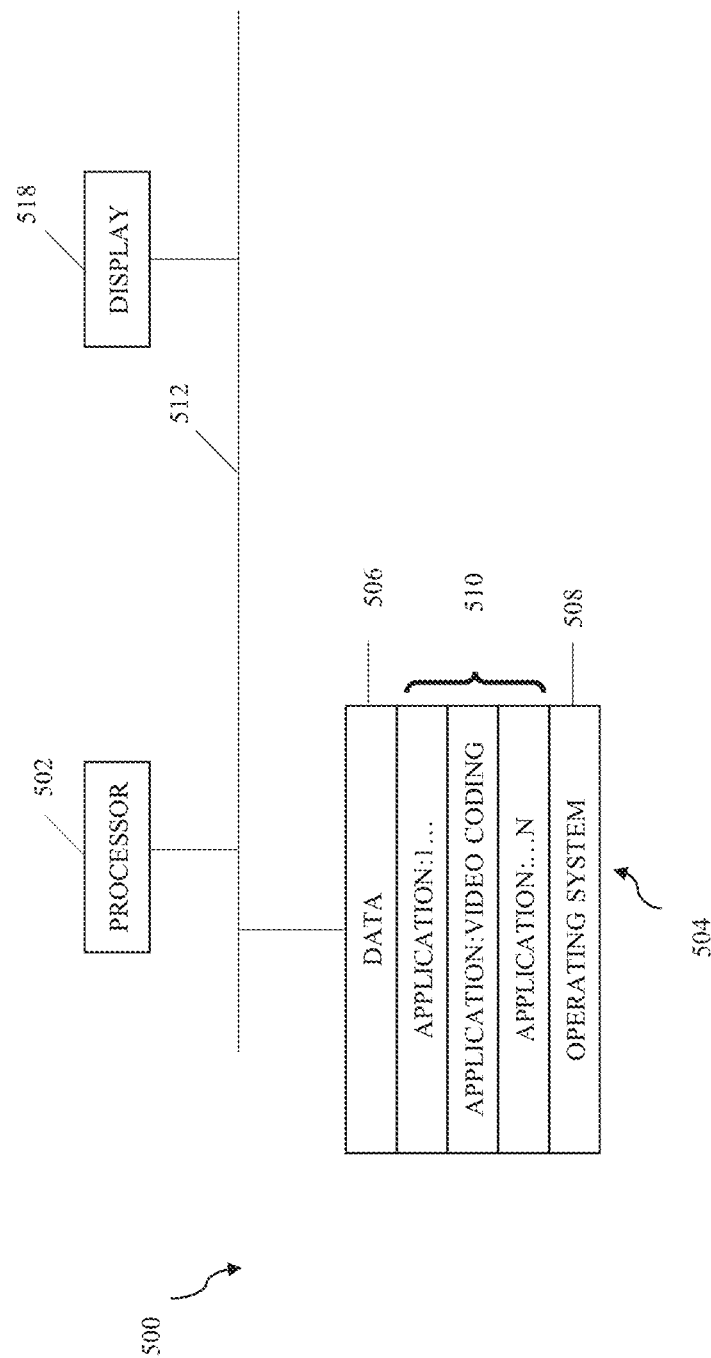
FIG. 3 is a block diagram illustrating another example of an encoding apparatus or a decoding apparatus.

In the following, some embodiments of the present disclosure are described with reference to the Figures. FIGS. 1 to 3 refer to video coding systems and methods that may be used together with more specific embodiments of the invention described in the further Figures. Specifically, the embodiments described in relation to FIGS. 1 to 3 may be used with encoding/decoding techniques described further below that make use of a neural network for encoding a bitstream and/or decoding a bitstream.

In the following description, reference is made to the accompanying Figures, which form part of the disclosure, and which show, by way of illustration, specific aspects of the present disclosure or specific aspects in which embodiments of the present disclosure may be used. It is understood that the embodiments may be used in other aspects and comprise structural or logical changes not depicted in the Figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the Figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the Figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks. Recently, some parts or the entire encoding and decoding chain has been implemented by using a neural network or, in general, any machine learning or deep learning framework.

In the following embodiments of a video coding system 10, a video encoder 20 and a video decoder 30 are described based on FIG. 1.

Figure 1A:
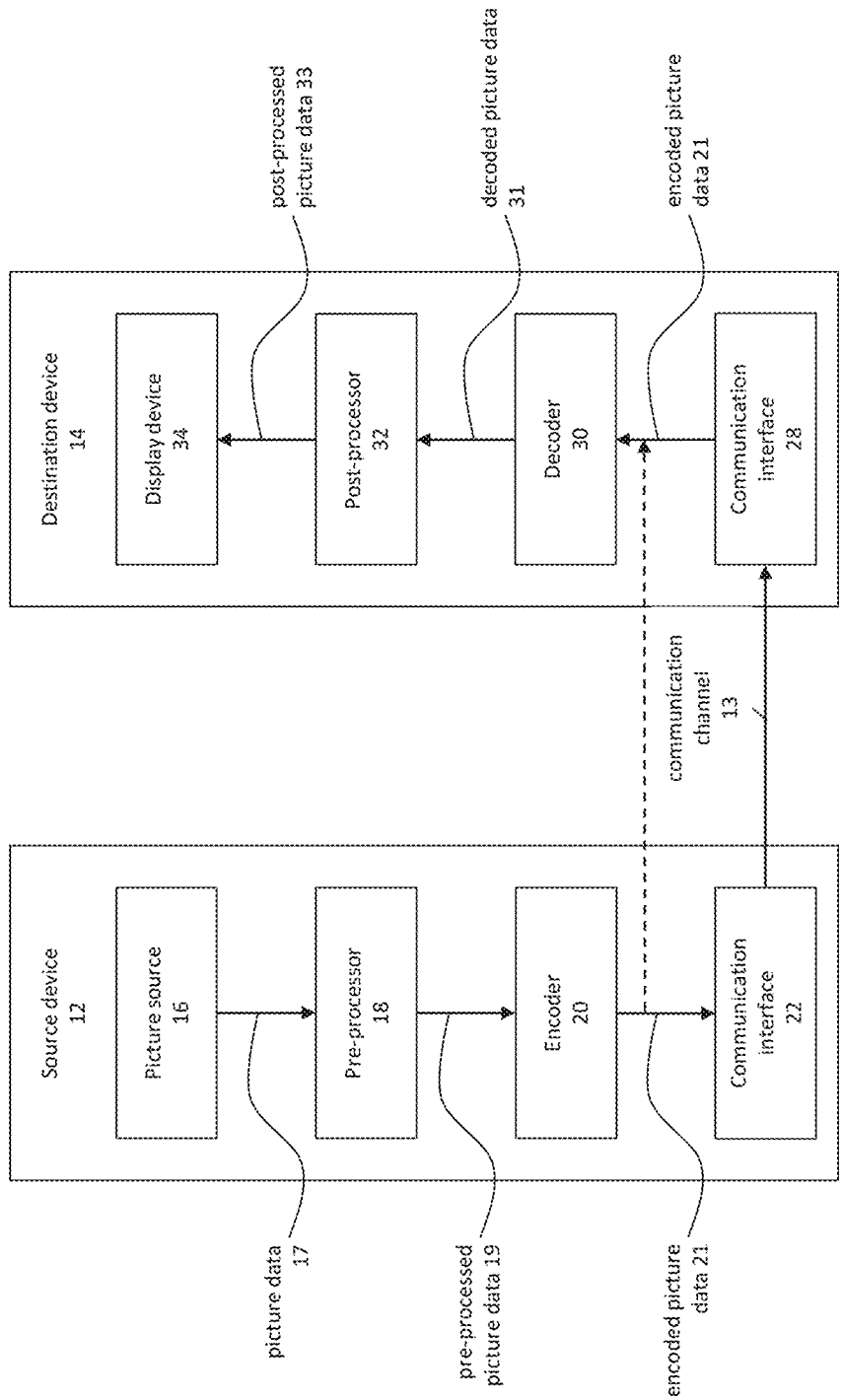
FIG. 1A is a block diagram showing an example of a video coding system configured to implement embodiments of the invention.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22. Some embodiments of the present disclosure (e.g. relating to an initial rescaling or rescaling between two proceeding layers) may be implemented by the encoder 20. Some embodiments (e.g. relating to an initial rescaling) may be implemented by the picture pre-processor 18.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g. based on FIG. 25). The encoder 20 may be implemented via processing circuitry 46 to embody the various modules as discussed with respect to encoder 20 of FIG. 25 and/or any other encoder system or subsystem described herein.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 and FIG. 26). The decoder 30 may be implemented via processing circuitry 46 to embody the various modules as discussed with respect to decoder 30 of FIG. 26 and/or any other decoder system or subsystem described herein.

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

Some embodiments of the disclosure may be implemented by the decoder 30 or by the post-processor 32.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
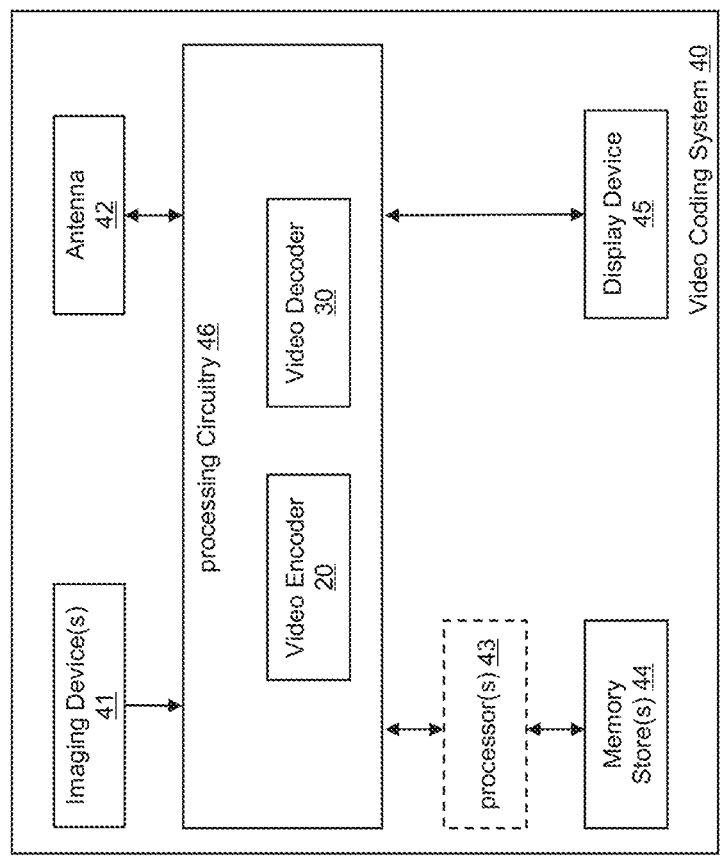
FIG. 1B is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody various modules and/or any other encoder system or subsystem described herein. The decoder 30 may be implemented via processing circuitry 46 to embody various modules and/or any other decoder system or subsystem described herein. The processing circuitry may be configured to perform the various operations as discussed later. As shown in FIG. 3, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, some embodiments are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

FIG. 2 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

FIG. 3 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform methods described here. For example, the application programs 510 can include applications 1 through N, which further include a video coding application that performs methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Figure 25:
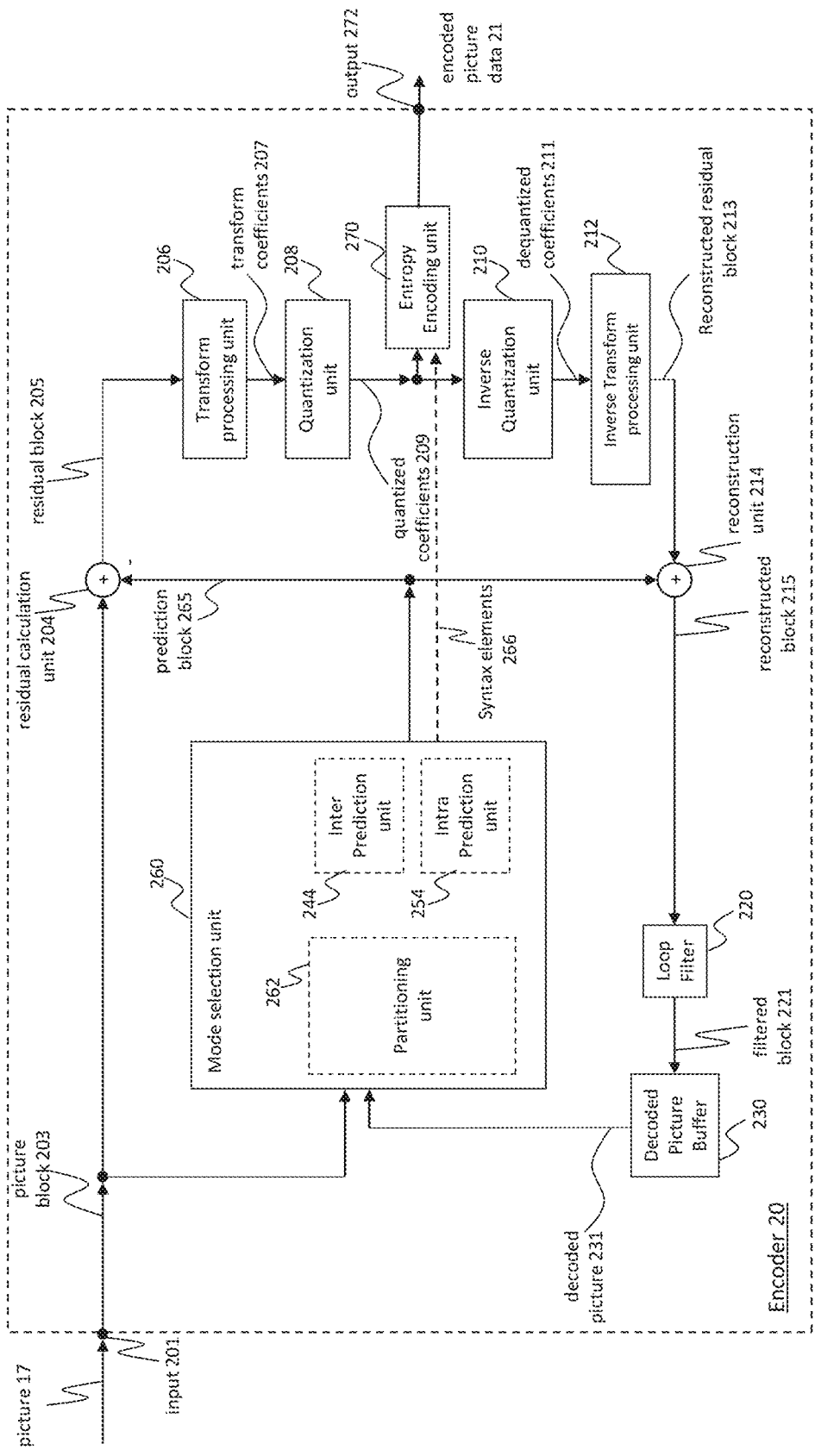
FIG. 25 is a block diagram illustrating an exemplary hybrid encoder configured to implement embodiments of the invention.

FIG. 25 shows a schematic block diagram of an example video encoder 20 that is configured to implement the techniques of the present application. In the example of FIG. 25, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit. A video encoder 20 as shown in FIG. 25 may also be referred to as hybrid video encoder or a video encoder according to a hybrid video codec.

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks. The abbreviation AVC stands for Advanced Video Coding.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an MxN (M-column by N-row) array of samples, or an M×N array of transform coefficients.

Embodiments of the video encoder 20 as shown in FIG. 25 may be configured to encode the picture 17 block by block, e.g. the encoding and prediction is performed per block 203.

Embodiments of the video encoder 20 as shown in FIG. 25 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 25 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Figure 26:
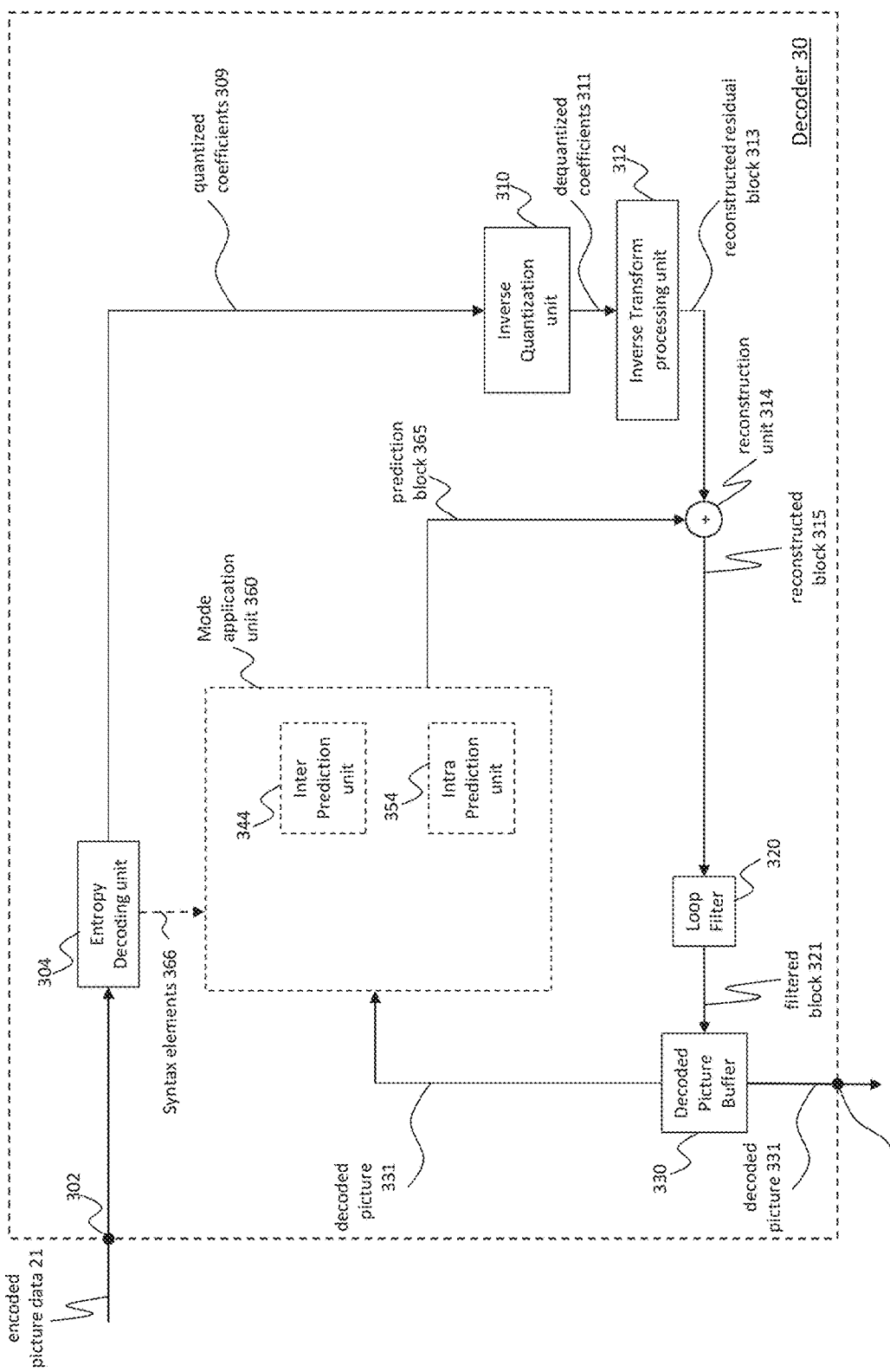
FIG. 26 is a block diagram illustrating an exemplary hybrid decoder configured to implement embodiments of the invention.

FIG. 26 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters, e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Embodiments of the video decoder 30 as shown in FIG. 26 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 26 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

In the following, more specific, non-limiting, and exemplary embodiments of the invention are described. Before that, some explanations are provided aiding in the understanding of the disclosure:

Artificial Neural Networks

Artificial neural networks (ANN) or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analyzing example images that have been manually labeled as "cat" or "no cat" and using the results to identify cats in other images. They do this without any prior knowledge of cats, for example, that they have fur, tails, whiskers and cat-like faces. Instead, they automatically generate identifying characteristics from the examples that they process.

An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. In ANN implementations, the "signal" at a connection is a real number, and the output of each neuron can be computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The original goal of the ANN approach was to solve problems in the same way that a human brain would. Over time, attention moved to performing specific tasks, leading to deviations from biology. ANNs have been used on a variety of tasks, including computer vision, speech recognition, machine translation, social network filtering, playing board and video games, medical diagnosis, and even in activities that have traditionally been considered as reserved to humans, like painting.

Convolutional Neural Network

The name "convolutional neural network" (CNN) indicates that the network employs a mathematical operation called convolution. Convolution is a specialized kind of linear operation. Convolutional networks are simply neural networks that use convolution in place of general matrix multiplication in at least one of their layers. A convolutional neural network consists of an input and an output layer, as well as multiple hidden layers. Input layer is the layer to which the input is provided for processing.

Figure 4:
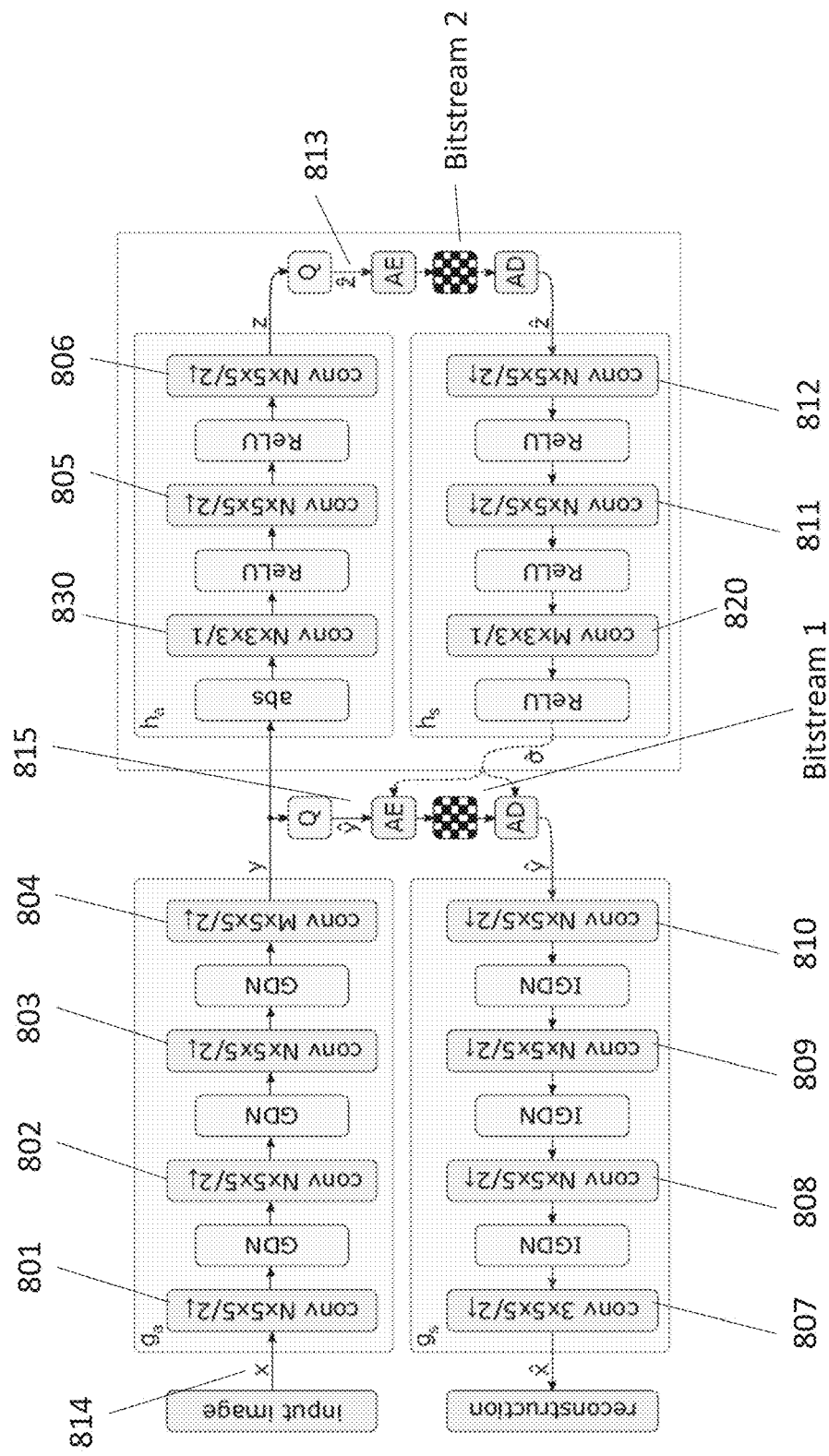
FIG. 4 is a schematic drawing illustrating a variational autoencoder architecture including a hyperprior model.

For example, the neural network of FIG. 4 is a CNN. The hidden layers of a CNN typically consist of a series of convolutional layers that convolve with a multiplication or other dot product. The result of a layer is one or more feature maps, sometimes also referred to as channels. There may be a subsampling involved in some or all of the layers. As a consequence, the feature maps may become smaller. The activation function in a CNN may be a RELU (Rectified Linear Unit) layer or a GDN layer as already exemplified above, and may subsequently be followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how weight is determined at a specific index point.

When programming a CNN for processing pictures or images, the input is a tensor with shape (number of images)×

(image width)×(image height)×(image depth). Then, after passing through a convolutional layer, the image becomes abstracted to a feature map, with shape (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. Also, such network architecture does not take into account the spatial structure of data, treating input pixels which are far apart in the same way as pixels that are close together. This ignores locality of reference in image data, both computationally and semantically. Thus, full connectivity of neurons is wasteful for purposes such as image recognition that are dominated by spatially local input patterns.

Convolutional neural networks are biologically inspired variants of multilayer perceptrons that are specifically designed to emulate the behavior of a visual cortex. CNN models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum. Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The pooling layer operates independently on every depth slice of the input and resizes it spatially. The most common form is a pooling layer with filters of size 2×2 applied with a stride of 2 down-samples at every depth slice in the input by 2 along both width and height, discarding 75% of the activations. In this case, every max operation is over 4 numbers. The depth dimension remains unchanged.

In addition to max pooling, pooling units can use other functions, such as average pooling or $\ell$2-norm pooling. Average pooling was often used historically but has recently fallen out of favour compared to max pooling, which performs better in practice. Due to the aggressive reduction in the size of the representation, there is a recent trend towards using smaller filters or discarding pooling layers altogether. "Region of Interest" pooling (also known as ROI pooling) is a variant of max pooling, in which output size is fixed and input rectangle is a parameter. Pooling is an important component of convolutional neural networks for object detection based on Fast R-CNN architecture.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

The "loss layer" specifies how training penalizes the deviation between the predicted (output) and true labels and is normally the final layer of a neural network. Various loss functions appropriate for different tasks may be used. Softmax loss is used for predicting a single class of K mutually exclusive classes. Sigmoid cross-entropy loss is used for predicting K independent probability values in [0, 1]. Euclidean loss is used for regressing to real-valued labels.

Picture Size

Picture size refers to the width w or height h, or the width-height pair of a picture. Width and height of an image is usually measured in the number of luma samples.

Downsampling

Downsampling is a process, where the sampling rate (sampling interval) of the discrete input signal is reduced. For example, if the input signal is an image, which has a size of h and w, and the output of the downsampling has a size of h2 and w2, at least one of the following holds true:

h2<h w2<w

In one example implementation, downsampling may be implemented by keeping only each m-th sample, while discarding the rest of the input signal (e.g. image).

Upsampling:

Upsampling is a process, where the sampling rate (sampling interval) of the discrete input signal is increased. For example, if the input image has a size of h and w, and the output of the downsampling has a size h2 and w2, at least one of the following holds true:

h2>h
w2>w

Resampling:

Downsampling and upsampling processes are both examples of resampling. Resampling is a process where the sampling rate (sampling interval) of the input signal is changed. Resampling is an approach for resizing (or rescaling) of an input signal.

During the upsampling or downsampling processes, filtering may be applied to improve the accuracy of the resampled signal and to reduce the aliasing effect. Interpolation filtering usually includes a weighted combination of sample values at sample positions around the resampling position. It can be implemented as:

$$f(x_r, y_r) = \Sigma_{(x,y) \varepsilon \Omega_r} s(x,y) C(k),$$

with f( ) referring to the resampled signal, $(x_r, y_r)$ are the resampling coordinates (coordinates of the resampled samples), C(k) are the interpolation filter coefficients, and s(x,y) is the input signal. The coordinates x, y are coordinates of the samples of the input image. The summation operation is performed for (x,y) that are in the vicinity $\Omega_r$ of $(x_r, y_r)$. In other words, a new sample f $(x_r, y_r)$ is obtained as a weighted sum of input picture samples s(x, y). The weighting is performed by the coefficients C(k), wherein k denotes the position (index) of the filter coefficient within the filter mask. For example, in case of a 1D filter, k would take values from one to the order of the filter. In case of 2D filter which may be applied to a 2D image, k may be an index denoting one among all possible (non-zero) filter coefficients. The index is associated, by convention, with a particular position of the coefficient within the filter mask (filter kernel).

Cropping:

Trimming (cutting) off the outside edges of a digital image. Cropping can be used to make an image smaller (in terms of the number of samples) and/or to change the aspect ratio (length to width) of the image. It can be understood as removing samples from a signal, usually the samples at borders of the signal.

Padding:

Padding refers to increasing the size of the input (i.e. an input image) by generating new samples (e.g. at the borders of the image) by either using sample values that are predefined or by using (e.g. copying or combining) sample values at the existing positions in the input image. The generated samples are approximations of non-existing actual sample values.

Resizing:

Resizing is a general term where the size of the input image is changed. Resizing may be performed using one of the methods of padding or cropping. Alternatively, resizing may be performed by resampling.

Integer Division:

Integer division is division in which the fractional part (remainder) is discarded. Convolution:

Convolution may be defined for the input signal f( ) and a filter g( ) in one dimension as:

$$(f * g)[n] = \sum_{m=-\infty}^{\infty} f[m]g[n-m]$$

Here, m is an index within the input signal and the filter. And n indicates the position (shift) of the filter with regard to the input signal. Both n and m are integers. S convolution in 2D may work similarly, as is well-known from the art. For the sake of generality, the m can be considered to have values between minus infinity to plus infinity as in the equation above. In practice, however, the filter f[ ] might have a finite length, in which case the filter coefficients f[m] would be equal to zero for m that exceed the filter size.

Downsampling Layer:

A layer of a neural network that results in a reduction of at least one of the dimensions of the input. In general, the input might have 3 or more dimensions, where the dimensions may include the number of channels, width, and height. The downsampling layer usually refers to a reduction of the width and/or height dimensions. It can be implemented using convolution (possibly with a stride), averaging, max-pooling etc operations.

Feature Map:

Feature maps are generated by applying filters (kernels) or feature detectors to the input image or the feature map output of the prior layers. Feature map visualization provides insight into the internal representations for a specific input for each of the convolutional layers in the model. In general terms, feature map is an output of a neural network layer. Feature map typically includes one or more feature elements.

Latent Space:

The latent space refers to the feature map generated in the bottleneck layer of the NN. This is illustrated in the example shown in FIG. 5 and FIG. 9. In the case of the NN topologies, where the purpose of the network is the reduction of dimensionality of the input signal (like in an autoencoder topology), the bottleneck layer usually refers to the layer at which the dimensionality of the input signal is reduced to a minimum. The purpose of the reduction of dimensionality is usually to achieve a more compact representation of the input. Therefore, the bottleneck layer is a layer that is suitable for compression, and therefore in the case of video coding applications, the bitstream is generated based on the bottleneck layer.

The autoencoder topology usually consists of an encoder and a decoder that are connected to the each other at the bottleneck layer. The purpose of the encoder is to reduce the dimensionality of the input and make it more compact (or more intuitive). The purpose of the decoder is to revert the operation of the encoder and hence reconstruct the input as best as possible based on the bottleneck layer.

Upsampling Layer:

A layer of a neural network than results in an increase of at least one of the dimensions of the input. In general, the input might have 3 or more dimensions, where the dimensions may include the number of channels, width, and height. The upsampling layer usually refers to an increase in the width and/or height dimensions. It can be implemented with de-convolution, replication etc operations.

Autoencoders and Unsupervised Learning

Figure 5:
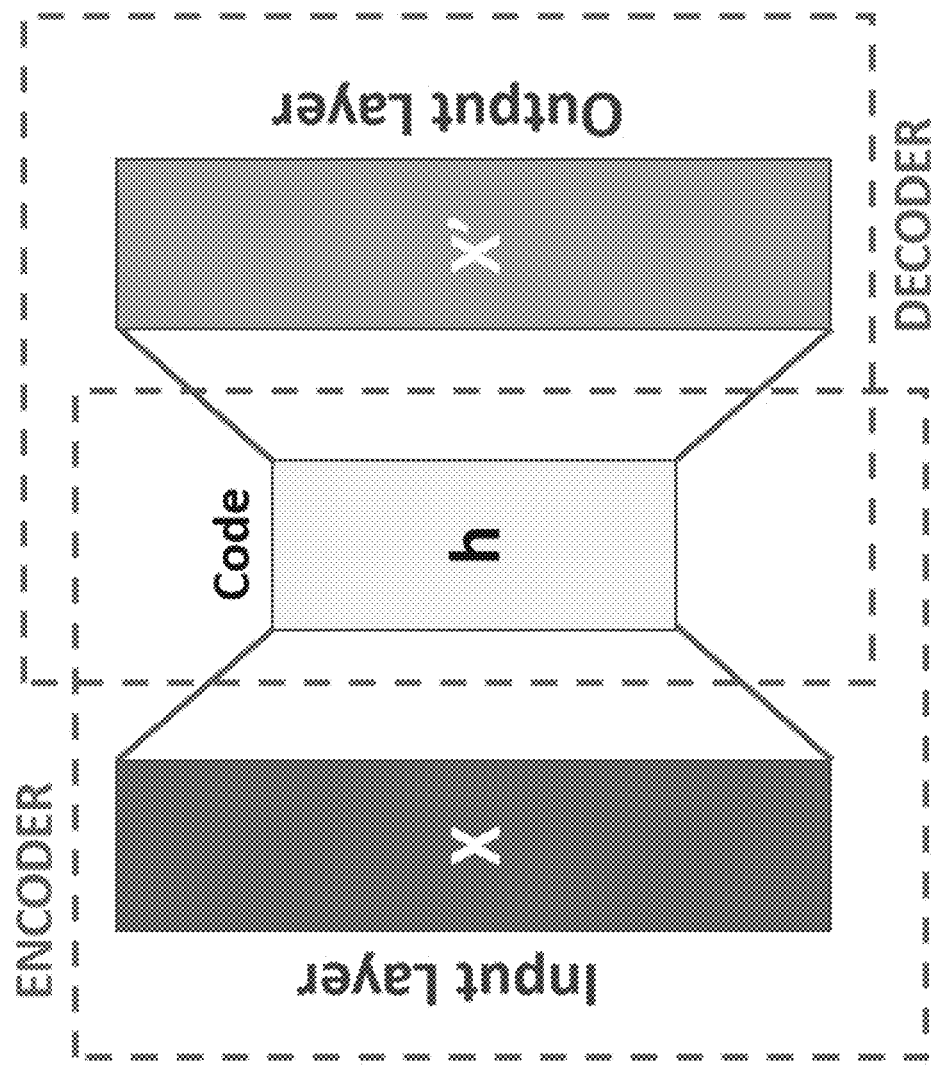
FIG. 5 is a block diagram illustrating parts of an exemplary autoencoder.

An autoencoder is a type of artificial neural network used to learn efficient data codings in an unsupervised manner. A schematic drawing thereof is shown in FIG. 5 which may be considered as a simplified representation of the CNN-based VAE structure of FIG. 4. The aim of an autoencoder is to learn a representation (encoding) for a set of data, typically for dimensionality reduction, by training the network to ignore signal "noise". Along with the reduction side, a reconstructing side is learned, where the autoencoder tries to generate from the reduced encoding a representation as close as possible to its original input, hence its name.

In the simplest case, given one hidden layer, the encoder stage of an autoencoder takes the input x and maps it to h $$h=\sigma(Wx+b).$$

This image h is usually referred to as code, latent variables, or latent representation. Here, u is an element-wise activation function, such as a sigmoid function or a rectified linear unit. W is a weight matrix b is a bias vector. Weights and biases are usually initialized randomly, and then updated iteratively during training through Backpropagation. After that, the decoder stage of the autoencoder maps h to the reconstruction x' of the same shape as x:

$$x'=\sigma'(W'h'+b')$$

where σ', W' and b' for the decoder may be unrelated to the corresponding σ, W and b for the encoder.

Variational autoencoder models make strong assumptions concerning the distribution of latent variables. They use a variational approach for latent representation learning, which results in an additional loss component and a specific estimator for the training algorithm called the Stochastic Gradient Variational Bayes (SGVB) estimator. It assumes that the data are generated by a directed graphical model $p_\theta(x|h)$ and that the encoder is learning an approximation $q_\phi(h|x)$ to the posterior distribution $p_\theta(h|x)$ where φ and θ denote the parameters of the encoder (recognition model) and decoder (generative model) respectively. The probability distribution of the latent vector of a VAE typically matches that of the training data much closer than a standard autoencoder. The objective of VAE has the following form:

$$\mathcal{L}(\phi,\theta,x)=D_{KL}(q_\phi(h|x)\|p_\theta(h))-E_{q_\phi(h|x)}(\log p_\theta(x|h))$$

Here, $D_{KL}$ stands for the Kullback-Leibler divergence. The prior over the latent variables is usually set to be the centered isotropic multivariate Gaussian $p_\theta(h)=\mathcal{N}(0,I)$. Commonly, the shape of the variational and the likelihood distributions are chosen such that they are factorized Gaussians:

$$q_\phi(h|x)=\mathcal{N}(\rho(x),\omega^2(x)I)$$

$$p_\phi(x|h)=\mathcal{N}(\mu(h),\sigma_2(h)I)$$

where ρ(x) and $\omega^2(x)$ are the encoder output, while μ(h) and $\sigma^2(h)$ are the decoder outputs.

Recent progress in artificial neural networks area and especially in convolutional neural networks enables researchers' interest of applying neural networks based technologies to the task of image and video compression. For example, End-to-End Optimized Image Compression has been proposed, which uses a network based on variational autoencoder. Accordingly, data compression is considered as a fundamental and well-studied problem in engineering, and is commonly formulated with the goal of designing codes for a given discrete data ensemble with minimal entropy. The solution relies heavily on knowledge of the probabilistic structure of the data, and thus the problem is closely related to probabilistic source modeling. However, since all practical codes must have finite entropy, continuous-valued data (such as vectors of image pixel intensities) must be quantized to a finite set of discrete values, which introduces error. In this context, known as the lossy compression problem, one must trade off two competing costs: the entropy of the discretized representation (rate) and the error arising from the quantization (distortion). Different compression applications, such as data storage or transmission over limited-capacity channels, demand different rate-distortion trade-offs. Joint optimization of rate and distortion is difficult. Without further constraints, the general problem of optimal quantization in high-dimensional spaces is intractable. For this reason, most existing image compression methods operate by linearly transforming the data vector into a suitable continuous-valued representation, quantizing its elements independently, and then encoding the resulting discrete representation using a lossless entropy code. This scheme is called transform coding due to the central role of the transformation. For example, JPEG uses a discrete cosine transform on blocks of pixels, and JPEG 2000 uses a multi-scale orthogonal wavelet decomposition. Typically, the three components of transform coding methods—transform, quantizer, and entropy code—are separately optimized (often through manual parameter adjustment). Modern video compression standards like HEVC, VVC and EVC also use transformed representation to code residual signal after prediction. The several transforms are used for that purpose such as discrete cosine and sine transforms (DCT, DST), as well as low frequency non-separable manually optimized transforms (LFNST).

Figure 6:
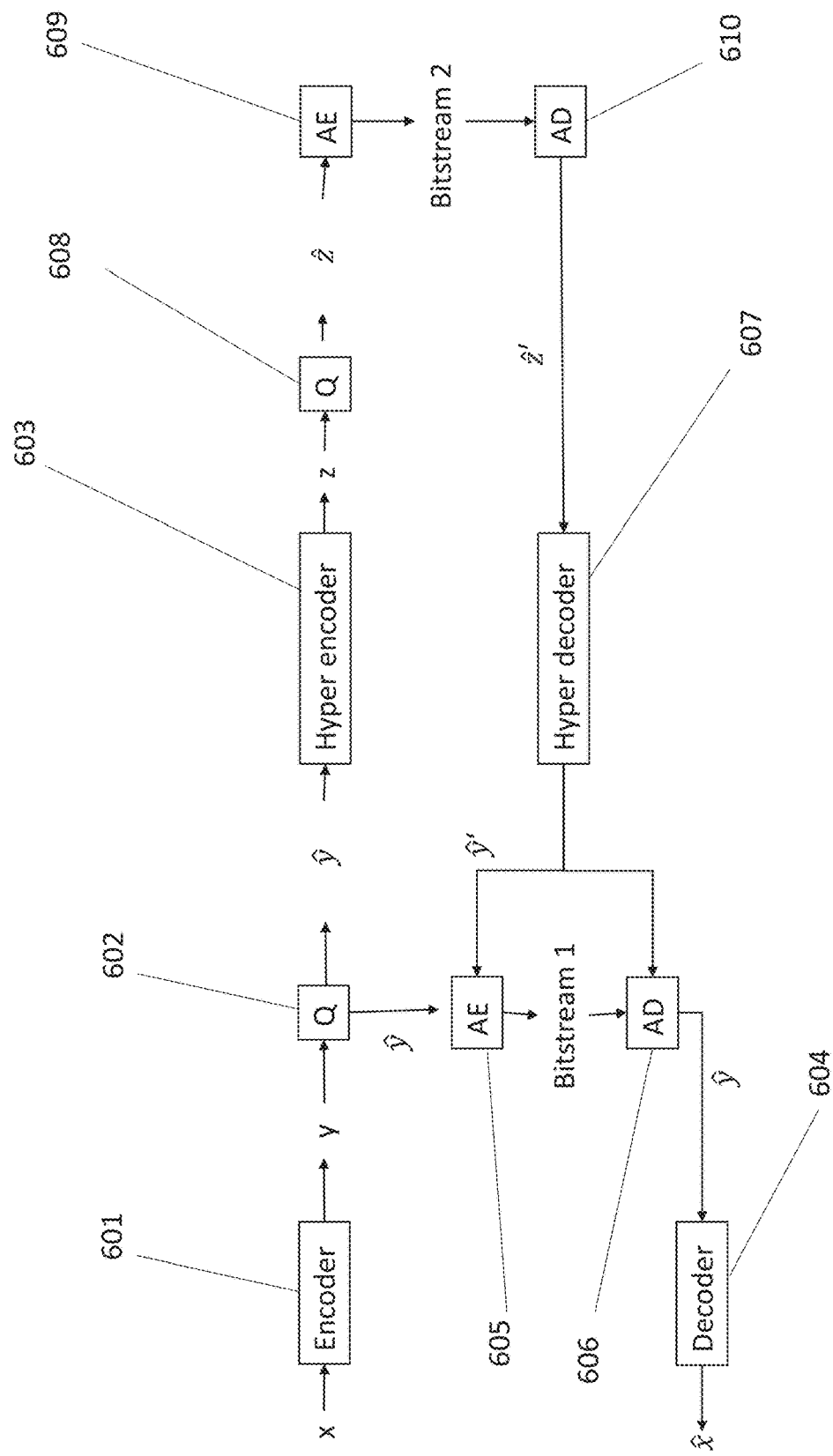
FIG. 6 is a block diagram of an encoder and a decoder in line with a variational auto encoder (VAE) framework.

The VAE framework can be considered as a nonlinear transforming coding model. The transforming process can be mainly divided into four parts. This is exemplified in FIG. 6 showing a VAE framework.

The transforming process can be mainly divided into four parts: FIG. 6 exemplifies the VAE framework. In FIG. 6, the encoder 601 maps an input image x into a latent representation (denoted by y) via the function y=f (x). This latent representation may also be referred to as a part of or a point within a "latent space" in the following. The function f( ) is a transformation function that converts the input signal x into a more compressible representation y. The quantizer 602 transforms the latent representation y into the quantized latent representation ŷ with (discrete) values by ŷ=Q(y), with Q representing the quantizer function. The entropy model, or the hyper encoder/decoder (also known as hyperprior) 603 estimates the distribution of the quantized latent representation y to get the minimum rate achievable with a lossless entropy source coding.

The latent space can be understood as a representation of compressed data in which similar data points are closer together in the latent space. Latent space is useful for learning data features and for finding simpler representations of data for analysis.

The quantized latent representation T, ŷ and the side information ẑ of the hyperprior 3 are included into a bitstream 2 (are binarized) using arithmetic coding (AE).

Furthermore, a decoder 604 is provided that transforms the quantized latent representation to the reconstructed image x̂, x̂=g(ŷ). The signal z is the estimation of the input image x. It is desirable that x is as close to x̂ as possible, in other words the reconstruction quality is as high as possible. However, the higher the similarity between x̂ and x, the higher the amount of side information necessary to be transmitted. The side information includes bitstream1 and bitstream2 shown in FIG. 6, which are generated by the encoder and transmitted to the decoder. Normally, the higher the amount of side information, the higher the reconstruction quality. However, a high amount of side information means that the compression ratio is low. Therefore, one purpose of the system described in FIG. 6 is to balance the reconstruction quality and the amount of side information conveyed in the bitstream.

In FIG. 6 the component AE 605 is the Arithmetic Encoding module, which converts samples of the quantized latent representation ŷ and the side information ẑ into a binary representation bitstream 1. The samples of ŷ and ẑ might for example comprise integer or floating point numbers. One purpose of the arithmetic encoding module is to convert (via the process of binarization) the sample values into a string of binary digits (which is then included in the bitstream that may comprise further portions corresponding to the encoded image or further side information).

The arithmetic decoding (AD) 606 is the process of reverting the binarization process, where binary digits are converted back to sample values. The arithmetic decoding is provided by the arithmetic decoding module 606.

It is noted that the present disclosure is not limited to this particular framework. Moreover the present disclosure is not restricted to image or video compression, and can be applied to object detection, image generation, and recognition systems as well.

In FIG. 6 there are two sub networks concatenated to each other. A subnetwork in this context is a logical division between the parts of the total network. For example, in FIG. 6 the modules 601, 602, 604, 605 and 606 are called the "Encoder/Decoder" subnetwork. The "Encoder/Decoder" subnetwork is responsible for encoding (generating) and decoding (parsing) of the first bitstream "bitstream1". The second network in FIG. 6 comprises modules 603, 608, 609, 610 and 607 and is called "hyper encoder/decoder" subnetwork. The second subnetwork is responsible for generating the second bitstream "bitstream2". The purposes of the two subnetworks are different.

The first subnetwork is responsible for:
the transformation 601 of the input image x into its latent representation y (which is easier to compress that x),
quantizing 602 the latent representation y into a quantized latent representation ŷ,
compressing the quantized latent representation ŷ using the AE by the arithmetic encoding module 605 to obtain bitstream "bitstream 1",".
parsing the bitstream 1 via AD using the arithmetic decoding module 606, and
reconstructing 604 the reconstructed image (z) using the parsed data.

The purpose of the second subnetwork is to obtain statistical properties (e.g. mean value, variance and correlations between samples of bitstream 1) of the samples of "bitstream1", such that the compressing of bitstream 1 by first subnetwork is more efficient. The second subnetwork generates a second bitstream "bitstream2", which comprises the said information (e.g. mean value, variance and correlations between samples of bitstream1).

The second network includes an encoding part which comprises transforming 603 of the quantized latent representation y into side information z, quantizing the side information z into quantized side information z, and encoding (e.g. binarizing) 609 the quantized side information ẑ into bitstream2. In this example, the binarization is performed by an arithmetic encoding (AE). A decoding part of the second network includes arithmetic decoding (AD) 610, which transforms the input bitstream2 into decoded quantized side information ẑ'. The ẑ' might be identical to ẑ, since the arithmetic encoding end decoding operations are lossless compression methods. The decoded quantized side information ẑ' is then transformed 607 into decoded side information ŷ'. ŷ' represents the statistical properties of 9 (e.g. mean value of samples of ŷ, or the variance of sample values or like). The decoded latent representation ŷ' is then provided to the above-mentioned Arithmetic Encoder 605 and Arithmetic Decoder 606 to control the probability model of ŷ.

The FIG. 6 describes an example of VAE (variational auto encoder), details of which might be different in different implementations. For example in a specific implementation additional components might be present to more efficiently obtain the statistical properties of the samples of bitstream 1. In one such implementation a context modeler might be present, which targets extracting cross-correlation information of the bitstream 1. The statistical information provided by the second subnetwork might be used by AE (arithmetic encoder) 605 and AD (arithmetic decoder) 606 components.

FIG. 6 depicts the encoder and decoder in a single figure. As is clear to those skilled in the art, the encoder and the decoder may be, and very often are, embedded in mutually different devices.

Figure 7:
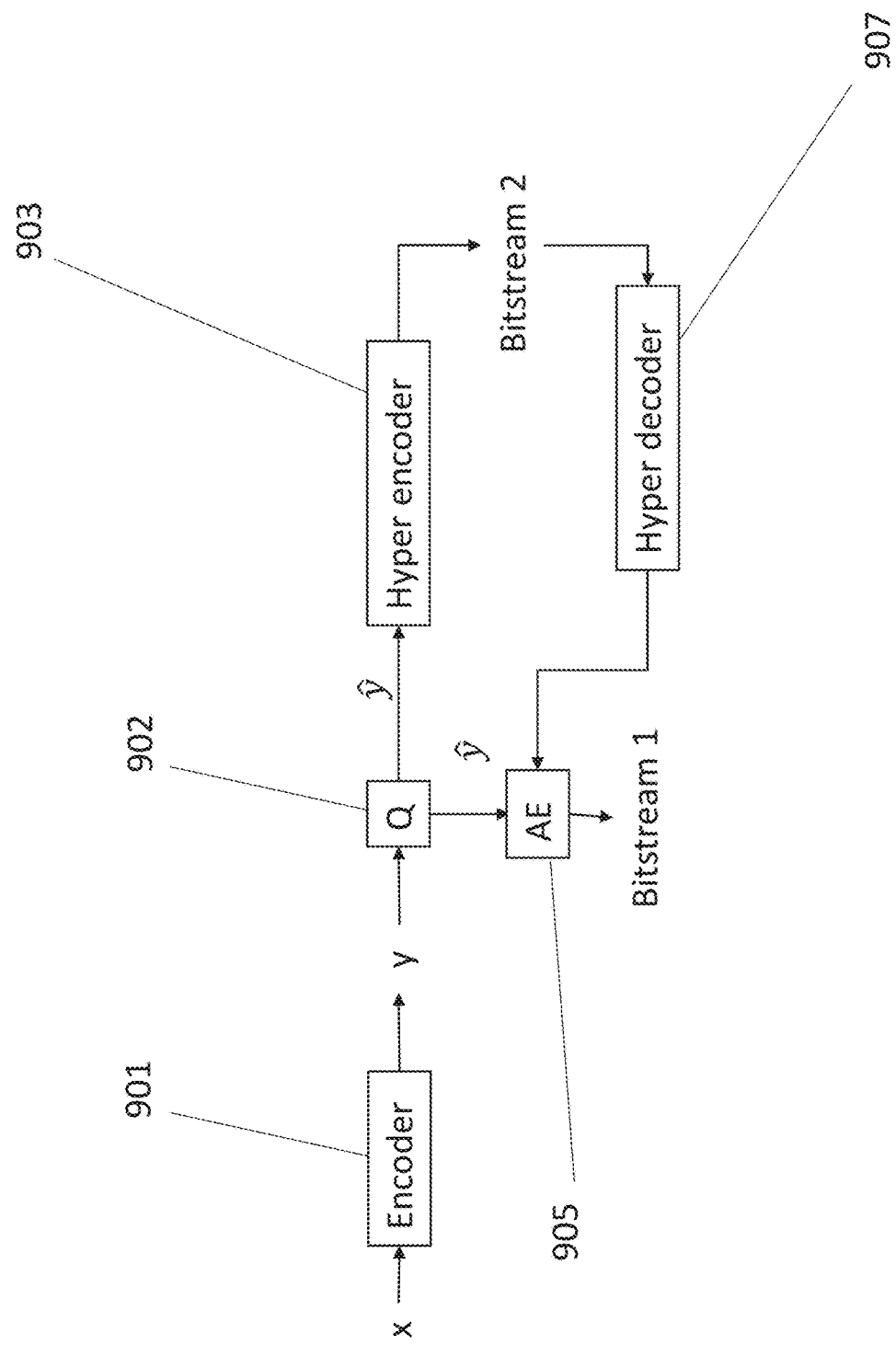
FIG. 7 is a block diagram of an encoder with respective components according to FIG. 6 in accordance with one embodiment.
Figure 8:
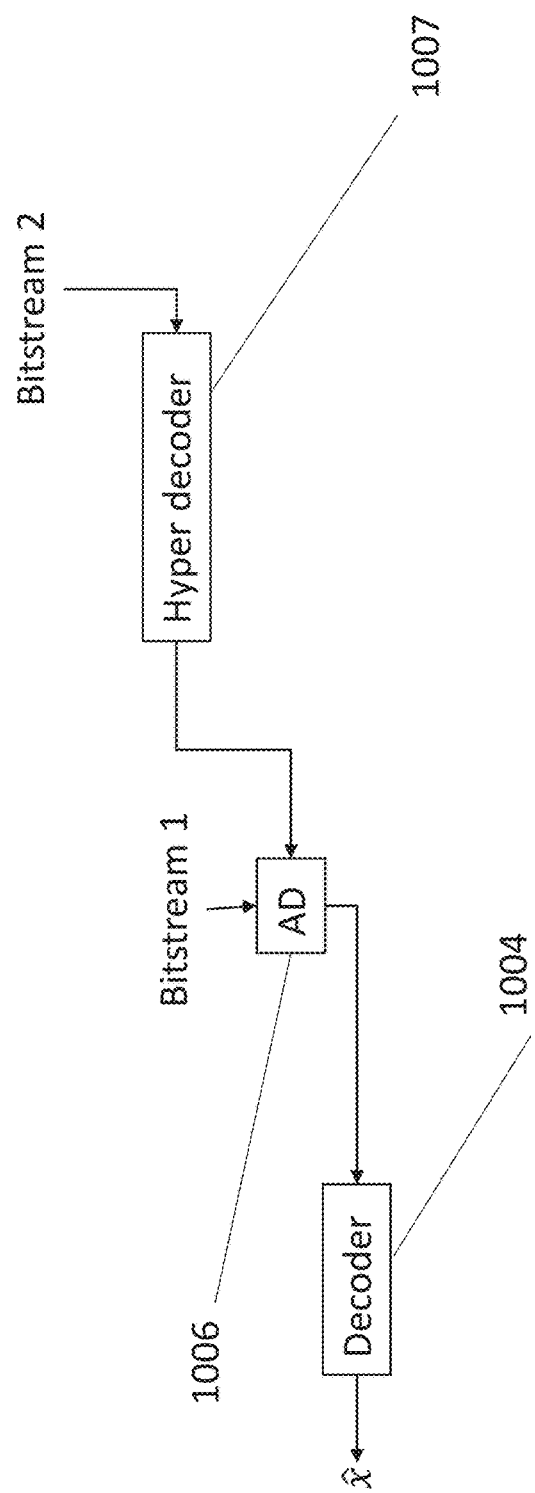
FIG. 8 is a block diagram of a decoder with respective components according to FIG. 6 in accordance with one embodiment.

FIG. 7 depicts the encoder and FIG. 8 depicts the decoder components of the VAE framework in isolation. As input, the encoder receives, according to some embodiments, a picture. The input picture may include one or more channels, such as color channels or other kind of channels, e.g. depth channel or motion information channel, or the like. The output of the encoder (as shown in FIG. 7) is a bitstream1 and a bitstream2. The bitstream1 is the output of the first sub-network of the encoder and the bitstream2 is the output of the second subnetwork of the encoder.

Similarly, in FIG. 8, the two bitstreams, bitstream1 and bitstream2, are received as input and ẑ, which is the reconstructed (decoded) image, is generated at the output.

As indicated above, the VAE can be split into different logical units that perform different actions. This is exemplified in FIGS. 7 and 8 so that FIG. 7 depicts components that participate in the encoding of a signal, like a video and provided encoded information. This encoded information is then received by the decoder components depicted in FIG. 8 for encoding, for example. It is noted that the components of the encoder and decoder denoted with numerals 9xx and 10xx may correspond in their function to the components referred to above in FIG. 6 and denoted with numerals 6xx.

Specifically, as is seen in FIG. 7, the encoder comprises the encoder 901 that transforms an input x into a signal y which is then provided to the quantizer 902. The quantizer 902 provides information to the arithmetic encoding module 905 and the hyper encoder 903. The hyper encoder 903 provides the bitstream2 already discussed above to the hyper decoder 907 that in turn signals information to the arithmetic encoding module 605.

The output of the arithmetic encoding module is the bitstream1. The bitstream1 and bitstream2 are the output of the encoding of the signal, which are then provided (transmitted) to the decoding process.

Although the unit 901 is called "encoder", it is also possible to call the complete subnetwork described in FIG. 7 as "encoder". The process of encoding in general means the unit (module) that converts an input to an encoded (e.g. compressed) output. It can be seen from FIG. 7, that the unit 901 can be actually considered as a core of the whole subnetwork, since it performs the conversion of the input x into y, which is the compressed version of the x. The compression in the encoder 901 may be achieved, e.g. by applying a neural network, or in general any processing network with one or more layers. In such network, the compression may be performed by cascaded processing including downsampling which reduces size and/or number of channels of the input. Thus, the encoder may be referred to, e.g. as a neural network (NN) based encoder, or the like.

The remaining parts in the figure (quantization unit, hyper encoder, hyper decoder, arithmetic encoder/decoder) are all parts that either improve the efficiency of the encoding process or are responsible for converting the compressed output y into a series of bits (bitstream). Quantization may be provided to further compress the output of the NN encoder 901 by a lossy compression. The AE 905 in combination with the hyper encoder 903 and hyper decoder 907 used to configure the AE 905 may perform the binarization which may further compress the quantized signal by a lossless compression. Therefore, it is also possible to call the whole subnetwork in FIG. 7 an "encoder".

A majority of Deep Learning (DL) based image/video compression systems reduce dimensionality of the signal before converting the signal into binary digits (bits). In the VAE framework for example, the encoder, which is a non-linear transform, maps the input image x into y, where y has a smaller width and height than x. Since the y has a smaller width and height, hence a smaller size, the (size of the) dimension of the signal is reduced, and, hence, it is easier to compress the signal y. It is noted that in general, the encoder does not necessarily need to reduce the size in both (or in general all) dimensions. Rather, some exemplary implementations may provide an encoder which reduces size only in one (or in general a subset of) dimension.

Figure 9:
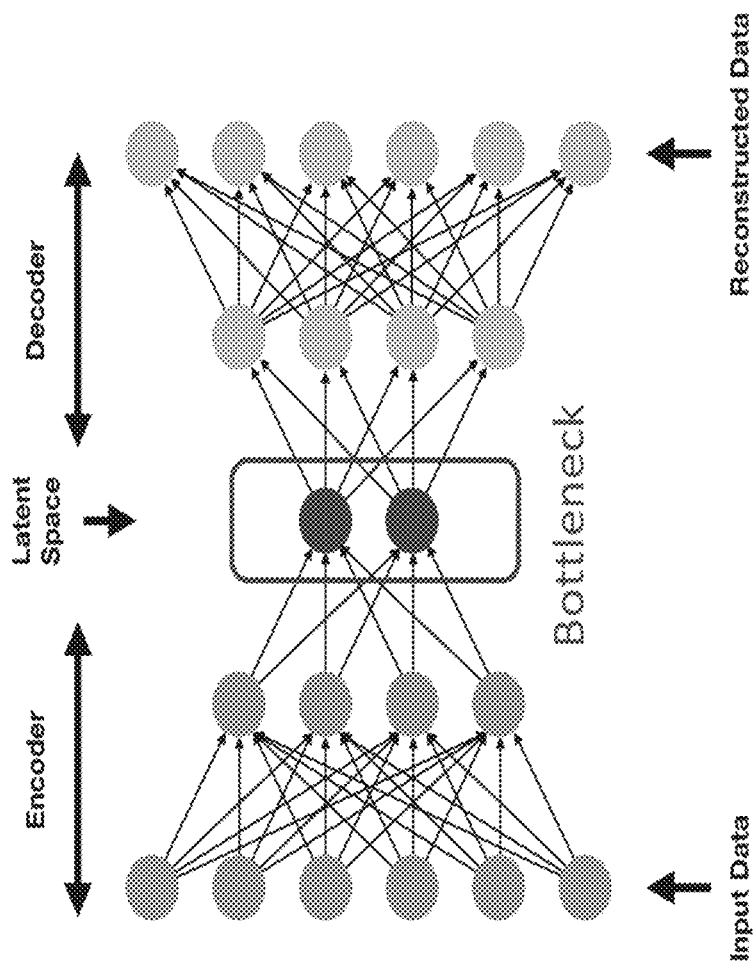
FIG. 9 illustrates the compression of input data by the encoder, and the decompression of data by the decoder, with the compressed data represented by the latent space.

The general principle of compression is exemplified in FIG. 9. The latent space, which is the output of the encoder and input of the decoder, represents the compressed data. It is noted that the size of the latent space may be much smaller than the input signal size. Here, the term size may refer to resolution, e.g. to a number of samples of the feature map(s) output by the encoder. The resolution may be given as a product of number of samples per each dimension (e.g. width× height× number of channels of an input image or of a feature map).

The reduction in the size of the input signal is exemplified in FIG. 9, which represents a deep-learning based encoder and decoder. In FIG. 9, the input image x corresponds to the input Data, which is the input of the encoder. The transformed signal y corresponds to the Latent Space, which has a smaller dimensionality or size in at least one dimension than the input signal. Each column of circles represent a layer in the processing chain of the encoder or decoder. The number of circles in each layer indicate the size or dimensionality of the signal at that layer.

One can see from FIG. 9 that the encoding operation corresponds to a reduction in the size of the input signal, whereas the decoding operation corresponds to a reconstruction of the original size of the image.

One of the methods for reduction of the signal size is downsampling.

Downsampling is a process where the sampling rate of the input signal is reduced. For example if the input image has a size of h and w, and the output of the downsampling is h2 and w2, at least one of the following holds true:

h2<h
w2<w

The reduction in the signal size usually happens step by step along the chain of processing layers, not all at once. For example if the input image x has dimensions (or size of dimensions) of h and w (indicating the height and the width), and the latent space y has dimensions h/16 and w/16, the reduction of size might happen at 4 layers during the encoding, wherein each layer reduces the size of the signal by a factor of 2 in each dimension.

Some deep learning based video/image compression methods employ multiple downsampling layers. As an example the VAE framework, FIG. 4, utilizes 6 downsampling layers that are marked with 801 to 806. The layers that include downsampling is indicated with the downward arrow in the layer description. The layer description "Conv Nx5×5/2↓" means that the layer is a convolution layer, with N channels and the convolution kernel is 5×5 in size. As stated, the 2↓ means that a downsampling with a factor of 2 is performed in this layer. Downsampling by a factor of 2 results in one of the dimensions of the input signal being reduced by half at the output. In FIG. 4, the 2↓ indicates that both width and height of the input image is reduced by a factor of 2. Since there are 6 downsampling layers, if the width and height of the input image 814 (also denoted with x) is given by w and h, the output signal ẑ 813 is has width and height equal to w/64 and h/64 respectively. Modules denoted by AE and AD are arithmetic encoder and arithmetic decoder, which are explained above already with respect to FIGS. 6 to 8. The arithmetic encoder and decoder are specific implementations of entropy coding. AE and AD (as part of the component 813 and 815) can be replaced by other means of entropy coding. In information theory, an entropy encoding is a lossless data compression scheme that is used to convert the values of a symbol into a binary representation which is a revertible process. Also, the "Q" in the figure corresponds to the quantization operation that was also referred to above in relation to FIG. 6 and is further explained above in the section "Quantization". Also, the quantization operation and a corresponding quantization unit as part of the component 813 or 815 is not necessarily present and/or can be replaced with another unit.

In FIG. 4, there is also shown the decoder comprising upsampling layers 807 to 812. A further layer 820 is provided between the upsampling layers 811 and 810 in the processing order of an input that is implemented as convolutional layer but does not provide an upsampling to the input received. A corresponding convolutional layer 830 is also shown for the decoder. Such layers can be provided in NNs for performing operations on the input that do not alter the size of the input but change specific characteristics. However, it is not necessary that such a layer is provided.

When seen in the processing order of bitstream2 through the decoder, the upsampling layers are run through in reverse order, i.e. from upsampling layer 812 to upsampling layer 807. Each upsampling layer is shown here to provide an upsampling with an upsampling ratio of 2, which is indicated by the ↑. It is, of course, not necessarily the case that all upsampling layers have the same upsampling ratio and also other upsampling ratios like 3, 4, 8 or the like may be used. The layers 807 to 812 are implemented as convolutional layers (conv). Specifically, as they may be intended to provide an operation on the input that is reverse to that of the encoder, the upsampling layers may apply a deconvolution operation to the input received so that its size is increased by a factor corresponding to the upsampling ratio. However, the present disclosure is not generally limited to deconvolution and the upsampling may be performed in any other manner such as by bilinear interpolation between two neighboring samples, or by nearest neighbor sample copying, or the like.

In the first subnetwork, some convolutional layers (801 to 803) are followed by generalized divisive normalization (GDN) at the encoder side and by the inverse GDN (IGDN) at the decoder side. In the second subnetwork, the activation function applied is ReLu. It is noted that the present disclosure is not limited to such implementation and in general, other activation functions may be used instead of GDN or ReLu.

Figure 10:
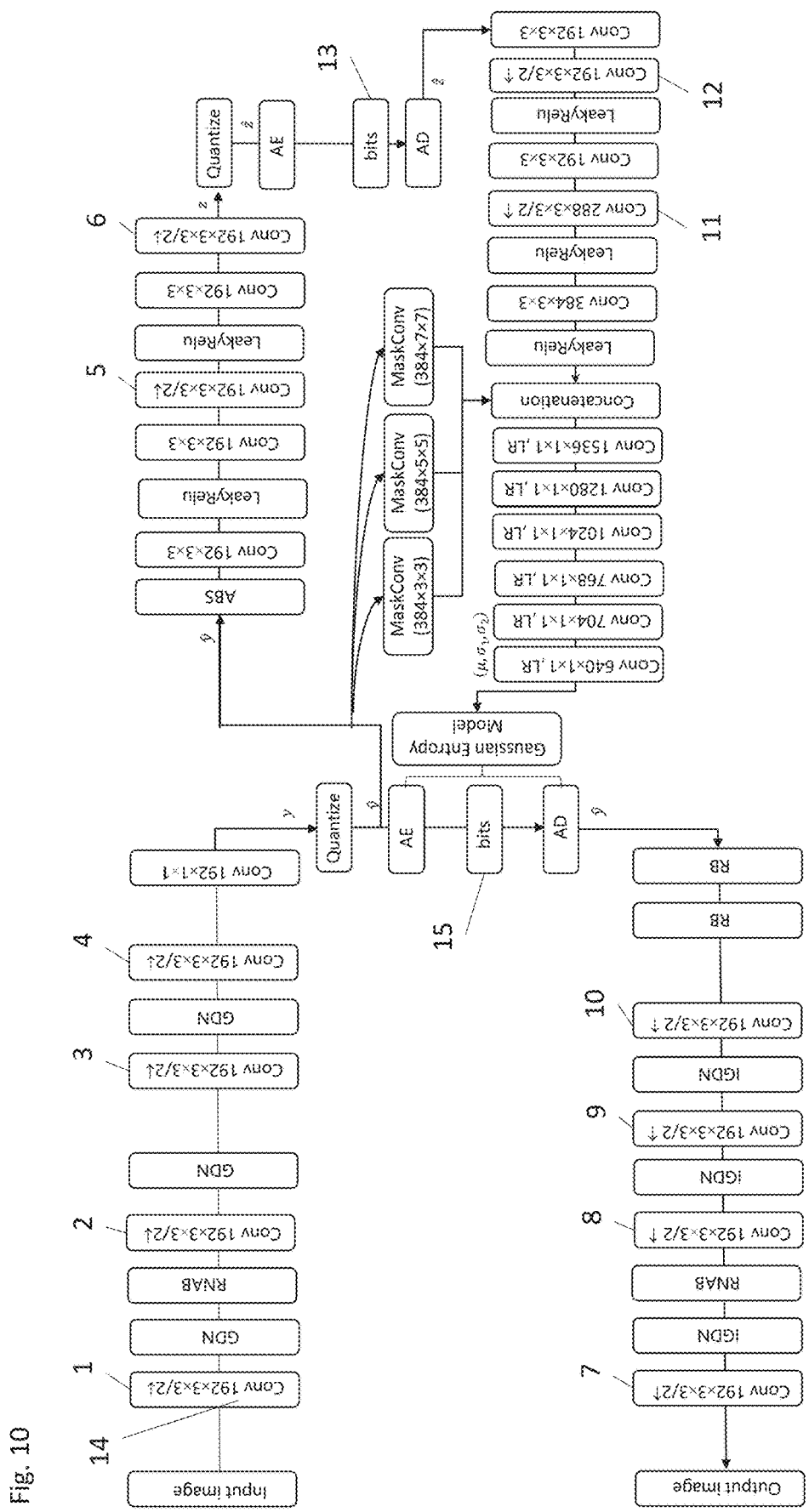
FIG. 10 is a schematic drawing illustrating another example of a variational autoencoder architecture including a hyperprior model similar to FIG. 4.

FIG. 10 shows another example of a VAE-based encoder-decoder structure, similar to the one of FIG. 4. In FIG. 10, it is shown that the encoder and the decoder (together denoted with 1200) may comprise a number of downsampling and upsampling layers. Each layer applies a downsampling by a factor of 2 or an upsampling by a factor of 2. Furthermore, the encoder and the decoder can comprise further components, like a generalized divisive normalization (GDN) 1201 at the encoder side and by the inverse GDN (IGDN) 1202 at the decoder side. Furthermore, both the encoder and the decoder may comprise one or more ReLus, specifically, leaky ReLus 1203. There can also be provided a factorized entropy model 1205 at the encoder and a Gaussian entropy model 1206 at the decoder. Moreover, a plurality of convolution masks 1204 may be provided. Moreover, the encoder includes, in the embodiments of FIG. 10, a universal quantizer (UnivQuan) 1207 and the decoder comprises an attention module 1208.

The total number of downsampling operations and strides defines conditions on the input channel size, i.e. the size of the input to the neural network.

Here, if input channel size is an integer multiple of 64=2×2×2×2×2×2, then the channel size remains integer after all proceeding downsampling operations. By applying corresponding upsampling operations in the decoder during the upsampling, and by applying the same rescaling at the end of the processing of the input through the upsampling layers, the output size is again identical to the input size at the encoder.

Thereby, a reliable reconstruction of the original input is obtained.

Receptive Field:

Within the context of neural networks, the receptive field is defined as the size of the region in the input that produces a sample at the output feature map. Basically, it is a measure of association of an output feature (of any layer) with the input region (patch). It is noted that the concept of receptive fields applies to local operations (i.e. convolution, pooling, or the like). For example, a convolution operation with a kernel of size 3×3 has a receptive field of 3×3 samples in the input layer. In this example, 9 input samples are used to obtain 1 output sample by the convolution node.

Total Receptive Field:

The total receptive field (TRF) refers to a set of input samples that are used to obtain a specified set of output samples by applying one or more processing layers, for example, of a neural network.

Figure 11:
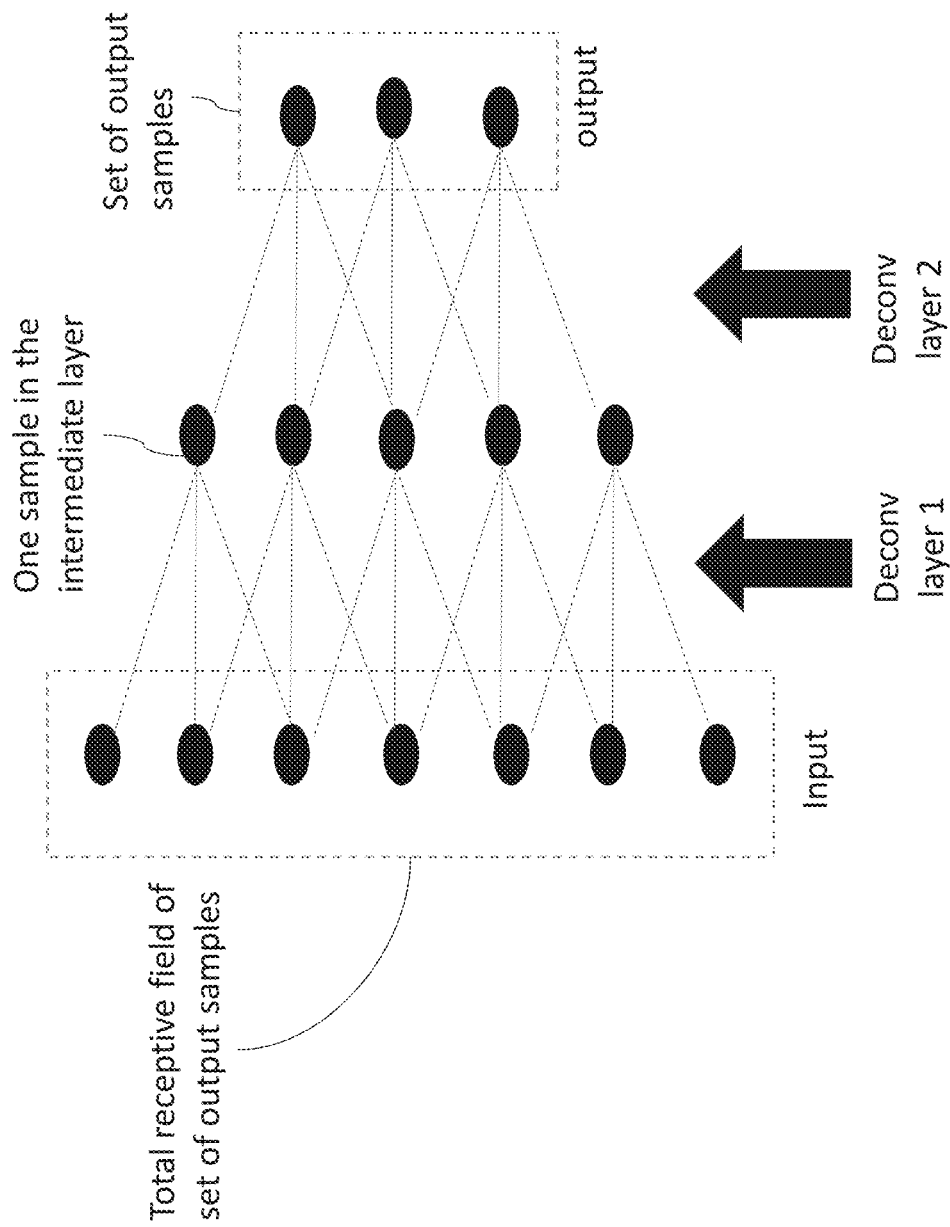
FIG. 11 illustrates the total receptive field including all input samples needed to generate the output samples.

The total receptive field can be exemplified by FIG. 11. In FIG. 11, the processing of a one dimensional input (the 7 samples on the left of the figure) with 2 consecutive transposed convolution (also called as deconvolution) layers are exemplified. The input is processed from left to right, i.e. "deconv layer 1" processes the input first, whose output is processed by "deconv layer 2". In the example, the kernels have a size of 3 in both deconvolution layers. This means that 3 input samples are necessary to obtain 1 output sample at each layer. In the example, the set of output samples are marked inside a dashed rectangle and include 3 samples. Due to the size of the deconvolution kernel, 7 samples are necessary at the input to obtain an output set of samples comprising 3 output samples. Therefore, the total receptive field of the marked 3 output samples is the 7 samples at the input.

In FIG. 11, there are 7 input samples, 5 intermediate output samples, and 3 output samples. The reduction in the number of samples is due to the fact that, since the input signal is finite (not extending to infinity in each direction), at the borders of the input there are "missing samples". In other words, since a deconvolution operation requires 3 input samples corresponding to each output sample, only 5 intermediate output samples can be generated, if the number of input samples is 7. In fact, the amount of output samples that can be generated is (k−1) samples less than the number of input samples, where k is the kernel size. Since in FIG. 11 the number of input samples is 7, after the first deconvolution with kernel size 3, the number of intermediate samples is 5. After the second deconvolution with kernel size 3, the number of output samples is 3.

As it can be observed in FIG. 11, the total receptive field of the 3 output samples are 7 samples at the input. The size of the total receptive field increases by successive application of processing layers with kernel size greater than 1. In general, the total receptive field of a set of output samples are calculated by tracing the connections of each node starting from the output layer till the input layer, and then finding the union of all of the samples in the input that are directly or indirectly (via more than 1 processing layer) connected to the set of output samples. In FIG. 11 for example, each output sample is connected to 3 samples in a previous layer. The union set includes 5 samples in the intermediate output layer, which are connected to 7 samples in the input layer.

Figure 12:
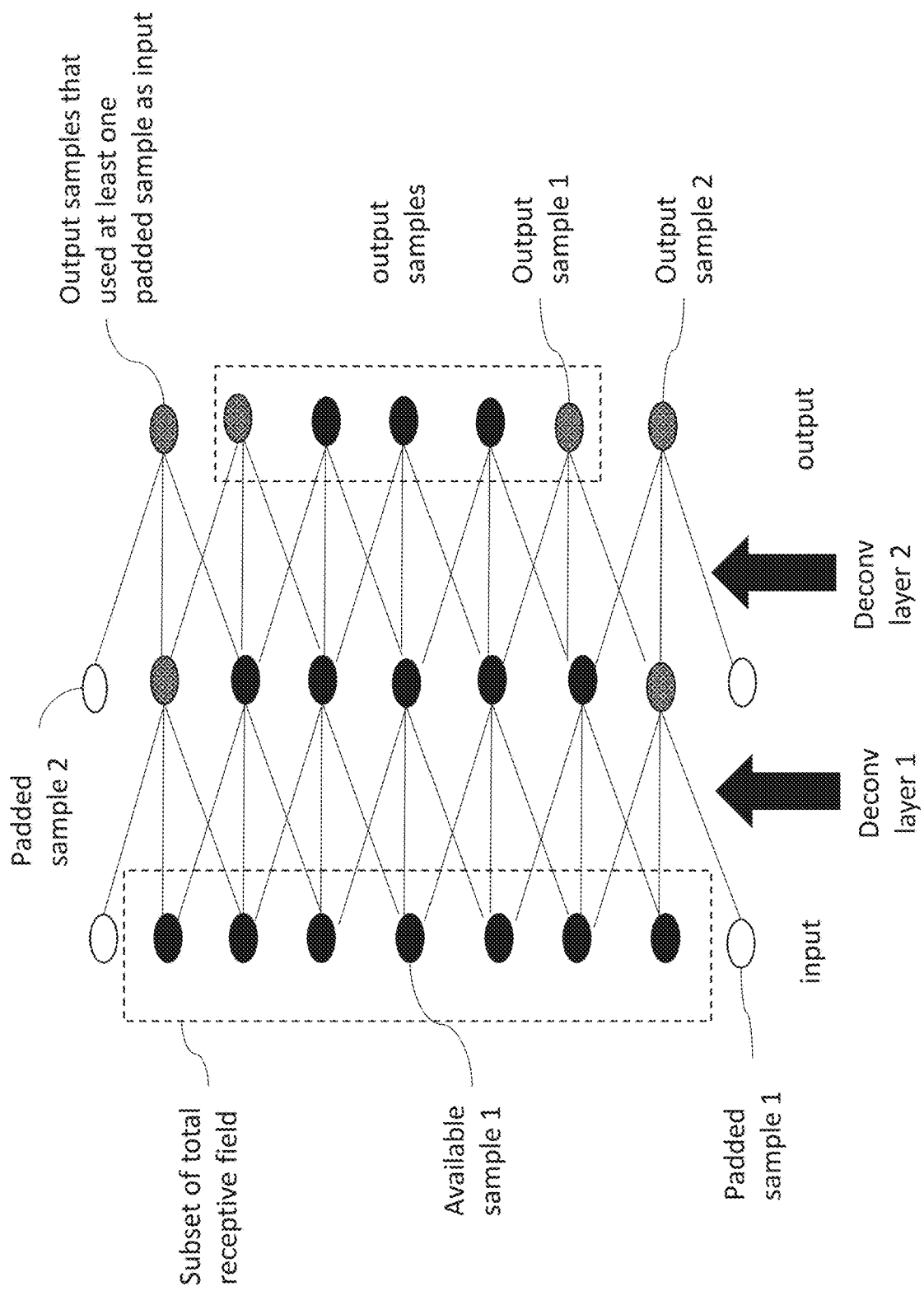
FIG. 12 illustrates the subset of the total receptive field, in which case the output samples are generated by a lower amount of samples (subset) as the number of samples of the total receptive field. Padding of samples may be needed.

It is sometimes desirable to keep the number of samples the same after each operation (convolution or deconvolution or other). In such a case, one can apply padding at the boundaries of the input to compensate for "missing samples". FIG. 12 illustrates this case, when the number of samples are kept equal. It is noted that the present disclosure is applicable to both cases, as padding is not a mandatory operation for convolution, deconvolution, or any other processing layer.

This is not to be confused with downsampling. In the process of downsampling, for every M samples there are N samples at the output and N<M. The difference is that M is usually much smaller than the number of inputs. In FIG. 11, there is no downsampling, rather the reduction in the number of samples results from the fact that the size of the input is not infinite and there are "missing samples" at the input. For example, if the number of input samples were 100, since the kernel size is k=3, the number of output samples would have been 100−(k−1)−(k−1)=96, when two convolution layers are used. In contrast, if both deconvolution layers were performing downsampling (with a ratio of M=2 and N=1), then the number of output samples would have been $$\text{ceil}\left(\frac{\text{ceil}\left(\frac{(100-(k-1))}{2}\right)-(k-1)}{2}\right)=22.$$

Figure 13:
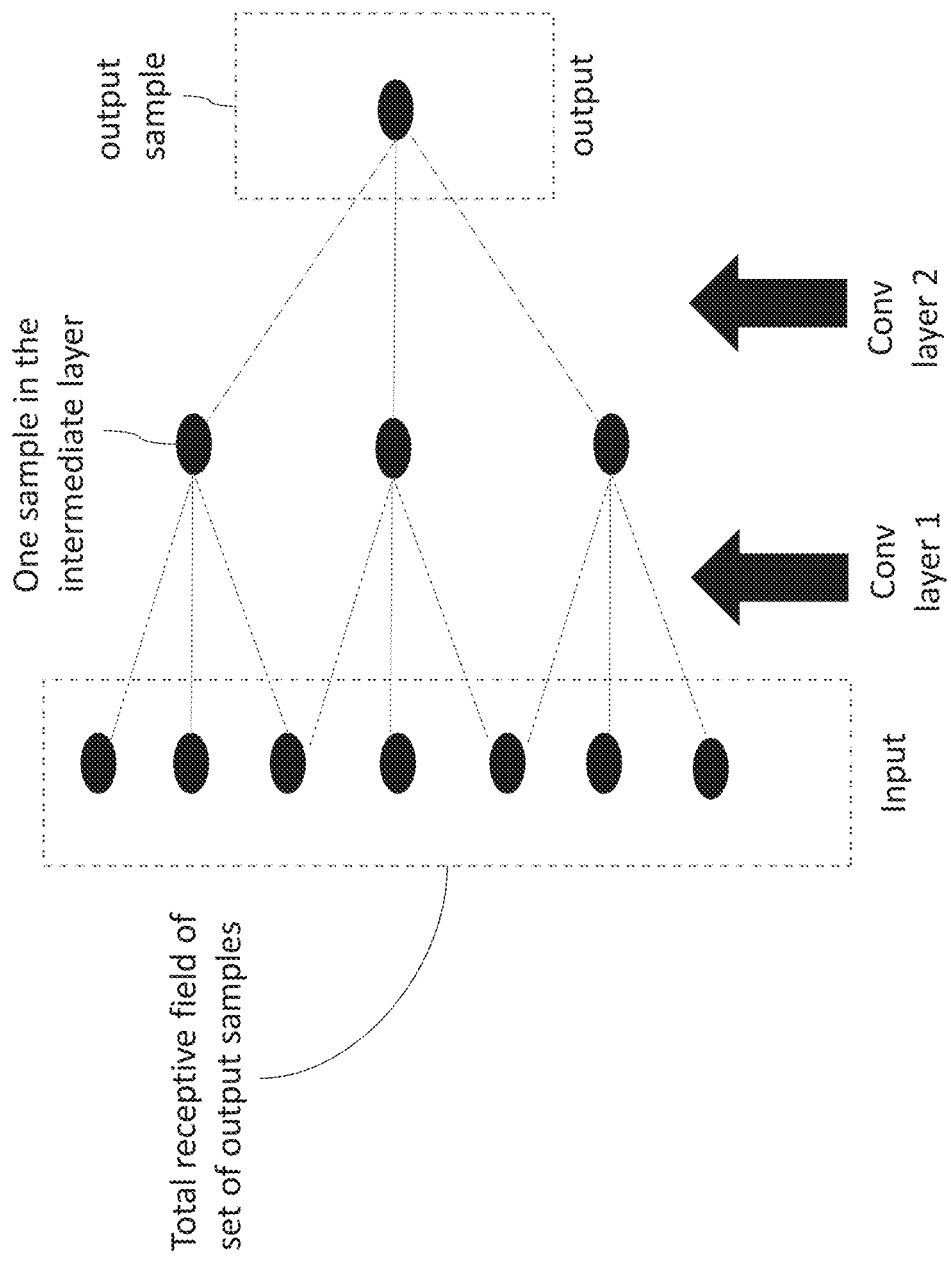
FIG. 13 illustrates downsampling of input samples to one output sample using two convolutional layers.

FIG. 13 exemplifies downsampling using 2 convolution layers with a downsampling ratio of 2 (N=1 and M=2). In this example, 7 input samples become 3 due to the combined effect of downsampling and "missing samples" at the boundary. The number of output samples can be calculated after each processing layer using the equation:

$$\text{ceil}\left(\frac{(100-(k-1))}{r}\right),$$

where k is the kernel size and r is the downsampling ratio.

The operation of convolution and deconvolution (i.e. transposed convolution) are from the mathematical expression point of view identical. The difference stems from the fact that the deconvolution operation assumes that a previous convolution operation took place. In other words, deconvolution is the process of filtering a signal to compensate for a previously applied convolution. The goal of deconvolution is to recreate the signal as it existed before the convolution took place. The present disclosure applies to both convolution and deconvolution operations (and in fact any other operation where the kernel size is greater than 1 as explained later on).

Figure 14:
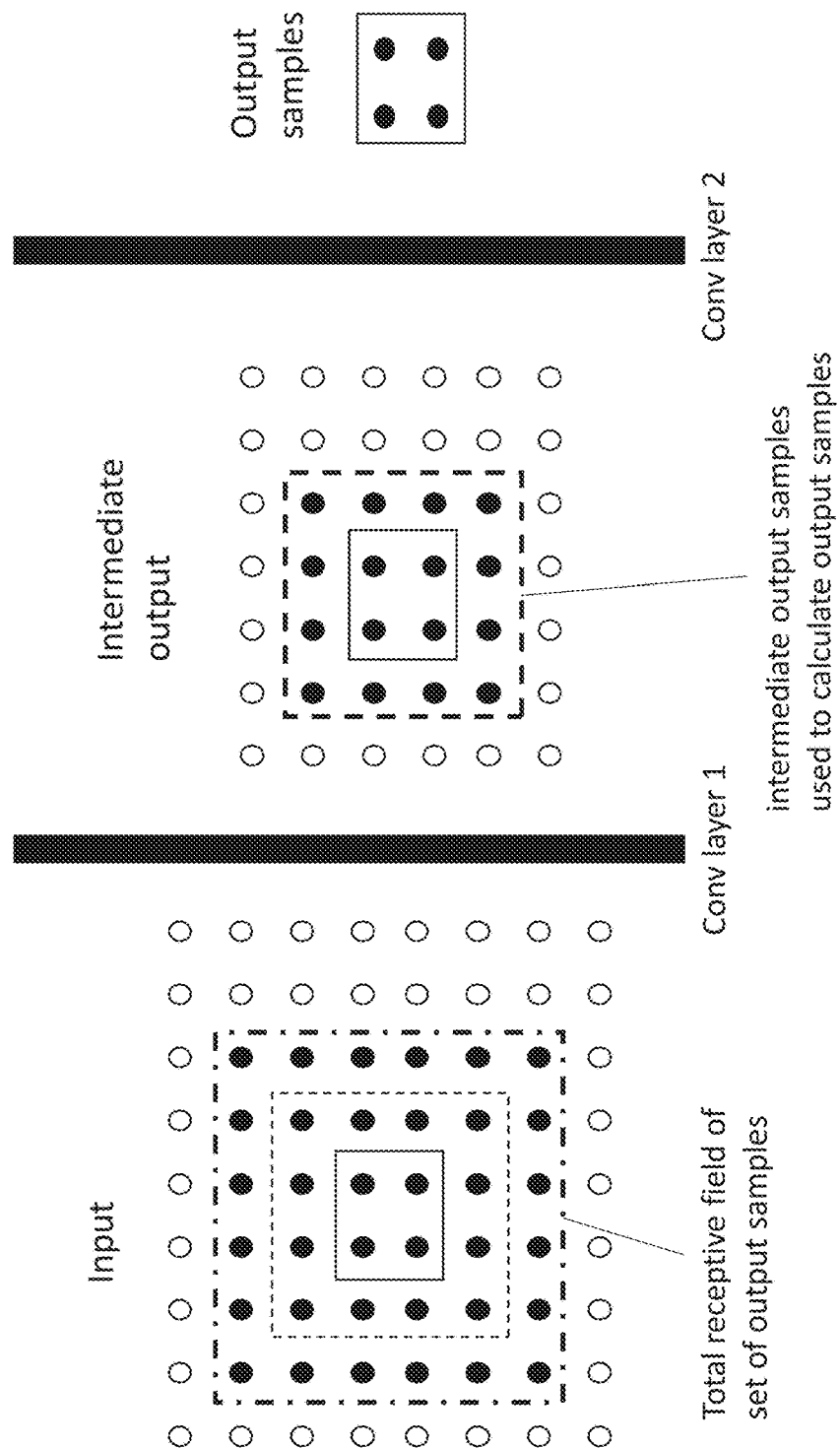
FIG. 14 exemplifies calculating the total receptive field for a set of 2×2 output samples using two convolutional layers with a 3×3 kernel size.

FIG. 14 shows another example to explain how to calculate the total receptive field. In FIG. 14, a two dimensional input sample array is processed by 2 convolution layers with kernel sizes of 3×3 each. After the application of the 2 deconvolution layers, the output array is obtained. The set (array) of output samples is marked with solid rectangle ("output samples") and comprise 2×2=4 samples. The total receptive field of this set of output samples comprises 6×6=36 samples. The total receptive field can be calculated as:

each output sample is connected to 3×3 samples in the intermediate output. The union of all of the samples in the intermediate output that are connected to the set of output samples comprises 4×4=16 samples.

each of the 16 samples in the intermediate output are connected to 3×3 samples in the input. The union of all of the samples in the input that are connected to the 16 samples in the intermediate output comprises 6×6=36 samples. Accordingly, the total receptive field of the 2×2 output samples is 36 samples at the input.

In image and video compression systems, compressing and decompressing of an input image that has a very large size is usually performed by division of the input image into multiple parts. VVC and HEVC employ such division methods, for example, by partitioning the input image into tiles or wavefront processing units.

Figure 15:
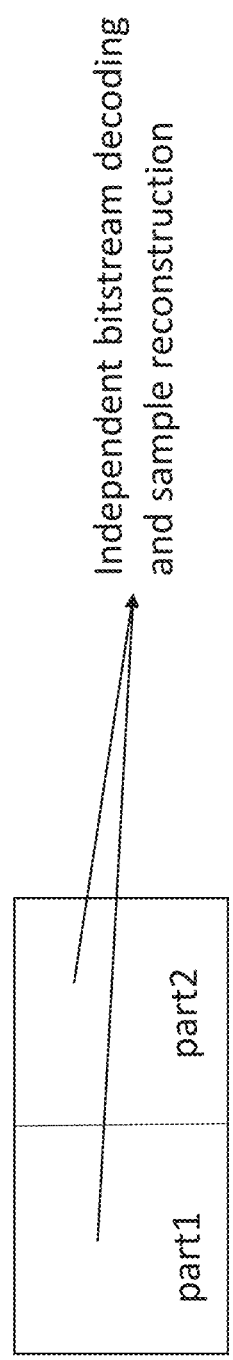
FIG. 15 illustrates an example of parallel processing where a picture is divided into two tiles, with the decoding of the respective bitstreams and the sample reconstruction being performed both independently.

When tiles are used in traditional video coding systems, an input image is usually divided into multiple parts of rectangular shape. FIG. 15 exemplifies one such partitioning. In FIG. 15, part 1 and part 2 may be processed independently of each other, and the bitstreams for decoding of each part is encapsulated into independently decodable units. As a result, the decoder can parse (obtain the syntax elements necessary for sample reconstruction) each bitstream (corresponding to part 1 and part 2) independently and can reconstruct the samples of each part independently as well.

Figure 16:
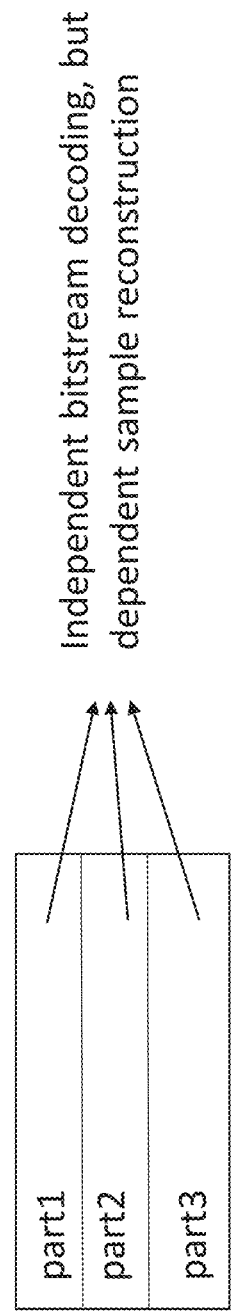
FIG. 16 illustrates an example of parallel processing where a coding tree block (CTB) is divided into slices (rows) where the bitstream of each slice is decoded (nearly) independently, but not the sample reconstruction of the slices.

In wavefront parallel processing illustrated in FIG. 16, each part usually consists of 1 row of Coding tree blocks (CTB). The difference between wavefront parallel processing and tiles is that, in wavefront parallel processing, the bitstream corresponding to each part can be decoded almost independently of each other. However, the sample reconstruction cannot be performed independently, since the sample reconstruction of each part still has dependencies between the parts. In other words, wavefront parallel processing makes the parsing process independent, while keeping the sample reconstruction dependent.

Both wavefront and tiles are technologies to make it possible to perform a whole or a part of the decoding operation independently of each other. The benefit of independent processing is:

More than 1 identical processing cores can be used to process the whole image. Hence, the speed of processing can be increased.

If the capability of a processing core is not enough to process a big image, the image can be split into multiple parts, which require less resources for the processing. In this case, a less capable processing unit can process each part, even if it cannot process the whole image due to resource limitation.

In order to meet the demands in processing speed and/or memory, HEVC/VVC, uses a processing memory that is large enough to handle encoding/decoding of a whole frame. Top of the line GPU cards are used to achieve this. In the case of traditional codecs, such as HEVC/VVC, the memory requirement for processing the whole frame is usually not a big concern, as the whole frame is divided into blocks and each block is processed one by one. However, the processing speed is a major concern. Therefore, if a single processing unit is used to process a whole frame, the speed of the processing unit must be very high, and hence the processing unit is usually very expensive.

NN-based video compression algorithms on the other hand consider the whole frame in encoding/decoding, instead of block-based in conventional hybrid coder. The memory requirement is too high for processing via NN-based coding/decoding modules.

In traditional hybrid video encoders and decoders, the amount of necessary memory is proportional to the maximum allowed block size. For example, in VVC the maximum block size is 128×128 samples.

The necessary memory for NN-based video compression is, however, proportional to the size W×H, where W and H denote the width and height of the input/output image. It can be seen that the memory requirement can be extraordinarily high compared to hybrid video coders, since a typical video resolutions include 3840×2160 picture sizes (4K video).

Another problem is, in order to process a large input with a single processing unit (e.g. a CPU or a GPU), the processing unit must be very fast since the unit needs to perform a high amount of operations per unit time. This requires that the unit needs to have a high clock frequency and a high memory bandwidth, which are expensive design criteria for chip manufacturers. In particular, it is not easy to increase memory bandwidth and clock frequency due to physical limitations.

The NN-based video coding algorithms for encoding and/or decoding are in the early development stage, and no consumer device includes an implementation of a VAE that is depicted in FIG. 6. Also, the consumer device costs are very sensitive to the implemented memory.

For NN-based video coding algorithms to become cost efficient so as to be implemented in consumer devices, such as mobile phones, it is therefore necessary to reduce the memory footprint and the required operation frequency of the processing units. Such optimizations are yet to be done.

The present disclosure is applicable both to end-to-end AI codecs and hybrid AI codecs. In Hybrid AI codec, for example, the filtering operation (filtering of the reconstructed picture) can be performed by means of a neural network (NN). The present disclosure applies to such NN-based processing modules. In general, the present disclosure can be applied to a whole or a part of a video compression and decompression process, if at least part of the process includes NN and if such NN includes convolution or transposed convolution operations. For example, the present disclosure is applicable to individual processing tasks as being performed as a processing part by the encoder and/or decoder, including in-loop filtering, post-filtering, and/or prefiltering.

Some embodiments of the present disclosure may provide solution for the above-mentioned problems in terms of enabling a tradeoff between memory resources and computational complexity within an NN-based video encoding-decoding frame work.

The present disclosure employs division of an input into multiple parts and processing each part independently of each other, summarized as follows:
1. Determine N regions in the input space $L_i$, where the union of $L_i$ make up the complete input space. N>1.
2. Process each $L_i$ using NN independently to obtain reconstructed regions $R_i$.
3. Merge $R_i$ to obtain the reconstructed picture where union of $R_i$ make up the complete target output.

The target output is the output reconstructed picture. The size of the output reconstructed picture can be obtained according to an indication in the bitstream. Alternatively, it can be coded in the bitstream explicitly.

In one example, the input space can be the latent space which is obtained according to the bitstream by parsing of the bitstream. The input space can have a matrix form with width=w, height=h and a third dimension (e.g. depth or number of channels) whose size is equal to D.

The N regions $L_i$ are obtained preferably by grouping the input samples into overlapping or non-overlapping sets. The sets preferably comprise samples that are adjacent to each other (not disjoint).

In one example, the Li might be obtained by dividing the input space into N regions, where each region has a size wi, h1 and D, wherein Wi is the width, Hi is the height and D is the depth of the Li. The depth of the Li is equal to the depth of the whole latent space, as it is preferable to divide the input space in the direction of the width and height only.

The processing may be decoding or encoding.

The said neural network (NN) in the exemplary implementations discussed in the following can be:
A network including at least one processing layer where more than 1 input samples are used to obtain an output sample (this is the general condition when the problem addressed in this invention arises).
A network including at least one 1 convolutional (or transposed convolution) layer. In one example, the kernel of the convolution is greater than 1.
A network including at least one pooling layer (max pooling, average pooling etc.).
A decoding network, a hyper decoder network, or an encoding network.
A part (subnetwork) of above.

The said input can be:
A feature map.
An output of a hidden layer.
A latent space feature map. The latent space might be obtained according to a bitstream.
An input image.

First Embodiment

In this exemplary and non-limiting embodiment, a method is provided for reconstructing a picture from a bitstream. The method may comprise obtaining, based on the bitstream, an input set of samples (L, illustrated in FIG. 17) representing the picture. The method includes dividing the input set L into two or more input subsets (e.g. L1, L2 shown in FIG. 17). Then, the method may include determining a size ((h1, w1); (h2, w2)) for each of the two or more input subsets (L1, L2) and/or a size ((H1, W1); (H2, W2)) for each of two or more output subsets (R1, R2).

The determination may be based on side information from the bitstream. However, in this embodiment, such signaling may not be necessary in some implementations. For example, it may be assumed that the input subsets include the total receptive field of the respective output subsets. When additionally assumed that the output subsets would be combined in a predetermined manner (e.g. with no overlap or with a known pre-set overlap), and when the input/output size relation and the total receptive field are known as features of the neural network, no signaling is necessary.

The method may further include the step of processing each of the two or more input subsets (L1, L2) comprising processing with a neural network including one or more layers, wherein the neural network uses a plurality of samples of an input subset out of the two or more input subsets (L1, L2) to generate one sample of a respective output subset out of the two or more output subsets (R1, R2), thereby obtaining for the two or more input subsets the respective two or more output subsets (R1, R2).

What follows is a step of reconstructing the picture (R) by combining the two or more output subsets. The size of the input subsets in this embodiment is equal to a size required to obtain, after processing by said one or more layers, the size of the respective output subset (R1; R2). In other words, regions L1, L2 include the total receptive field.

An exemplary implementation may include the following steps:
1. Determine N overlapping regions in the input space ($L_i$), where each region $L_i$ comprises the complete (i.e. total) receptive field of one of $R_i$, where the union of $R_i$ make up the complete target picture.
2. Process each $L_i$ using NN independently to obtain reconstructed regions $R_i$.
3. Merge $R_i$ to obtain reconstructed output (i.e. a reconstructed picture).

In the above exemplary implementation, the division of the input space is such that each region $L_i$ comprises the complete receptive field of $R_i$, respectively. Moreover, the union of $R_i$ makes up the whole target picture R.

FIG. 17A illustrates the exemplary implementation. First, the input is divided into 4 overlapping regions, $L_1$, $L_2$, $L_3$, and $L_4$. The $L_1$ and $L_2$ are shown in the figure. One can notice that $L_1$ and $L_2$ are overlapping. In the figure, the indices of L and R are the same for the corresponding divisions in the input and output. For example, $L_4$ corresponds to R4. The placement of Ri follows the same pattern as of Li, meaning that, if L1 corresponds to the top-left of the input space, R1 corresponds to the top-left of output space. If L2 is to the right of L1, R2 is to the right of R1.

The determination of the total receptive field depends on the kernel size of each processing layer. It can be determined by tracing the input sample back in the opposite direction of the processing. The total receptive field consists of the union set of input samples that are all used in the calculation of a set of output samples. The total receptive field, therefore, depends on the connections between each layer and can be determined by tracing all of the connections starting from the output in the direction of the input.

In the example of the convolution layers shown FIG. 14, the kernel sizes of the convolution layers 1 and 2 are K1×K1 and K2×K2, and the downsampling ratios are R1 and R2, respectively. The convolution layers usually employ regular input output connections (e.g. always KxK input samples are used for each output). In this example, the calculation of the size of the total receptive field can be done as follows:

$$W=((w \times R2)+K2-1) \times R1+(K1-1),$$

$$H=((h \times R2)+K2-1) \times R1+(K1-1),$$

where H and W denote the sizes of the total receptive field, and h and w are the height and width of the output sample set, respectively.

In the above examples, the convolution operation is described in a two dimensional space. When the number of dimensions of the space where the convolution is applied is higher, a 3D convolution operation might be applied. The 3D convolution operation is a straightforward extension of the 2D convolution operation, wherein an additional dimension is added to all of the operations. For example, the kernel sizes can be represented as K1×K1×N and K2×K2×N, and the total receptive fields can be represented as W×H×N based on the previous example, where N represents the size of the third dimension). Since the extension from the 2D convolution and 3D convolution operations is straightforward, the present invention applies both to 2D and 3D convolution operations. In other words, the size of the third (or even fourth dimension) can be greater than one and the invention can be applied in the same manner.

The equations above are an example that shows how the size of the total receptive field can be determined. The determination of the total receptive field depends on the actual input-output connections of each layer.

Next, each $L_i$ is processed independently. In the example, the processing unit is a decoder. Therefore, the processing of $L_1$ only depends on the sample of $L_1$ and not on any other sample outside $L_1$. As a result, the set of Li's may be processed in parallel, for example. The output of the decoding process is $R_i$. The union of $R_i$ makes up the target reconstructed image. In the example, $R_i$ have overlapping regions, so therefore cropping operation is applied first to obtain R-crop$_i$ having no overlapping region. Finally, the R-crop$_i$ are concatenated to obtain the complete output reconstructed picture.

In the example, the $L_i$ comprise the total receptive field of $R_i$.

The determination of $R_i$ and $L_i$ can be done as follows:
First determine N non-overlapping regions R-crop$_i$. for example R-crop$_i$ might be equally sized N×M regions, where N×M are determined by decoder according to memory limitation.
Determine the total receptive field of R-crop$_i$. $L_i$ is set equal to total receptive field of each R-crop$_i$ respectively.
Process each $L_i$ to obtain $R_i$. this means that $R_i$ are the size of the output sample set generated by the NN. It is noted that an actual processing may not be necessary, once the size of $L_i$ is determined, it might be possible to determine the size and position of $R_i$ according to a function, Since the structure of the NN is already known, the relationship between the sizes $L_i$ and $R_i$ can already be known, therefore $R_i$ can be calculated by a function according to $L_i$ without actually performing the processing.
If the size $R_i$ is not equal to R-crop$_i$, crop $R_i$ to obtain R-crop$_i$.
The size of R-crop$_i$ might not be equal to $R_i$, if padding operation is applied during the processing by the NN to the input or intermediate output samples. Padding might, for example, be applied to the NN if some size requirements must be met for input and intermediate output samples. For example, it might be required by the NN (e.g. due to its certain structure) that the input size must be a multiple of 16 samples. In this case, if the $L_i$ is not a multiple of 16 samples in one direction, padding might be applied in that direction to make it multiple of 16. In other words, the padded samples are dummy samples to ensure an integer multiplicity of each $L_i$ with the size requirements of the respective NN layer.
The sample to be cropped out can be obtained by determining "output samples that include padded samples in its calculation". This option may be applicable to the exemplary implementation discussed.

Figure 17B:
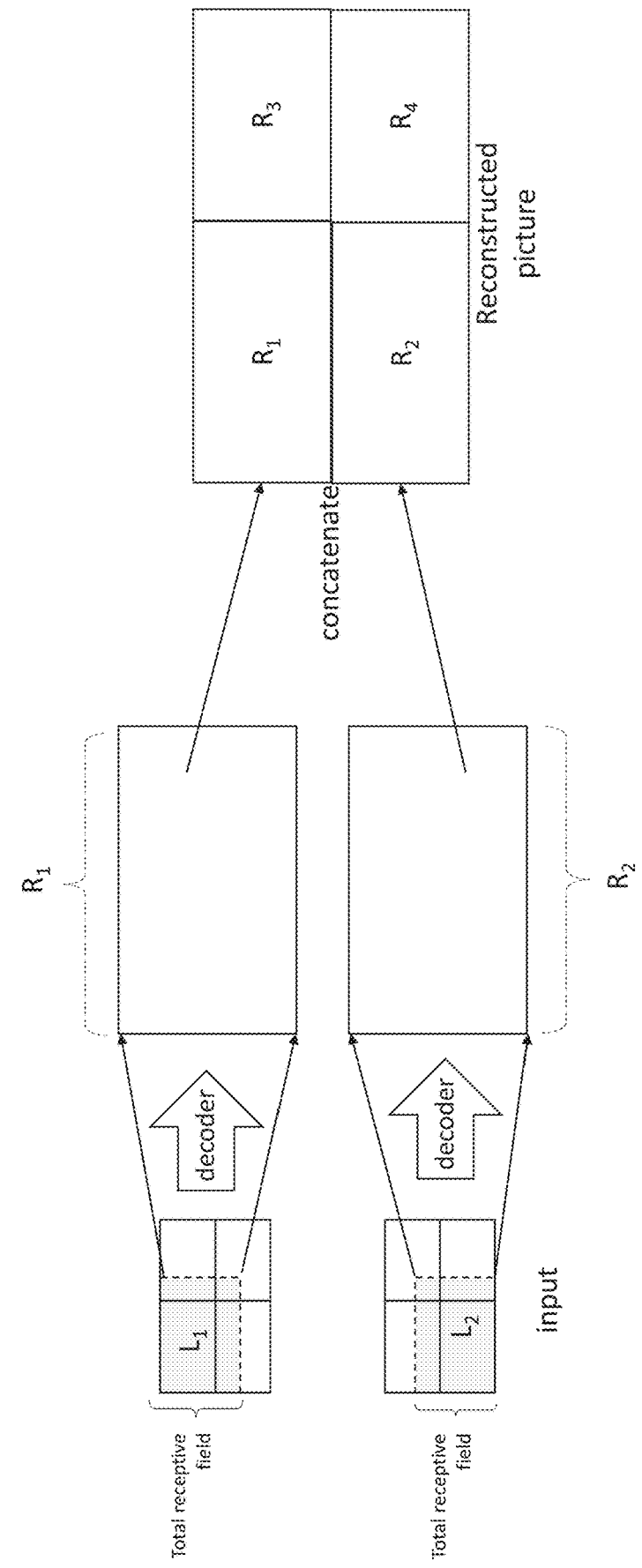
FIG. 17B shows another example of dividing an input image into overlapping regions Li similar to FIG. 17A, except that cropping is dismissed.

The determination of $R_i$ and $L_i$ can be done as follows and may be referred to as "simple" non-cropping case which is illustrated in FIG. 17B:
First, determine N non-overlapping regions $R_i$. For example, $R_i$ might be equally sized N×M regions, where N×M are determined by the decoder according to memory limitation.
Determine the total receptive field of $R_i$. $L_i$ is set equal to the total receptive field of each $R_i$, respectively. The total receptive field is calculated by tracing each one of the output samples in $R_i$ in the backwards direction till $L_i$. $L_i$ therefore consists of all the samples that are used in the calculation of at least one of the samples in $R_i$.
Process each $L_i$ to obtain $R_i$. This means that $R_i$ is the size of the output sample set generated by the NN.

The exemplary implementation solves the problem of total peak memory by dividing the input space into multiple smaller independently processible regions.

In the above exemplary implementation, the overlapping regions of $L_i$ require an additional processing compared to not dividing the input into regions. The larger the overlapping regions, the more extra processing is required. Especially in some cases, the total receptive field of $R_i$ might be too large. In such cases, the total number of computations to obtain the whole reconstructed picture might increase too much.

Note 1: The exemplary implementation does not require any additional indication to be included in the bitstream. This is different to the present disclosure and its related implementations (see second embodiment discussed below). It will be explained later why in the present disclosure an additional indication needs to be included in the bitstream. In turn, in the exemplary implementation here, no additional indication is necessary, because the processing of all output samples uses all of the samples in their respective total receptive field. This means that all samples, necessary for the reconstruction of each output sample, are already available. As a result, any division of the input space obeying the rule of the exemplary implementation would result in an identical output. In other words, the decoder may, for example, split the input space into M×N equal-sized regions (for example, due to the fact that implemented memory can only allow processing of M×N samples at a time). The output can be identical to the result when the input is split into K×L samples if the rules of the exemplary implementation is obeyed. Therefore, no indication needs to be included in the bitstream from encoder to decoder, as the decoder has the freedom to choose its own division pattern and size.

All embodiments and/or exemplary implementations described herein may be applied also to the encoder in the same way. When applied to the encoder, the input space would be x (as in FIG. 6) and the reconstructed output would be x (as in FIG. 6).

The exemplary implementation discussed above may provide the following advantages:

The exemplary implementation makes it possible to obtain a reconstructed output by application of multiple NN processing steps. Since the NN processing steps are independent, multiple processing units with lesser capability (e.g. smaller memory) can be used for processing. Alternatively, the NN processing can be performed using the same processing unit multiple times. Since the division is performed to contain the total receptive field, it is possible to obtain a reconstructed output that is identical to what could be obtained when no division is performed. As a result, it is not necessary to include information about partitioning in the bitstream, and hence the signaling overhead is reduced.

The number and sizes of Li can be decided by the decoder based on its capability, since the result is identical with or without any division. Also no indication is necessary to be included in the bitstream by encoder, the encoder and decoder can obtain identical results since the following condition is satisfied: "each region comprises total receptive field of one of $R_i$".

Second Embodiment

In the exemplary implementation discussed before, each input picture part $L_i$ used its total receptive field, which may increase the number of input samples to be processed. Hence, the use of the total receptive field may put higher demands to storage and/or speed of the processing units to process the larger number of samples.

This problem is addressed in this embodiment in that the input space is divided into multiple $L_i$, where each $L_i$ (i being an integer number of subsets of the input space) comprises only a subset of the total receptive field of $R_i$.

According to an embodiment of the present disclosure, a method is provided for reconstructing a picture from a bitstream. The picture may be a still image or a video picture, e.g. corresponding to a frame of a video sequence (motion picture).

Figures 21, 22:
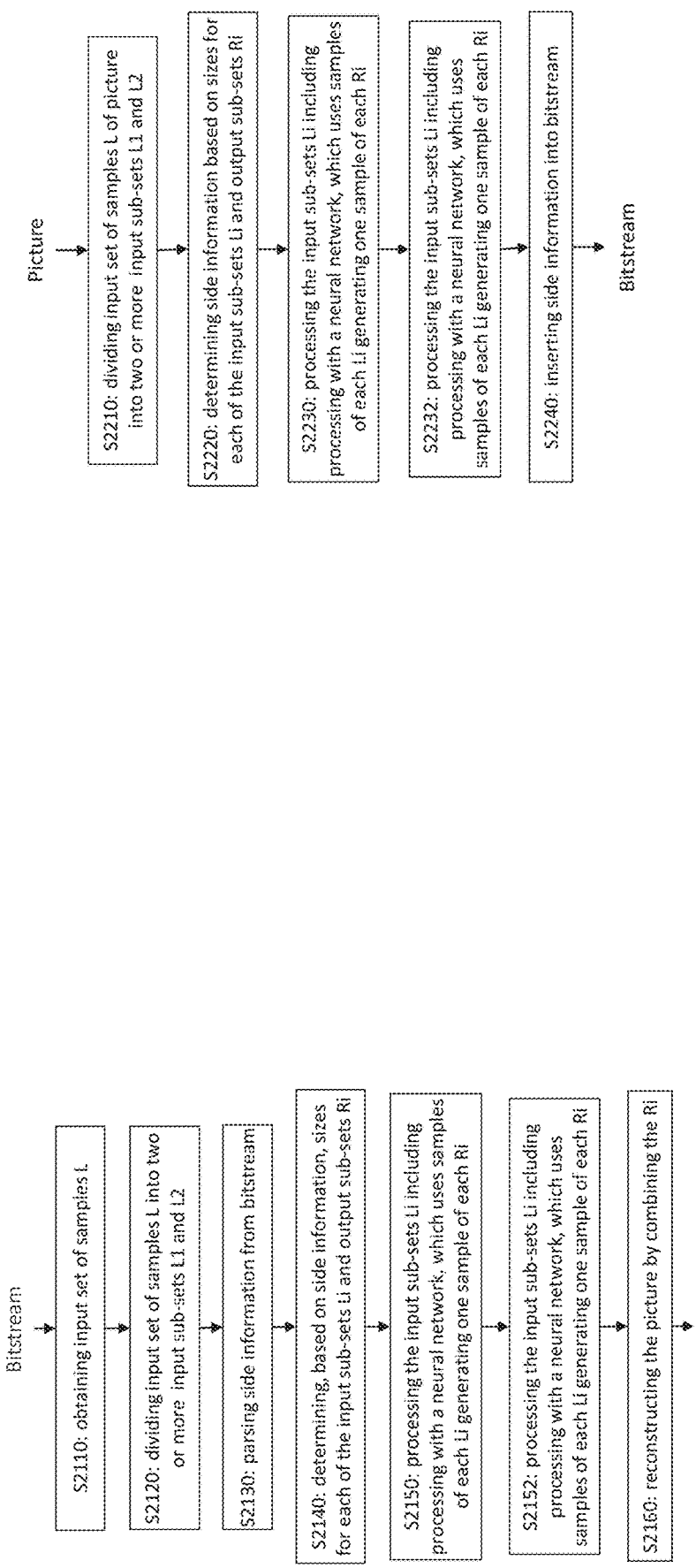
FIG. 21 shows a flowchart of the processing method for reconstructing a picture.
FIG. 22 shows a flowchart of the processing method for encoding a picture.

The method is illustrated in the flowchart of FIG. 21 and comprises a step S2110 for obtaining, based on the bitstream, an input set of samples (L) representing the picture. The input set of samples may include samples of the picture. The obtaining of the input set of samples may be performed, for example, by reconstructing with a hybrid codec, such as an HEVC or VVC or another codec. For example, the reconstruction may be performed at a decoder (see reconstruction 314) as shown in FIG. 26 or at an encoder (see reconstruction 214) as shown in FIG. 25. Alternatively, the input sample set may be obtained by parsing an input feature map from the bitstream. The parsing may include decoding, since the feature map may be encoded by using e.g. an entropy code, such as an arithmetic code, or a variable length code of another kind.

Further, the method comprises a step S2120 for dividing the input set L into two or more input subsets L1 and L2. The input subsets may each include one or more samples. The input subsets (L1, L2) may cover a part or the entire input space. In the present example, L1 and L2 shown in FIG. 18 cover a subset of the input space on the left hand side of the picture L. However, two further input-sets L3 and L4 may be provided in a similar manner on the right hand side of the input picture L.

In one exemplary implementation, the two or more input subsets (L1, L2) are overlapping by one or more samples. Accordingly, the output subsets Ri generated through the processing including the neural network are more accurate since samples of neighboring input-subsets are used (corresponding to overlap samples). Hence, the overlap of the Li's improves the overall quality of the reconstructed picture which is a union of the output-subsets Ri. In particular, distortions along boundaries of the input-subsets Li are reduced.

Figure 18:
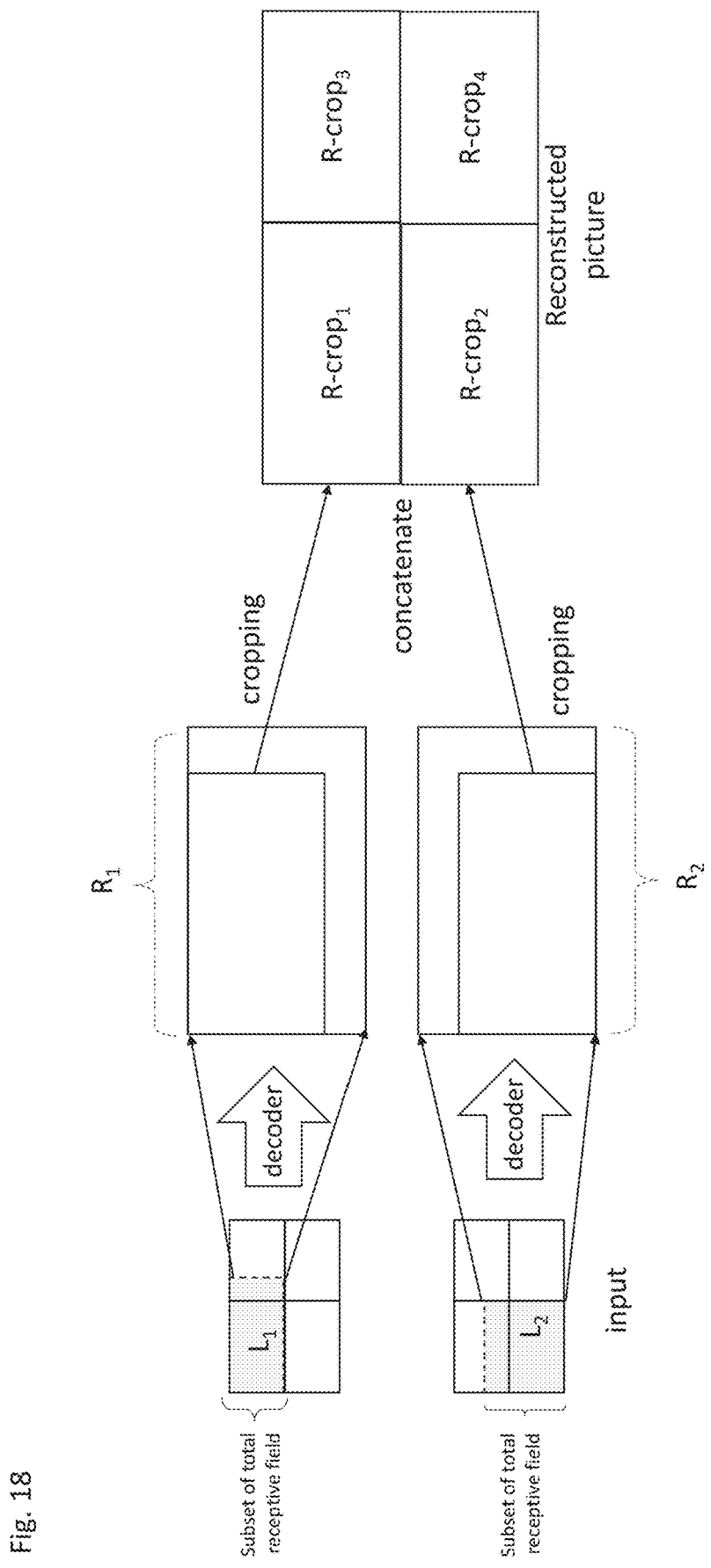
FIG. 18 shows an example of dividing an input image into overlapping regions Li, the subsequent cropping of samples in the overlap region and the concatenation of the cropped regions. Each Li comprises a subset of the total receptive field.

Overlapping means that that the input subsets, each including one or more samples of the input set, share same one or more samples. Accordingly, the union of the input subsets covers the entire input set of samples, and hence the whole picture. The subsets may correspond to regions of mutually adjacent samples. As shown in FIG. 18, L1 is a subset of adjacent samples with rectangular shape. However the present disclosure is not limited to such input subset. Rather, Li may be a discontinuous set of samples. Said discontinuous sample set may be interlacing-like, chessboard, tiles-like, or the like.

The method comprises also a step S2130 for parsing from the bitstream side information. In an exemplary implementation, the parsing of the side information includes parsing one or more out of a sequence parameter set (SPS) or a picture parameter set (PPS) or a picture header (PH). In general, the side information may belong to a header related to a sequence or a picture or a slice or tile of the picture. Thus, the side information may be parsed in a flexible manner, meaning that it can control handling of parts of the sequence (pictures, groups of pictures, picture portions). The terms SPS, PPS, and PH are known from some current hybrid codecs, such as HEVC or VVC or the like. In general, the present disclosure is not limited to the bitstream syntax/semantics of these codecs. The term "side information" typically refers to any information accompanying the encoded picture data in the bitstream, apart from the encoded picture data. Such side information may have a syntax defined by a convention such as a standard, so that both encoder and decoder may parse and interpret the side information in the same manner. The side information may be structured into syntax elements conveying settings which apply to the entire video sequence or to a subset of pictures of the sequence. There may be settings (parameters) which apply to one specific picture or even to a part of a picture (such as a slice or a tile or a coding unit or the like). The side information of the present disclosure may be signaled at any level (sequence, a group of pictures, picture, portion of a picture) at which the segmentation takes place before/after processing by the neural network. As mentioned above, the sequence level, the level of a group of pictures, or a picture may apply to the signaling of the side information related to the present disclosure. The signaling may be in either one of these levels. Alternatively, the level can be selectable (e.g. by means of presence flags signaling at each level whether or not such side information is present).

Moreover, the method comprises a step S2140 for determining, based on the side information, a size ((h1, w1); (h2, w2)) for each of the two or more input subsets (L1, L2) and/or a size ((H1, W1); (H2, W2)) for each of two or more output subsets (R1, R2). The determining of the sizes of the input subsets and/or output subsets may include parsing the respective parameters, including any of (h1,w1), (h2,w2), (H1,W1), and/or (H2,W2) directly from the bitstream. Alternatively, the determining of the sizes may include by deriving those parameters not included as a side information in the bitstream from one or more of other parameters included as a side information in the bitstream. Thereby, the deriving may exploit the characteristics of a network such as of a neural network. Such characteristics may include, for example, the number of layers, the kernel size K of each processing layer, and/or the number of available input samples or the number of output samples of the first processing layer and last processing layer of the NN, respectively. The size ((h1, w1); (h2, w2)) may be same or different for the different regions Li. Similarly, The size ((H1, W1); (H2, W2)) may be same or different for the different regions Ri.

In other words, the sizes of the input subsets and/or output subsets may be parsed and/or derived as they may be interrelated. As a result, all or a part of the parameters may be signaled through the side information included in the bitstream. Some examples of the signaling will be described further below.

The method comprises further a step S2150 for processing each of the two or more input subsets (L1, L2) comprising processing S2152 with a neural network including one or more layers. The processing of each of the input subsets may include end-to-end encoding or in-loop filtering such as filtering 220, 230 in FIGS. 25 and 26. Alternatively, or in addition, the processing may be post filtering of output signal 332 from a decoder 30.

In one exemplary implementation, the two or more input subsets (L1, L2) are processed independently. Accordingly, the input subsets may be processed in parallel, meaning one input subset does not use any (intermediate or final) result of processing of another subset. Hence, the processing of the input subsets may be performed faster, further improving the performance of the picture reconstruction. Alternatively, each of the input subset may be processed sequentially, i.e. one at a time for example according to a predefined sequence order, even if no dependency exists in the processing of L1 and L2. Both serial and parallel approaches reduce the memory necessary, due to the independence in processing.

In an exemplary implementation, the neural network uses a plurality of samples of an input subset out of the two or more input subsets (L1, L2) to generate one sample of a respective output subset out of the two or more output subsets (R1, R2). In this processing, the neural network thereby obtains for the two or more input subsets the respective two or more output subsets (R1, R2).

For example, the plurality of samples used by the neural network (NN) may depend on the kernel size of the first input layer of the NN. The one or more layers of the neural network (NN) may include one or more pooing layers and/or one or more subsampling layers. The NN may generate the one sample of the output subset by pooling the plurality of samples via the one or more pooling layers. Alternatively or in addition, the one output sample may be generated by the NN through subsampling (i.e. downsampling) by one or more downsampling convolutional layers. Pooling and downsampling may be combined to generate the one output sample.

Figure 20:
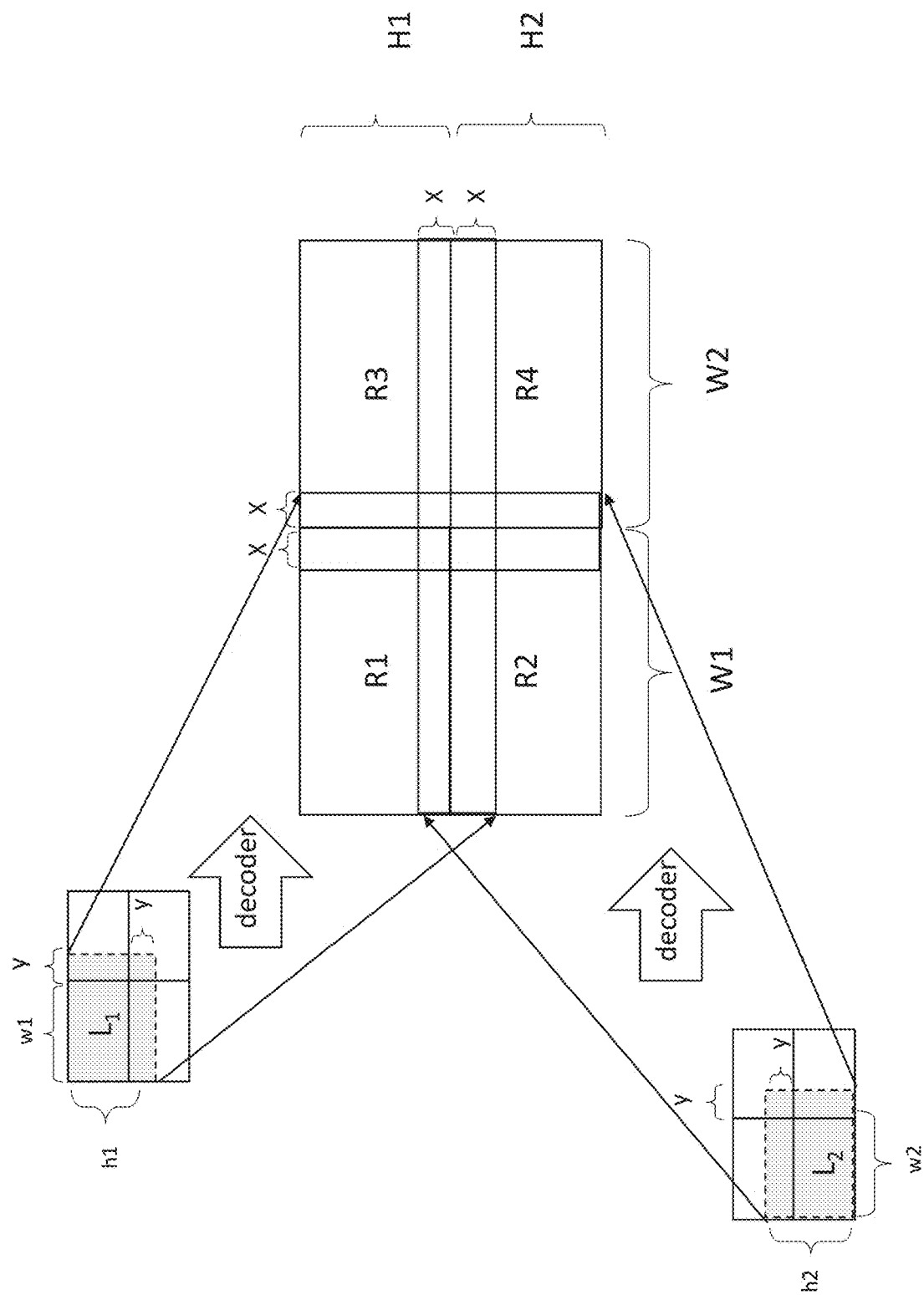
FIG. 20 illustrates the various parameters, such as the sizes of regions Li, Ri, and overlap regions etc., that may be included in (and parsed from) the bitstream.

The method comprises further a step S2160 for reconstructing the picture (R) by combining the two or more output subsets. According to an implementation example of the method, the combining of the two or more output subsets (R1, R2) includes overlapping of the two or more output subsets (R1, R2) by one or more combined samples, which is illustrated in FIG. 20. In the example of FIG. 20, the decoder obtains after processing of the input subsets L1 to L4 four output subsets Ri top R4, each of which has an overlap corresponding to a region x as marked in FIG. 20. One can see that the regions Ri overlap in said regions x after their respective samples are combined. Thereby, a combined sample is a sample obtained as a combination of a sample from a first output subset (R1) and a sample from a second output subset (R2). Thus, the quality of the reconstructed picture is further improved by overlapping samples of output subsets Ri. In particular, the quality of the reconstructed picture along the boundaries may be improved, so that picture degradations and distortion are reduced.

The combining of the two or more output subsets may further include cropping, (weighted) averaging, or merging of the output subsets. Cropping means removing samples of the output subsets that belong to the overlap regions of the respective region Ri. Averaging (weighted) means summing samples both in the region Ri and region R2, and multiplying the respective sum by a weight. The weight may be an integer number or real number. Merging means combining the output subsets such that the respective output samples of the regions R1 and R2 are adjacent.

According to an implementation example, the size of at least one of the input subsets is smaller than a size required to obtain, after processing by said one or more layers, the size of the respective output subset (R1; R2).

The one or more layers may include one or more layers for padding and/or resizing. For these one or more layers the size of the one or more input subsets being smaller means that the number input samples of the respective input subset may not cover all the samples provided by, for example, the first layer of the neural network (total receptive field). In other words, the size of the input subset covers only a subset of the total receptive field.

As a result of the above picture processing, the picture may be reconstructed efficiently from an input set of samples L by dividing the input sample L into multiple subsets L1 and L2, exploiting side information parsed from the bitstream, with each input subset Li being processed with a neural network. Further, the picture reconstruction may be performed with a lower required memory since the size of the input subsets being processed is smaller than the size of the respective output subsets.

The meaning of the above sample coverage in terms of the total receptive field (and its subset) may be explained with reference to FIGS. 11. As mentioned above, the total receptive field refers to a set of input samples that are used to obtain a specified set of output samples by applying one or more processing layers, for example, of a neural network. FIG. 11 exemplifies the processing of an input (the 7 samples on the left of the figure) with the 2 consecutive transposed convolution layers.

In the above example, the input layer supports a maximum of 7 samples. These maximum input samples are required to actually generate the 3 output samples. Hence, the number of samples supported by the first layer of the neural network defines the total receptive field (TRF). However, the size of input an input subset (i.e. the number of samples of said subset) may be smaller than the size of the TRF. In other words, the input subset does not cover the entire TRF, but rather overs a subset of the TRF.

An exemplary implementation of the above method (referred to as implementation 2) may be summarized as follows:

1. Determine N overlapping regions in the input space ($L_i$), where at least one of the regions comprises a subset of the total receptive field of one of $R_i$, where the union of $R_i$ make up the complete target picture.
2. Process each $L_i$ using NN independently to obtain reconstructed regions $R_i$.
3. Merge $R_i$ to obtain the reconstructed picture.

Figure 19:
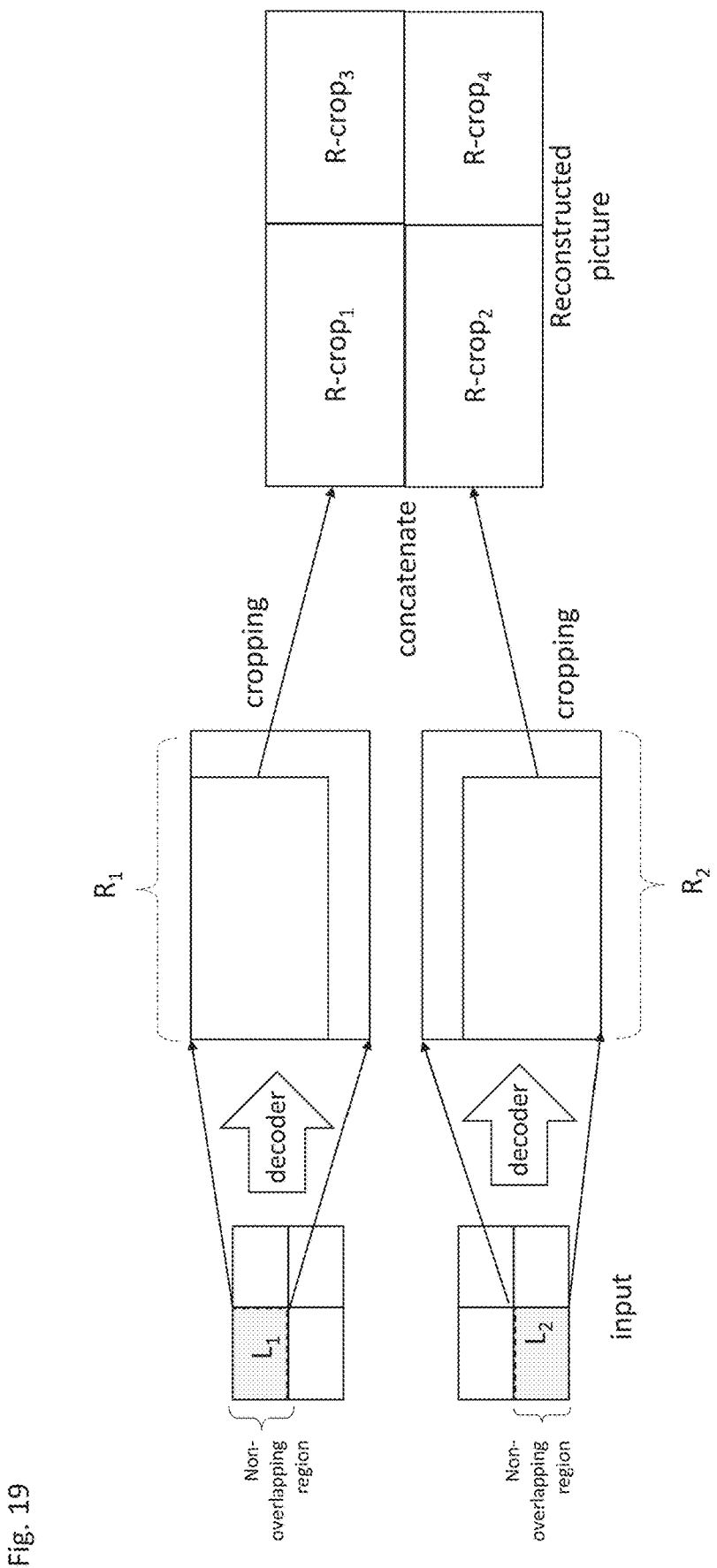
FIG. 19 shows an example of dividing an input image into non-overlapping regions Li, the subsequent cropping of samples, and the concatenation of the cropped regions. Each Li comprises a subset of the total receptive field.

According to an implementation example of the method, each of the two or more input subsets (L1, L2) is a rectangular region of the rectangular input set (L). Similarly, each of the two or more output subsets (R1, R2) is a rectangular region of the rectangular reconstructed picture (R). Hence, the combining of the output subsets Ri may be performed quickly due to their rectangular shape, which further improves the efficiency of the picture reconstruction. Moreover, the rectangular shape of the input subsets and the output subsets may be characterized by a minimum of parameters (such as width and height) since the shape is highly regular. Accordingly, the number of parameters suitable for the side information may be kept at a minimum, so that the signaling overhead may be reduced. Over and above, as the shape of both the input and output subsets are rectangular, their respective sizes are related (and determined from each other) through simple operations. FIGS. 18 to 20 show examples of those rectangular regions of input subsets $L_i$ and output subset $R_i$, respectively. The use of a rectangular shape for the input subsets and the output subsets allows a seamlessly combining of the output subsets generated from rectangular input subsets.

FIG. 18 exemplifies an exemplary implementation of the present disclosure. Compared to FIG. 17, the input regions $L_i$ are now smaller as shown in FIG. 18, since they represent only a subset of the total receptive field of respective $R_i$. Each region $L_i$ is processed by the decoder independently, thereby obtaining the two regions R1 and R2 (i.e. the output subsets).

Since a subset of the total receptive field is used to obtain a set of output samples, a padding operation might be necessary to generate missing samples.

In an exemplary implementation, the processing each of the two or more input subsets includes padding before processing with said one or more layers. Hence, samples missing in the input subsets may be added by the padding process, which improves the quality of the reconstructed output subsets Ri. Accordingly, the quality of the reconstructed picture is improved as well after combining the output subsets Ri.

Padding refers to increasing the size of the input (i.e. an input image) by generating new samples at the borders of the image (or picture) by either using sample values that are predefined or by using sample values at the positions in the input image. The generated samples are approximations of non-existing actual sample values. Therefore, a padded sample may be obtained e.g. based on one or more nearest neighbor samples of a sample to be padded. For example, a sample is padded by copying a nearest neighbor sample. If there are more neighbor samples at the same distance, the neighbor sample among them to be used may be specified by a convention (e.g. by standard). Another possibility is to interpolate the padding sample from a plurality of neighboring samples. Alternatively, padding may include using a zero-valued sample. Intermediate samples generated by the processing may also be needed to be padded. An intermediate sample may be generated based on the samples of the input subset including the one or more padded samples. Said padding may be performed before input of the neural network or within the neural network. However, the padding is to be performed before the processing of the one more more layers.

According to an implementation example, position and/or amount of the samples to be padded is determined based on the side information. Thus, the position and number of padded samples may be determined quickly based on signaled side information by the decoding side. For example, the number of padded samples may be determined from the size (wi,hi) of the respective input region Li by comparing the size with the size of the total receptive field. Moreover, a type of padding may be signaled by including the padding type into the side information.

FIG. 12 depicts the application of padding operation for implementation 2. In the example depicted in FIG. 12, the set of output samples comprises 5 samples. Two transposed convolution (deconvolution) operations are applied to the input, where each deconvolution operation includes application of a kernel of size 3. Since the kernel size is 3, one padded sample is necessary on each side of an input before application of each deconvolution operation. The padded samples are depicted with empty circles. As may be discerned from FIG. 12, padding typically takes place at the sample boundaries.

The padding operation serves two purposes:
Generation of missing samples due to the usage of a subset of the total receptive field. In other words, the size of the input subset is smaller than the size of the total receptive field as explained above. In order to generate the desired output samples from the "missing" samples, it is necessary (in implementation 2) to apply padding at the input and/or at the intermediate output samples. This is exemplified in FIG. 12. The "padded sample 1" is used in the calculation of output sample 1. Therefore, the padded sample 1 is used to complete the "missing" samples in the total receptive field.
The padding operation helps keep the number of samples constant or at a desired number after application of a convolution/deconvolution operation with kernel size greater than 1. For example, padding operation might be necessary to be applied at the boundaries of the input space in order to compensate the shrinking of the size after each application of the conv/deconv (convolution/deconvolution) operation when the kernel size is greater than 1. This is exemplified in FIG. 12. "Padded sample 2" is not used in the calculation of any of the output samples, but has the purpose of making the size of the output of the NN obey a certain restriction. In the example of FIG. 12, the size of the output should be the same size as the input size. Note that padding may be also required in case of each input subset Li comprises the total receptive field as is the case of first embodiment. As FIG. 11 shows, when each Li comprises the total receptive field (TRF), padding of those samples at the boundary of the TRF may be needed, if the size of the input subset Li is smaller than the TRF.

In FIG. 12, the output samples that are affected by the padded samples are depicted with dotted filling. At the output stage, 4 out of 7 samples used at least one padded sample in the calculation of output value. Since the padded samples are not actual samples but rather an approximation of actual samples, the output samples that use the padded samples have lesser precision. In other words, the quality of the reconstruction is degraded as at least one padded sample is used in the calculation of the output sample.

On the other hand, the degradation in the reconstruction quality is not equal for all output samples that use at least one padded sample in the calculation. In FIG. 12 for example, the calculation of output sample 2 requires more padded samples than for output sample 1. Therefore, the output sample 1 is expected to be more precise than output sample 2. Yet, output sample 1 is still less precise than the samples that did not use any padded sample in the calculation.

In an exemplary implementation of the method, the processing each of the two or more input subsets includes, after processing with said one or more layers, cropping one or more samples. Cropping means removing samples of the output subsets that belong to the overlap regions of the respective region $R_i$. The cropping of the output subsets $R_i$ may be performed before the $R_i$ are combined. In one example, the cropping is performed after the processing of one or more of the two or more input subsets with the neural network, so as to obtain respective one or more of the two or more output subsets (R1, R2). The cropping allows making the size of the reconstructed picture smaller and/or changing the aspect ratio (length to width) of the picture. Therefore, the size of the reconstructed picture may be adapted to a preferred size of a display, which improves the viewing reproduction of the picture on the display (adaptive picture size).

Hence, the cropping operation (i.e. a third step may be added to above processing) might be performed to $R_i$ before merging them into a reconstructed output. FIGS. 18 and 19 show that after the input subsets $L_i$ have been processed by the decoder, the decoder provides as output the output subsets Ri which still have overlap regions. In this case, the cropping is then performed after the neural network. Alternatively, the cropping may be performed in the network, in which case the provided output subsets Ri have no longer their overlap region as a result of the network-internal cropping. The cropping allows to match picture size.

According to an example, the combining of the two or more output subsets is a merging without overlapping. This is illustrated in FIGS. 18 and 19, showing that after the output subsets Ri are subjected to cropping, the respective cropped regions Ri-crop are merged seamlessly without any overlap of the cropped regions.

In above exemplary implementation, the regions Li of the input space are overlapping. The implementation may be adapted such that the L are non-overlapping. The respective alternative implementation may read as follows:
1. Determine N non-overlapping regions in the input space ($L_i$), where at least one of the regions comprises a subset of the total receptive field of one of $R_i$, where the union of $R_i$ make up the complete target picture.
2. Process each $L_i$ using NN independently to obtain reconstructed regions $R_i$.
3. Merge $R_i$ to obtain reconstructed picture.

FIG. 19 illustrates this case, wherein the $L_i$ are selected as non-overlapping regions. This is a special case, where the total amount of computations necessary to obtain the whole reconstructed output (i.e. output picture) is minimized. However, the reconstruction quality might be compromised.

As discussed before, the input subsets (L1,L2) may not comprise the total receptive field (TRF) contrary to the processing of the first embodiment. As a result of using a sub-field of the TRF, the decoding side may not know how the picture was partitioned at the encoder side. Therefore, information (e.g. in terms of parameters) may be signaled to the decoder side so as to determine how the picture is partitioned in some exemplary implementations.

Hence, in the exemplary implementation of the second embodiment, it is necessary to know the size and coordinates of each Ri and Li, in order to deduce how the partitioning is performed in the input space and in the output space. The partitioning of the input space and the output space applies to the decoder as well as the encoder. Moreover, since it might be necessary to apply cropping to Ri, it would also be necessary to know the cropping amount for each Ri. This is discussed in the following.

According to an example implementation of the method, position and/or amount of the samples to be cropped is determined based on the side information. Thus, the position and/or number of cropped samples may be determined quickly based on signaled side information by the decoding side.

As mentioned before, the side information is included in the bitstream. Since the side information is parsed from the bitstream, all parameters needed for said determination may be signaled in the side information. Alternatively, a part of the parameters may be included in the bitstream, while the remaining parameters needed may be then derived from the signaled parameters.

For example, the side information includes an indication one or more of:
- a number of the input subsets,
- a size of the input set,
- a size (h1, w1) of each of the two or more input subsets,
- a size (H, W) of the reconstructed picture (R),
- a size (H1, W1) of each of the two or more output subset,
- an amount of overlap between the two or more input subsets (L1, L2),
- an amount of overlap between the two or more output subsets (R1, R2).

Hence, the signaling of a variety of parameters through side information may be performed in a flexible manner. Accordingly, the signaling overhead may be adapted in dependence which of the above parameters are signaled in the side information, while other parameters are to be derived from those parameters being signaled. The size of each of the two or more input subsets may be different. Alternatively, input subsets may have a common size.

In one example, the position and/or the amount of the samples to be cropped is determined according to the size of the input subset indicated in the side information and a neural-network resizing parameter of the neural network specifying relation between the size of the input to the network and size of the output from the network. Hence, the position and/or cropping amount may be determined more accurately by accounting for both the size of the input subset and characteristics of the neural network (i.e. its resizing parameter). Accordingly, the cropping amount and/or position may be adapted to properties of the neural network, which further improves the quality of the reconstructed picture.

The resizing parameter may be an additive term, which is subtracted from the input size so as to obtain the output size. In other words, the output size of an output subset is related to its corresponding input subset by just an integer number. Alternatively, the resizing parameter may be a ratio. In this case, the size of the output subset is related to the size of the input subset by multiplying the size of the input subset by the ratio so as to obtain the size of the output subset.

As discussed above, the determination of Li, Ri, and the cropping amount can be obtained from a bitstream, according to predefined rules, or a combination of the two.

- An indication indicating the amount of cropping can be included in (and parsed from) the bitstream. In this case, the cropping amount (i.e. overlap amount) is included in the side information.
- The amount of cropping can be a fixed number. For example, such number may be pre-defined by a standard, or fixed once the relation between the size (dimensions) of the input and output are known.
- The amount of cropping can be related to a cropping in horizontal direction, vertical direction, or both directions.

The cropping can be done according to a pre-configured rule. After the cropping amount is obtained, the cropping rule can be as follows:

According to the position of Ri in the output space (top-left, center, etc). Cropping can be applied on a side (top, left, bottom, or right), if that side of Ri does not coincide with the output boundary.

The sizes and/or coordinates of an Li can be included in the bitstream. Alternatively, the number of partitions can be indicated in the bitstream, and the sizes of each Li can be calculated based on the size of the input and the number of partitions.

The overlap amount of each input subset Li can be:

An indication indicating the amount of overlap can be included in (and parsed from or derived from) the bitstream.

The amount of overlap can be a fixed number. As mentioned above, "fixed" in this context means that it is known e.g. by a convention such as a standard or a proprietary configuration or pre-configured as a part of encoding parameters or parameters of the neural network.

The amount of overlap can be related to a cropping in a horizontal direction, vertical direction, or both directions.

The amount of overlap can be calculated based on the amount of cropping.

In the following, some numerical examples are provided to illustrate which parameters may be signaled via the side information included in the bitstream (and parsed therefrom), and how these signaled parameters are then used to derive the remaining parameters. These examples are merely exemplary and not limiting the present disclosure.

For example, in the bitstream the following information can be included related to signaling of Li:

Number of partitions in vertical axis=2. This corresponds to the examples of space L being divided vertically by 2 in the figures.

Number of partitions in horizontal axis=2. This corresponds to the examples of space L being divided horizontally by 2 in the figures.

Equal sized partition flag=True. This is exemplified in the figures by showing L1, L2, L3, and L4 with the same sizes.

Size of the input space L (wL=200, hL=200). The width w and the height h are measured in number of samples in these examples.

Overlap amount=10. The overlap is measured in number of samples in this example.

According to the information above, the sizes of the partitions can be obtained as w=(200/2+10)=110, h=(200/2+10)=110, since it is indicated that the overlap amount is 10 and partitions are equal-sized.

Furthermore, since the size of the partitions are (110, 110) and the number of partitions in each axis is 2, the top-left coordinates of the partitions can be obtained as:

top-left coordinate pertaining to the first partition, L1 (x=0,y=0),
top-left coordinate pertaining to the second partition, L2 (x=90,y=0),
top-left coordinate pertaining to the third partition, L3 (x=0,y=90),
top-left coordinate pertaining to the fourth partition, L4 (x=90,y=90).

The examples below exemplify different options of signaling all or some of the above parameters, which is illustrated with reference to FIG. 20. FIG. 20 shows how the various parameters related to the input subsets $L_i$, the output subsets $R_i$, the input picture, and the reconstructed picture are linked.

It is noted that the above mentioned signaled parameters are not to limit the present disclosure. As is described below, there are many possible ways to signal information based on which the sizes of the input and output spaces as well as sub-spaces, cropping or padding, may be derived. Some further examples are presented below.

First signaling example:

FIG. 20 illustrates a first example where the following information is included into the bitstream:

Number of regions in the latent space (which corresponds to the input space at the decoder side), which is equal to 4.

The total size (height and width) of the latent space, which is equal to (h,w). (referred to as wL, hL above).

h1 and w1, used to derive the sizes of the regions (here the sizes of the four $L_i$), i.e. input subsets.

Total size (H, W) of the reconstructed output R.

H1 and W1. H1 and W1 represent the size of the output subset.

In turn, the following information is predefined or predetermined:

The amount X of overlap between the regions $R_i$. For example, X determines also the cropping amount.

The amount of overlap y between the regions $L_i$.

According to the information included in the bitstream and the information that are predetermined, the sizes of $L_i$ and $R_i$ can be determined as follows:

$$L1=(h1+y, w1+y)$$

$$L2=((h-h1)+y, w1+y)$$

$$L3=(h1+y,(w-w1)+y)$$

$$L4=((h-h1)+y,(w-w1)+y)$$

$$R1=(H1+X, W1+X)$$

$$R2=((H-H1)+X, W1+X)$$

$$R3=(H1+X,(W-W1)+X)$$

$$R4=((H-H1)+X,(W-W1)+X).$$

As may be discerned from the first signaling example, the size (h1,w1) of input subset L1 is used to derive the respective sizes of all remaining input subsets L2 to L4. This is possible because the same overlap amount y is used for the input subsets L1 to L4 as shown in FIG. 20. In this case, only a few parameter need to be signaled. A similar argument applies to the output subsets $R_i$ to R4, where only the signaling of the size (H1,W1) of output subset $R_i$ is needed to derive the sizes of output subsets R2 to R4.

In the above, h1 and w1, and H1 and W1 are the coordinates in the middle of input and output spaces, respectively. Hence, in this first signaling example, single coordinates (h1,w1) and (H1,W1) are used to calculate the partitioning of the input and output spaces into 4, respectively. Alternatively, the sizes of more than one input subset and/or output subset may signaled.

In another example, it might be possible to calculate Ri from Li if one knows the structure of the NN that processes the Li, i.e. what will be the size of the output, if the size of the input is Li. In this case, the sizes (Hi,Wi) of the output subsets Ri may not be signaled through the side information. However, in some other implementations, since the determination of the size Ri might sometimes not be possible before one actually performs the NN operation, it might be desirable (as in this case) to signal the sizes Ri in the bitstream.

Second signaling example:

In the second example of the signaling includes determining H1 and W1 based on h1 and w1 according to a formula. The formula, for example, may read as follows:

$$H1=(h1+y)*\text{scalar}-X$$

$$W1=(w1+y)*\text{scalar}-X$$

wherein the scalar is a positive number. The scalar is related to a resizing ratio of the encoder and/or decoder network. For example, the scalar can be an integer number such as 16 for the decoder, and a fractional number such as 1/16 for the encoder. Hence, in the second signaling example, H1 and W1 are not signaled in the bitstream, but rather are derived from the signaled size of the respective input subset L1. Moreover, the scalar is an example of a resizing parameter.

Third signaling example:

In the third example of the signaling, the amount of overlap y between the regions Li is not predetermined, but rather signaled in the bitstream. The cropping amount X of an output subset is then determined based on the cropping amount y of the input subset according to a formula such as:

$$X=y*\text{scalar}$$

wherein the scalar is a positive number. The scalar is related to a resizing ratio of the encoder and/or decoder network. For example, the scalar can be an integer number such as 16 for the decoder and a fractional number such as 1/16 for the encoder.

So far, the above described method relates to reconstructing a picture, along with signaling via the side information various parameters that allow an apparatus (e.g. a decoder) to perform the processing corresponding to the reconstruction method. As mentioned before, the same or a similar processing may be performed by a processing apparatus that prepares side information to be included into the bitstream, along with encoding information representing the picture into the bitstream. In the following, the encoding processing is detailed, which may be performed by an encoding apparatus.

According to an embodiment of the present disclosure, a processing method is provided for encoding a picture into a bitstream. The picture may be a still image or a video picture, e.g. corresponding to a frame of a video sequence (motion picture).

The method is illustrated in the flowchart of FIG. 22 and comprises a step 2210 for dividing an input set of samples (L) representing the picture into two or more input subsets (L1, L2). The input set of samples may include one or more samples of the picture. The input subsets may include one or more samples. The input subsets (L1,L2) may cover a part or the entire input space.

It is noted that at the encoder side, the input space L may represent channels of an image and the output space R channels of latent space after processing by the one or more layers of the NN. The output space channels may then be encoded into the bitstream which maybe the same bitstream as the bitstream carrying the side information or a different bitstream. The bitstream generation (binarization) may be considered as a part (e.g. a layer) of the NN or it may be implemented by a binarization (e.g. entropy coding) module following the NN. On the other hand, at the decoding side, the input space L represents the channels of latent space which are derived (e.g. parsed—including possible entropy decoding—and interpreted) from the bitstream and the output space R represents the reconstructed picture. In the present disclosure, the term "sample" is used to not only refer to the picture samples, but also to refer to the feature map samples (elements). In summary, L denoted input and R denotes output of an NN.

The method comprises further a step 2220 for determining side information based on a size ((h1, w1); (h2, w2)) for each of the two or more input subsets (L1, L2) and/or a size ((H1, W1); (H2, W2)) for each of two or more output subsets (R1, R2). It is noted that at the encoder side, the size of the input subset (and/or the output subset and/or the padding/cropping amount) may be optimizable, i.e. may be configurable by a user or by an application using the encoder or by performing a kind of optimization such as rate distortion optimization or an optimization also considering memory costs.

Further, the method comprises a step 2230 for processing each of the two or more input subsets (L1, L2) comprising a processing step 2232 with a neural network including one or more layers. The processing of each of the input subsets may include end-to-end coding or in-loop/post filtering/pre-filtering. It may in addition include post-processing.

In one example implementation, the two or more input subsets (L1, L2) are overlapping by one or more samples. Overlapping means that that the input subsets L1 and L2, each including one or more samples of the input set, share same one or more samples. Accordingly, the union of the input subsets (L1,L2) cover the entire input set of samples, and hence the whole picture. The subsets (L1,L2) may correspond to regions of mutually adjacent samples and/or to a discontinuous set of samples. Said discontinuous sample set may be interlacing-like, chess-board or the like. Accordingly, the output subsets Ri generated through the processing including the neural network are more accurate since samples of neighboring input-subsets are used (corresponding to overlap samples and commonly located at the boundary between adjacent subsets Li). Hence, the overlap of the Li's improves the overall quality of the generated output-subsets Ri. In particular, distortions along boundaries of the input-subsets Li are mitigated.

In one exemplary implementation, the two or more input subsets (L1, L2) are processed independently. Accordingly, the input subsets may be processed in parallel, meaning one input subset does not use any (intermediate or final) result of processing of another subset. Hence, the processing of the input subsets may be performed fast, further improving the performance of the picture reconstruction within an encoder-decoder framework. Alternatively, each of the input subset may be processed sequentially, i.e. one at a time for example according to a predefined sequence order, even if no dependency exists in the processing of L1 and L2.

In an exemplary implementation of the method, the neural network uses a plurality of samples of an input subset out of the two or more input subsets (L1, L2) to generate one sample of a respective output subset out of the two or more output subsets (R1, R2), thereby obtaining for the two or more input subsets the respective two or more output subsets (R1, R2). As a result, the picture may be encoded efficiently from an input set of samples L by dividing the input sample L into multiple subsets L1 and L2 exploiting side information, with each input subset Li being processed with a neural network. Further, the picture encoding may be performed with a lower required memory since the size of the input subsets Li being processed is smaller than the size of the respective output subsets Ri.

For example, the plurality of samples used by the neural network (NN) may depend on the kernel size of the first input layer of the NN. The one or more layers of the neural network (NN) may include one or more pooling layers and/or one or more subsampling layers. The NN may generate the one sample of the output subset by pooling the plurality of samples via the one or more pooling layers. Alternatively or in addition, the one output sample may be generated by the NN through subsampling (i.e. downsampling) by one or more downsampling convolutional layers. Pooling and downsampling may be combined to generate the one output sample.

The method comprises also a step S2240 for inserting into the bitstream the side information. According to an exemplary implementation, an indication of the two or more output subsets (R1, R2) is inserted into the bitstream. In other words, the (coded) input subsets and/or the (coded) output subsets may be inserted into the bitstream. The indication of output subsets into the bit stream may improve the dividing of an input set L into input subsets on the decoding side. In an implementation example, the inserting of the side information includes inserting the side information into one or more out of a sequence parameter set or a picture parameter set or a picture header. Thus, the side information may be inserted (and hence signaled) in a flexible manner, meaning that it can control parts of the sequence (pictures, groups of pictures, picture portions).

According to an implementation example, the size of at least one of the input subsets is smaller than a size required to obtain, after processing by said one or more layers, the size of the respective output subset (R1; R2).

As a result of the above processing, the picture may be encoded efficiently from an input set of samples L by dividing the input sample L into multiple subsets L1 and L2 exploiting side information, with each input subset Li being processed with a neural network. Further, the picture encoding may be performed with a lower required memory since the size of the input subsets Li being processed is smaller than the size of the respective output subsets Ri.

The one or more layers may include one or more layers for padding and/or resizing. For these one or more layers, the size of the one or more input subsets being smaller means that the number input samples of the respective input subset may not cover all the samples provided by, for example, the first layer of the neural network (total receptive field). In other words, the size of the input subset covers only a subset of the total receptive field.

The meaning of the above sample coverage in terms of the total receptive field (and its subset) has been already explained above in relation to the reconstructing method with reference to FIG. 11. For completeness, as mentioned above with regard to the decoder side, total receptive field, TRF, refers to a set of input samples that are used to obtain a specified set of output samples by applying one or more processing layers (such as NN layers). The layers may be convolution layers which process the input with one or more kernels (similarly as described above for deconvolution layers). By the processing applying kernels (or polling layers or the like), the total receptive field of the output samples may be larger than the number of input samples. In other words, in some cases, the input subset does not cover the entire TRF, but rather overs a subset of the TRF.

According to an implementation example of the method, each of the two or more input subsets (L1, L2) is a rectangular region of the rectangular input set (L), and each of the two or more output subsets (R1, R2) is a rectangular region. FIGS. 18 to 20 show examples of those rectangular regions of input subsets Li and output subset Ri, respectively. Accordingly, the rectangular shape of the input subsets and the output subsets may be characterized by a minimum of parameters (such as width and height) since the shape is highly regular. Thus, the number of parameters suitable for the side information may be kept at a minimum, so that the signaling overhead may be reduced. Over and above, as the shape of both the input and output subsets are rectangular, their respective sizes are related (and determined from each other) through simple operations. The use of a rectangular shape for the input subsets and the output subsets allows a seamlessly combining of the output subsets generated from rectangular input subsets. Each region Li may be processed by the encoder independently, thereby obtaining the two regions R1 and R2 (i.e. the output subsets).

Similar to the reconstructing method discussed above, a padding operation might be necessary at the encoding side as well to generate missing samples, because a subset of the total receptive field is used to obtain a set of output samples.

In an exemplary implementation, the processing each of the two or more input subsets includes padding before processing with said one or more layers. Hence, samples missing in the input subsets may be added by the padding process.

As mentioned above, padding refers to increasing the size of the input (i.e. an input image) by inserting new samples e.g. at the borders (boundaries) of the picture or picture region. Padding samples may be samples with a predefined value (such as zero), or with a value derived from the existing picture (region) values (since the picture is the input in this case). The padding samples may be derived, e.g. by copying value from the nearest neighboring sample of the picture (region), such as a value of a sample at a predefined relative position to the padding sample (such as sample to the left or sample on the top of the padding sample).

According to an example, position and/or amount of the samples to be padded is determined based on the side information. Thus, the position and number of padded samples may be determined based on signaled side information by the encoding side.

As explained before, the padding is illustrated with reference to FIG. 12 in a non-limiting way. The example also applies herein.

In one implementation example, the processing each of the two or more input subsets includes, after processing with said one or more layers, cropping one or more samples. Cropping means removing samples of the output subsets that belong to the overlap regions of the respective region Ri. In one example, the cropping is performed after the processing of one or more of the two or more input subsets with the neural network, so as to obtain respective one or more of the two or more output subsets (R1, R2). The cropping allows making the size of the picture to be reconstructed smaller and/or changing the aspect ratio (length to width) of the picture. Therefore, the size of the picture may be adapted to a preferred size of a display, which improves the viewing reproduction of the picture on the display (adaptive picture size). The cropping allows to match picture size. Additionally, the cropping helps removing the overlapping sections of the output when the output subsets (R1 and R2) have overlapping regions.

Hence, the cropping operation (i.e. a third step may be added to above processing) might be performed to Ri before merging them into a reconstructed output. FIGS. 18 and 19 show that after the input subsets Li have been processed by the decoder, the decoder provides as output the output subsets Ri which still have overlap regions. In this case, the cropping is then performed after the neural network. Alternatively, the cropping may be performed in the network, in which case the provided output subsets Ri have no longer their overlap region as a result of the network-internal cropping.

As discussed before for the picture reconstructing, the input subsets (L1,L2) may not comprise the total receptive field (TRF) contrary to the processing of the first embodiment, which applies also for the processing on the encoder side. As a result of using a sub-field of the TRF, the encoding side does per se not know how to partition the picture. Therefore, the encoding side may need to determine side information indicating how to partition the picture. The respective side information may include parameters e.g. related to the picture or other parameters. The side information may then be signaled to the decoder side in the bitstream, for example.

In particular, the encoder may decide on the acceptable selection of overlapping parameters in the input and output spaces to control the reconstruction quality. For example, the encoder may use the size (h,w) of the input picture and determine the overlap amount y of the input subsets Li and/or the overlap amount X of the output subsets Ri, based on the input-output characteristics of the neural network. Such characteristics may be ratio between the input and output size (in one or more dimensions) or the like. In general, the characteristics may be one or more parameters out of input/output size relation of particular layers of the network or of the entire network, size of the kernel(s) applied in the one or more layers of the NN or size of other operations including subsampling, upsampling, polling or the like performed in the layers of the NN. The present disclosure is not limited to any particular parameters.

According to an example implementation of the method, the side information is determined based on a position and/or an amount of the samples to be cropped. Thus, the position and/or number of cropped samples may be determined quickly based on signaled side information by the decoding side. In one example, the position and/or the amount of the samples to be cropped is determined according to the size of the input subset indicated in the side information and a neural-network resizing parameter of the neural network specifying relation between the size of the input to the network and size of the output from the network. Hence, the position and/or cropping amount may be determined more accurately by accounting for both the size of the input subset and characteristics of the neural network (i.e. its resizing parameter). Accordingly, the cropping amount and/or position may be adapted to properties of the neural network, which further improves the quality of the reconstructed picture.

The resizing parameter may be an additive term, which is subtracted from the input size so as to obtain the output size. In other words, the output size of an output subset is related to its corresponding input subset by just an integer number. Alternatively, the resizing parameter may be a ratio. In this case, the size of the output subset is related to the size of the input subset by multiplying the size of the input subset by the ratio so as to obtain the size of the output subset.

In one exemplary implementation of the method, the side information includes an indication one or more of:
a number of the input subsets,
a size of the input set,
a size (h1, w1) of each of the two or more input subsets,
a size (H, W) of the reconstructed picture (R),
a size (H1, W1) of each of the two or more output subset,
an amount of overlap between the two or more input subsets (L1, L2),
an amount of overlap between the two or more output subsets (R1, R2).

Hence, the signaling of a variety of parameters through side information may be performed in a flexible manner. Accordingly, the signaling overhead may be adapted in dependence which of the above parameters are signaled in the side information, while other parameters are to be derived from those parameters being signaled. The size of each of the two or more input subsets may be different. Alternatively, the input subsets may have a common size.

Moreover, the encoder may further use information on available memory and/or processing speed (e.g. clock frequency of the CPU) to determine the overlap amount y and/or X (i.e. the cropping amount), so as to achieve an acceptable tradeoff. The acceptable tradeoff point may depend on the type of application. For example, in the case of video streaming to a mobile device, it might be desirable to select small overlapping parameters, and a high number of partitions, since in this case the memory and computation resources are limited. In other applications, the quality might be more of a concern, in which case the overlap amount can be increased.

Hence, the encoding side may include various different types of the above parameters in the side information to signal parameters to the decoding side. Some examples of different signaling scenarios have been discussed in conjunction with the decoding side. While FIG. 20 illustrates the decoder side, a similar processing applies for the encoder side by simply renaming the arrows from "decoder" to "encoder". This is because at the encoder, as also mentioned above, L represents the picture space (input space) and R represents the latent space.

The first, second, and third signaling examples described above with reference to the decoder side, are applicable also for the encoder side. While at the encoder side, the bitstream is generated, at the decoder side, the bitstream is parsed. However, the signaling parameters included in the bitstream and described in the first, second, and third signaling examples apply to both sides. The parameters provided as side information described above are thus inserted into the bitstream in the encoder side embodiments. In the decoder side embodiments, they are parsed from the bitstream.

According to an embodiment of the present disclosure, provided is a computer program stored on a non-transitory medium comprising code which when executed on one or more processors performs steps of any of the methods referred to above.

Moreover, as already mentioned, the present disclosure also provides devices which are configured to perform steps of methods described above.

Figures 23, 24:
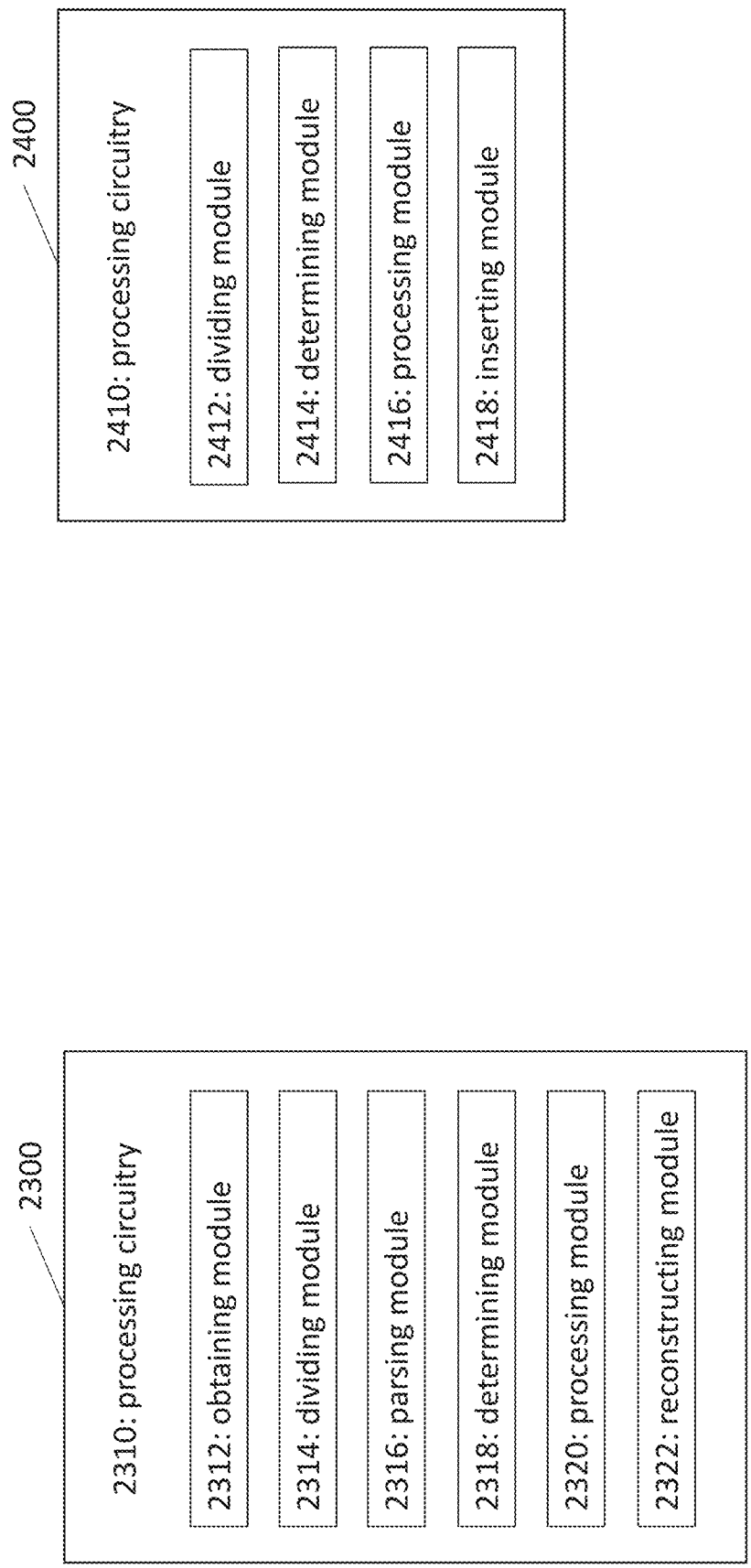
FIG. 23 shows a block diagram of an apparatus for reconstructing a picture, comprising a processing circuitry. The processing circuitry may be configured such that the circuitry includes modules performing the processing of the reconstructing method.
FIG. 24 shows a block diagram of an apparatus for encoding a picture, comprising a processing circuitry. The processing circuitry may be configured such that the circuitry includes modules performing the processing of the encoding method.

According to an embodiment of the present disclosure, an apparatus is provided for reconstructing a picture from a bitstream. FIG. 23 shows a block diagram apparatus 2300 for reconstructing a picture. The apparatus comprises a processing circuitry 2310 configured to: obtain, based on the bitstream, an input set of samples (L) representing the picture; divide the input set (L) into two or more input subsets (L1, L2); parse from the bitstream side information; determine, based on the side information, a size ((h1, w1); (h2, w2)) for each of the two or more input subsets (L1, L2) and/or a size ((H1, W1); (H2, W2)) for each of two or more output subsets (R1, R2); process each of the two or more input subsets (L1, L2) comprising processing with a neural network including one or more layers, wherein the neural network uses a plurality of samples of an input subset out of the two or more input subsets (L1, L2) to generate one sample of a respective output subset out of the two or more output subsets (R1, R2), thereby obtaining for the two or more input subsets the respective two or more output subsets (R1, R2); and reconstruct the picture (R) by combining the two or more output subsets, wherein the size of at least one of the input subsets is smaller than a size required to obtain, after processing by said one or more layers, the size of the respective output subset (R1; R2).

In one exemplary implementation of apparatus 2300, the configuring of processing circuitry 2310 may include that said circuitry includes respective modules for the processing. This may include obtaining module 2312, dividing module 2314, parsing module 2316, determining module 2318, processing module 2320, and reconstructing module 2322, as illustrated in FIG. 23.

According to an embodiment of the present disclosure, an apparatus is provided for reconstructing a picture from a bitstream, the apparatus comprising: one or more processors; and a non-transitory computer-readable storage medium coupled to the one or more processors and storing programming for execution by the one or more processors, wherein the programming, when executed by the one or more processors, configures the apparatus to carry out a method related to reconstructing a picture referred to above.

In one implementation example, the apparatus for reconstructing a picture from a bitstream, may comprise a processing circuitry configured to perform steps of a method according to any of the aspects of the reconstruction method referred to above.

According to an aspect of the present disclosure, a processing apparatus is provided for encoding a picture into a bitstream. FIG. 24 shows a block diagram of processing apparatus 2400 for encoding the picture. The processing apparatus comprises a processing circuitry 2410 configured to: divide an input set of samples (L) representing the picture into two or more input subsets (L1, L2); determine side information based on a size ((h1, w1); (h2, w2)) for each of the two or more input subsets (L1, L2) and/or a size ((H1, W1); (H2, W2)) for each of two or more output subsets (R1, R2); process each of the two or more input subsets (L1, L2) comprising processing with a neural network including one or more layers, wherein the neural network uses a plurality of samples of an input subset out of the two or more input subsets (L1, L2) to generate one sample of a respective output subset out of the two or more output subsets (R1, R2), thereby obtaining for the two or more input subsets the respective two or more output subsets (R1, R2); and insert into the bitstream the side information, wherein the size of at least one of the input subsets is smaller than a size required to obtain, after processing by said one or more layers, the size of the respective output subset (R1; R2).

In one exemplary implementation of apparatus 2400, the configuring of processing circuitry 2410 may include that said circuitry includes respective modules for the processing. This may include dividing module 2412, determining module 2414, processing module 2416, and inserting module 2418, as illustrated in FIG. 24.

According to an aspect of the present disclosure, a processing apparatus is provided for encoding a picture into a bitstream, the processing apparatus comprising: one or more processors; and a non-transitory computer-readable storage medium coupled to the one or more processors and storing programming for execution by the one or more processors, wherein the programming, when executed by the one or more processors, configures the apparatus to carry out a method related to encoding a picture referred to above.

In one implementation example, the processing apparatus for encoding a picture into a bitstream, may comprise a processing circuitry configured to perform steps of a method according to any of the aspects of an encoding method referred to above.

The exemplary implementations of the present disclosure discussed above may provide the following advantages:

The exemplary implementations of the second embodiment enable the adjustment of the size of the output regions Ri and input regions Li in order to obtain a desired tradeoff between reconstruction quality and computational complexity, while reducing the demands on required memory.

Compared to the exemplary implementation of the first embodiment, the exemplary implementations of the second embodiment may provide an advantage of providing the flexibility to adjust the reconstruction quality and computational complexity. Although in this exemplary implementation a subset of the total receptive field is used as an input, the encoder can decide on the acceptable selection of overlapping parameters in the input and output spaces to control the reconstruction quality.

For example, the encoder may use the size (h,w) of the input picture and determine the overlap amount y the input subsets Li and/or the overlap amount X of the output subsets Ri, based on the input-output characteristics of the neural network. Moreover, the encoder may further use information on available memory and/or processing speed (e.g. clock frequency of the CPU) to determine the overlap amount y and/or X. The acceptable tradeoff point depends on the type of application. For example, in the case of video streaming to a mobile device, it might be desirable to select small overlapping parameters, and a high number of partitions, since in this case the memory and computation resources are limited. In other applications, the quality might be more of a concern, in which case the overlap amount can be increased.

For example, assume that the total receptive field and the subset of it are given by:

Total receptive field size: (H,W)

Subset size: (H−X,W−X)

The reduction in required peak memory and computational complexity (by going from the total receptive field to a subset) is given as a ratio is $(X(H+W)+X^2)/(W*H)$. If, for example, H=W=20, the reduction in complexity is 10.25% when X is only equal to 1. This example calculation shows that just 1 line of reduction in the size of input space corresponds to roughly 25% reduction in memory and in the number of total computations. This is due to the fact that the total number of memory and computations are proportional to the multiplication of width and height of the input.

The memory requirement and the computational complexity are proportional to the number of samples to be processed, which is proportional to the width multiplied by the height of the input. In the above example, the input size is W×H when the total receptive field is used as input. The input size is reduced to (W−X)×(H−X) when a subset of the total receptive field is used (in this case X is an integer number greater than 0). Therefore, the percentage reduction in the computational complexity and memory requirement can be given by:

$$\frac{WxH - (W-X)x(H-X)}{WxH} = \frac{(Xx(H+W)+X^2)}{WxH}$$

However, the reduction in reconstruction the quality would be much less than the reduction in computational complexity, especially if X is small. When X is small, this means that only the samples at the outlier section of the total receptive field are not included in the input. FIG. 12 shows that the samples at the boundaries of the input (the padded samples in this case since they are missing) influence only a small number of output samples. For example, padded sample 1 in FIG. 12 influences only 2 samples at the output (output sample 1 and output sample 2), one of which is not even included in the output sample set (output sample 2). On the other hand, available sample 1 in the middle influences 5 output samples. Therefore, one can see from FIG. 12 that removing padded sample 1 (in other words using a padded version in place of the missing actual value), would only have a small impact on the reconstruction quality.

To summarize, when X is small, the reduction in complexity would overweigh the reduction in reconstruction quality. The present disclosure allows to select an X (either adaptively or in a predetermined fashion), such that a desirable trade-off can be achieved. The acceptable tradeoff point depends on the type of application. For example, in the case of video stream to a mobile device, it might be desirable to select small overlapping parameters, and a large number of partitions, since in this case the memory and computation resources are limited. In other applications, the quality might be more of a concern, wherein the overlap amount X can be increased.

The embodiments of the present disclosure provide the possibility to process parts of the input independently of the rest of the input samples. This means that the amount of samples that are processed at one time is reduced, so that the memory requirement is reduced. The present disclosure makes it further possible to implement processing of the whole input by:

using multiple less capable processing units (i.e. units with less memory) or
using a single less capable processing unit with multiple processing rounds.

The implementation cost of especially the first option is expected to be cheaper, as there is a physical limit on the processing speed which may be often hard to overcome. On the other hand, state of the processing units (e.g. CPUs and GPUs) include multiple, less capable identical processing cores which operate at a lower operation frequency.

It is noted that the present disclosure is not limited to a particular framework. Moreover, the present disclosure is not restricted to image or video compression, and may be applied to object detection, image generation, and recognition systems as well.

The invention can be implemented in hardware (HW) and/or software (SW). Moreover, HW-based implementations may be combined with SW-based implementations.

For the purpose of clarity, any one of the foregoing embodiments may be combined with any one or more of the other foregoing embodiments to create a new embodiment within the scope of the present disclosure.

The present disclosure relates to picture decoding and encoding of neural-network-based bitstreams, with the picture being represented by an input set of samples L which is obtained from the bitstream. The picture is reconstructed from output subsets $R_i$, which are generated as a result of processing the input set L. Specifically, the input set L is divided into multiple input subsets $L_i$, and side information parsed from the bitstream is used to determine the sizes of the input subsets as well as the output subsets. The input subsets are each subject to processing, including a processing with a neural network having one or more layers. The neural network uses as input multiple samples of an input subset and generates one sample of an output subset, thereby obtaining for each input subsets the respective output subsets. By combining the output subsets, the picture is reconstructed. In particular, the size of at least one input subset is smaller than a size that is required to obtain the size of the respective output subset (R1; R2), after processing by the one or more layers of the neural network. A similar processing may be performed by the encoding side. This processing enables an efficient reconstruction of an entire picture within a neural network-based frame work, with a tradeoff between requirements and/or limitations on memory and computation resources.

What is claimed is:

1. A method for reconstructing a picture from a bitstream, the method comprising:
obtaining, based on the bitstream, an input set of samples representing the picture;
dividing the input set into two or more input subsets;
parsing, from the bitstream, side information;
determining, based on the side information, a size for each of the two or more input subsets and/or a size for each of two or more output subsets;
processing the two or more input subsets to obtain the two or more output subsets, wherein the processing comprises:
processing each of the two or more input subsets with a neural network including one or more layers, wherein the neural network uses a plurality of samples of an input subset out of the two or more input subsets to generate one sample of a respective output subset out of the two or more output subsets; and
cropping, after processing a respective input subset of the two or more input subsets with the neural network including the one or more layers, one or more samples of the plurality of samples, wherein a position and/or an amount of the one or more samples to be cropped is determined according to an input subset size indicated in the side information and a neural-network resizing parameter of the neural network specifying a relation between a neural network input size and a neural network output size; and
reconstructing the picture by combining the two or more output subsets.

2. The method according to claim 1, wherein the processing further comprises:
before processing a respective input subset of the two or more input subsets with the neural network including the one or more layers, performing a padding operation.

3. The method according to claim 2, wherein a position and/or an amount of samples to be padded is determined based on the side information.

4. The method according to claim 1, wherein the two or more input subsets overlap with one or more respective samples.

5. The method according to claim 1, wherein combining the two or more output subsets includes overlapping of the two or more output subsets with one or more combined samples, wherein a combined sample is a sample obtained as a combination of a sample from a first output subset and a sample from a second output subset.

6. The method according to claim 1, wherein combining of the two or more output subsets comprises a merging operation without overlapping.

7. The method according to claim 1, wherein the side information includes an indication one or more of:
- a number of the input subsets,
- a size of the input set,
- the size for each of the two or more input subsets,
- a size of the reconstructed picture,
- the size for each of the two or more output subsets,
- an amount of overlap between the two or more input subsets, or
- an amount of overlap between the two or more output subsets.

8. The method according to claim 1, wherein each of the two or more input subsets is a rectangular region of a rectangular input set, and wherein each of the two or more output subsets is a rectangular region of a rectangular reconstructed picture.

9. The method according to claim 1, wherein the parsing of the side information includes parsing one or more out of:
- a sequence parameter set,
- a picture parameter set, or
- a picture header.

10. The method according to claim 1, wherein the size of at least one of the input subsets is smaller than a size required to obtain, after processing by the one or more layers, the size of the respective output subset.

11. A processing method for encoding a picture into a bitstream, the method comprising:
- dividing an input set of samples representing the picture into two or more input subsets;
- determining side information based on a size for each of the two or more input subsets and/or a size for each of two or more output subsets;
- processing the two or more input subsets to obtain the two or more output subsets, wherein the processing comprises:
  - processing each of the two or more input subsets with a neural network including one or more layers, wherein the neural network uses a plurality of samples of an input subset out of the two or more input subsets to generate one sample of a respective output subset out of the two or more output subsets; and
  - cropping, after processing a respective input subset of the two or more input subsets with the neural network including the one or more layers, one or more samples of the plurality of samples, wherein a position and/or an amount of the one or more samples to be cropped is determined according to an input subset size indicated in the side information and a neural-network resizing parameter of the neural network specifying a relation between a neural network input size and a neural network output size; and
- inserting into the bitstream the side information.

12. The method according to claim 11, further comprising:
- inserting into the bitstream an indication of the two or more output subsets.

13. The method according to claim 11, wherein the processing further includes:
- before processing a respective input subset of the two or more input subsets with the neural network including the one or more layers, performing a padding operation.

14. The method according to claim 13, wherein a position and/or an amount of samples to be padded is determined based on the side information.

15. The method according to claim 11, wherein the two or more input subsets overlap with one or more respective samples.

16. The method according to claim 11, wherein the side information is determined based on a position and/or an amount of samples to be cropped.

17. The method according to claim 11, wherein the side information includes an indication one or more of:
- a number of the input subsets,
- a size of the input set,
- the size for each of the two or more input subsets,
- a size of the reconstructed picture,
- the size for each of the two or more output subsets,
- an amount of overlap between the two or more input subsets, or
- an amount of overlap between the two or more output subsets.

18. The method according to claim 11, wherein each of the two or more input subsets is a rectangular region of a rectangular input set, and each of the two or more output subsets is a rectangular region.

19. The method according to claim 11, wherein inserting the side information includes inserting the side information into one or more out of a sequence parameter set, a picture parameter set, or a picture header.

20. The method according to claim 11, wherein the size of at least one of the input subsets is smaller than a size required to obtain, after processing by the one or more layers, the size of the respective output subset.

21. A non-transitory computer-readable medium having processor-executable instructions stored thereon for reconstructing a picture from a bitstream, wherein the processor-executable instructions, when executed, facilitate performance of the following:
- obtaining, based on the bitstream, an input set of samples representing the picture;
- dividing the input set into two or more input subsets;
- parsing, from the bitstream, side information;
- determining, based on the side information, a size for each of the two or more input subsets and/or a size for each of two or more output subsets;
- processing the two or more input subsets to obtain the two or more output subsets, wherein the processing comprises:
  - processing each of the two or more input subsets with a neural network including one or more layers, wherein the neural network uses a plurality of samples of an input subset out of the two or more input subsets to generate one sample of a respective output subset out of the two or more output subsets; and
  - cropping, after processing a respective input subset of the two or more input subsets with the neural network including the one or more layers, one or more samples of the plurality of samples, wherein a position and/or an amount of the one or more samples to be cropped is determined according to an input subset size indicated in the side information and a neural-network resizing parameter of the neural network specifying a relation between a neural network input size and a neural network output size; and
- reconstructing the picture by combining the two or more output subsets.

22. The non-transitory computer-readable medium according to claim 21, wherein the size of at least one of the input subsets is smaller than a size required to obtain, after processing by the one or more layers, the size of the respective output subset.

23. The non-transitory computer-readable medium according to claim 21, wherein the processing further comprises:
before processing a respective input subset of the two or more input subsets with the neural network including the one or more layers, performing a padding operation.

24. A non-transitory computer-readable medium having processor-executable instructions stored thereon for encoding a picture into a bitstream, wherein the processor-executable instructions, when executed, facilitate performance of the following:
dividing an input set of samples representing the picture into two or more input subsets;
determining side information based on a size for each of the two or more input subsets and/or a size for each of two or more output subsets;
processing the two or more input subsets to obtain the two or more output subsets, wherein the processing comprises:
processing each of the two or more input subsets with a neural network including one or more layers, wherein the neural network uses a plurality of samples of an input subset out of the two or more input subsets to generate one sample of a respective output subset out of the two or more output subsets; and
cropping, after processing a respective input subset of the two or more input subsets with the neural network including the one or more layers, one or more samples of the plurality of samples, wherein a position and/or an amount of the one or more samples to be cropped is determined according to an input subset size indicated in the side information and a neural-network resizing parameter of the neural network specifying a relation between a neural network input size and a neural network output size; and
inserting into the bitstream the side information.

25. The non-transitory computer-readable medium according to claim 24, wherein the size of at least one of the input subsets is smaller than a size required to obtain, after processing by the one or more layers, the size of the respective output subset.

26. The non-transitory computer-readable medium according to claim 24, wherein the processor-executable instructions, when executed, further facilitate performance of the following:
inserting into the bitstream an indication of the two or more output subsets.

* * * * *